United States Patent [19]

Lennen

[11] Patent Number: 5,663,733

[45] Date of Patent: Sep. 2, 1997

[54] DIGITAL BANDWIDTH COMPRESSION FOR OPTIMUM TRACKING IN SATELLITE POSITIONING SYSTEM RECEIVER

[75] Inventor: Gary R. Lennen, San Jose, Calif.

[73] Assignee: Trimble Navigation Limited, Sunnyvale, Calif.

[21] Appl. No.: 520,332

[22] Filed: Aug. 28, 1995

[51] Int. Cl.⁶ ........................................ G01S 5/02
[52] U.S. Cl. .............................. 342/357; 342/352
[58] Field of Search .......................... 342/352, 357; 455/12.1

[56] References Cited

U.S. PATENT DOCUMENTS 5,541,606  7/1996  Lennen ..................... 342/357

*Primary Examiner*—Thomas H. Tarcza
*Assistant Examiner*—Dao L. Phan
*Attorney, Agent, or Firm*—Boris G. Tankhilevich

[57] ABSTRACT

The optimum design of the Satellite Positioning System Receiver is disclosed. The optimum design implementation of the receiver depends on the observed spectrum of the unknown W code of the satellite signals. In the preferred embodiment, the W code is synchronized with the C/A code EPOCH 1 and is not delayed. Both, the tracking and acquisition modes of operation are disclosed.

80 Claims, 20 Drawing Sheets

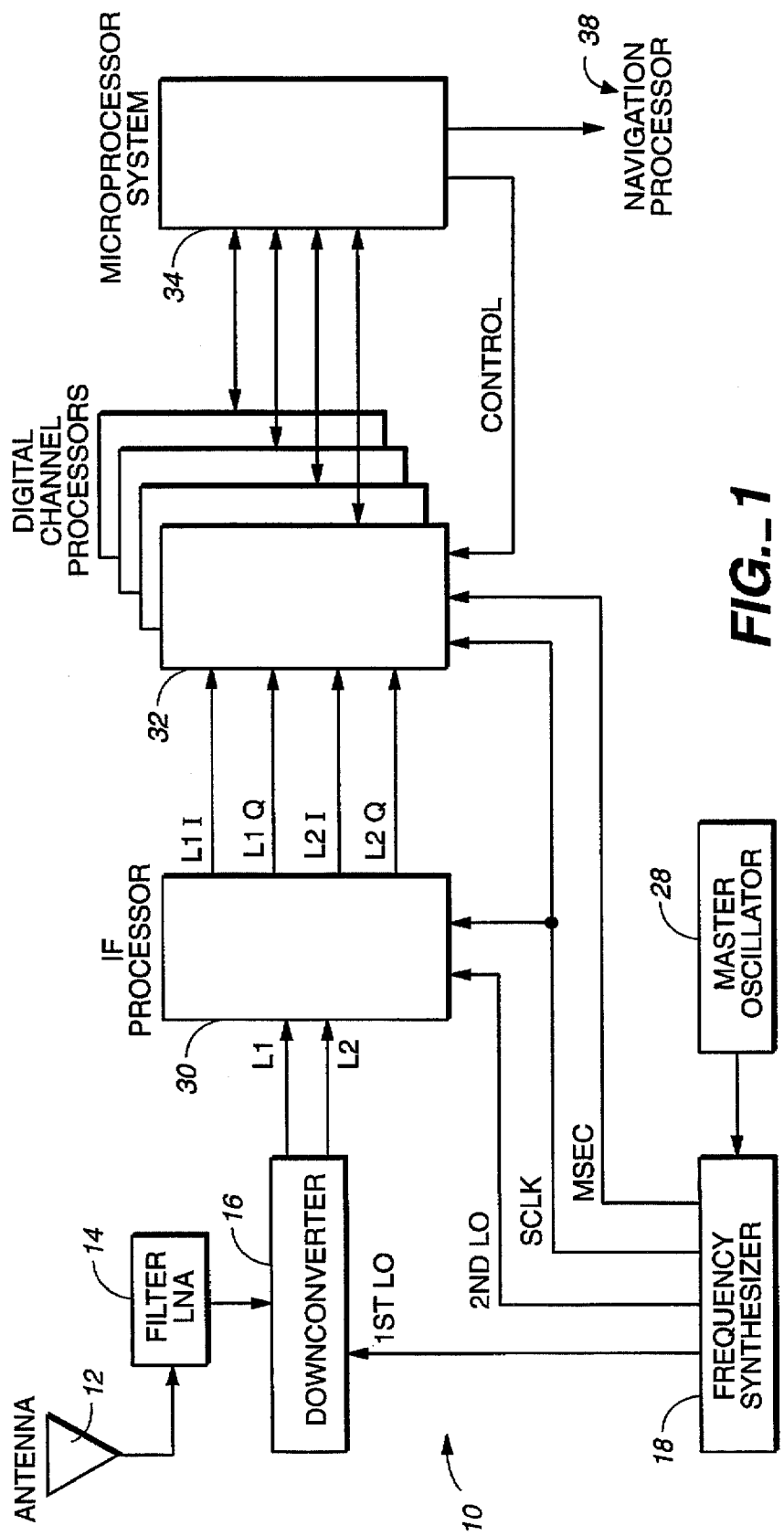
FIG._1

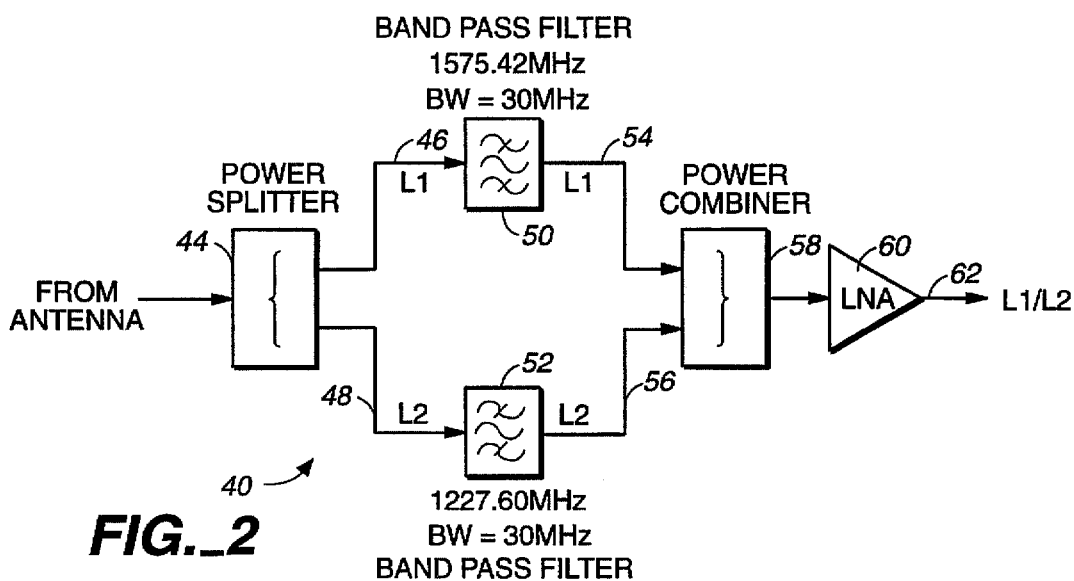
FIG._2
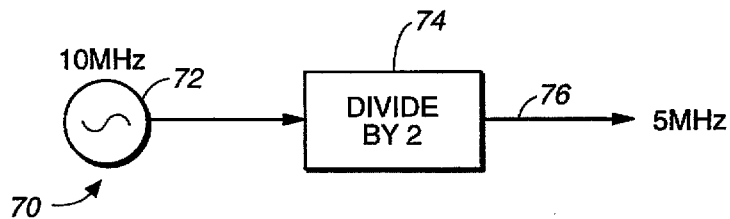
FIG._3
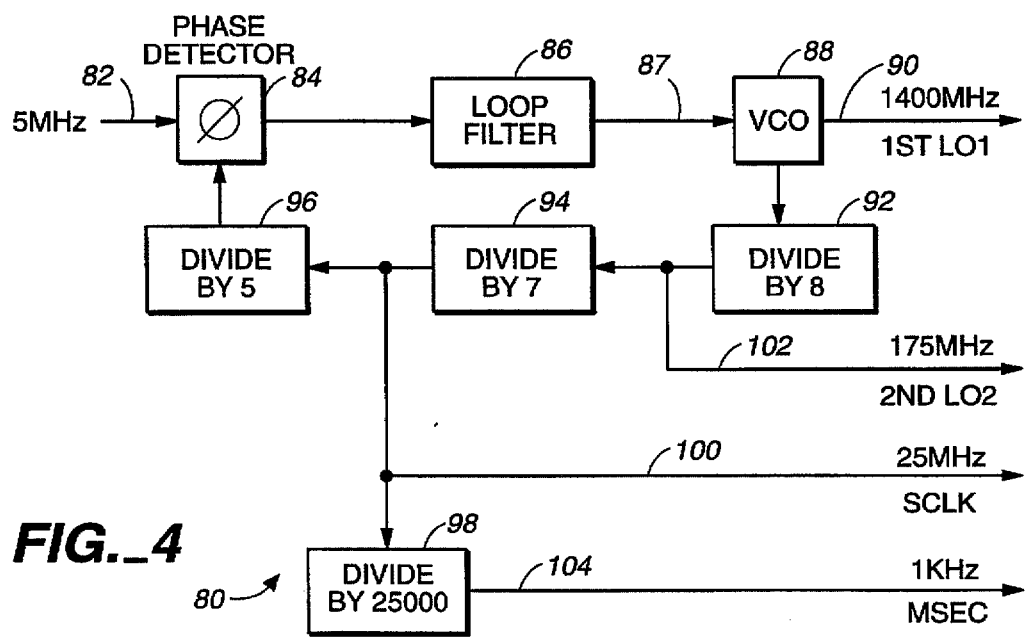
FIG._4

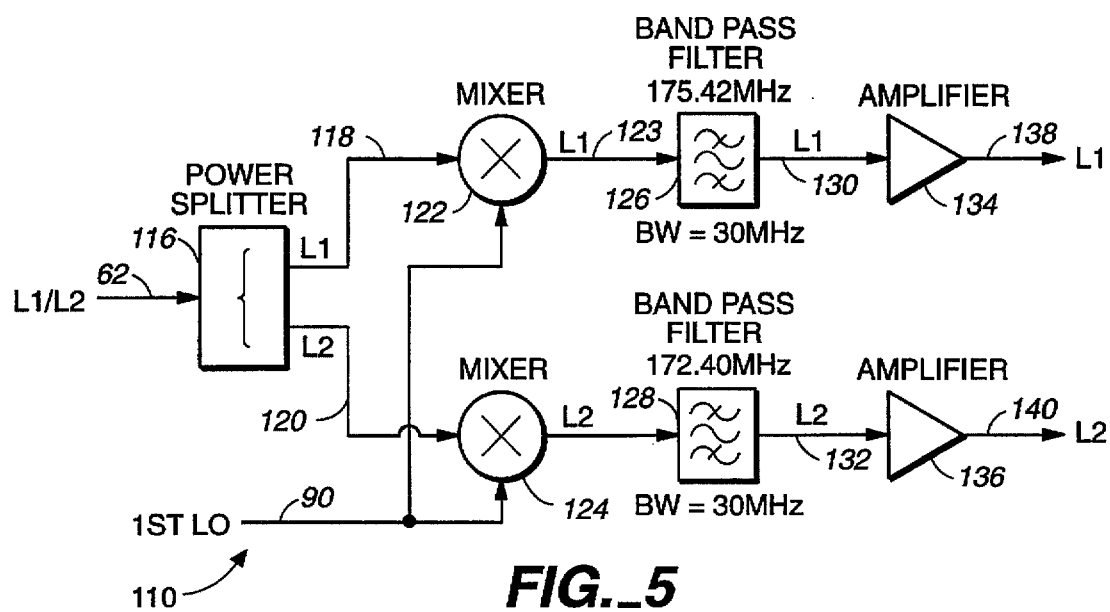
FIG._5
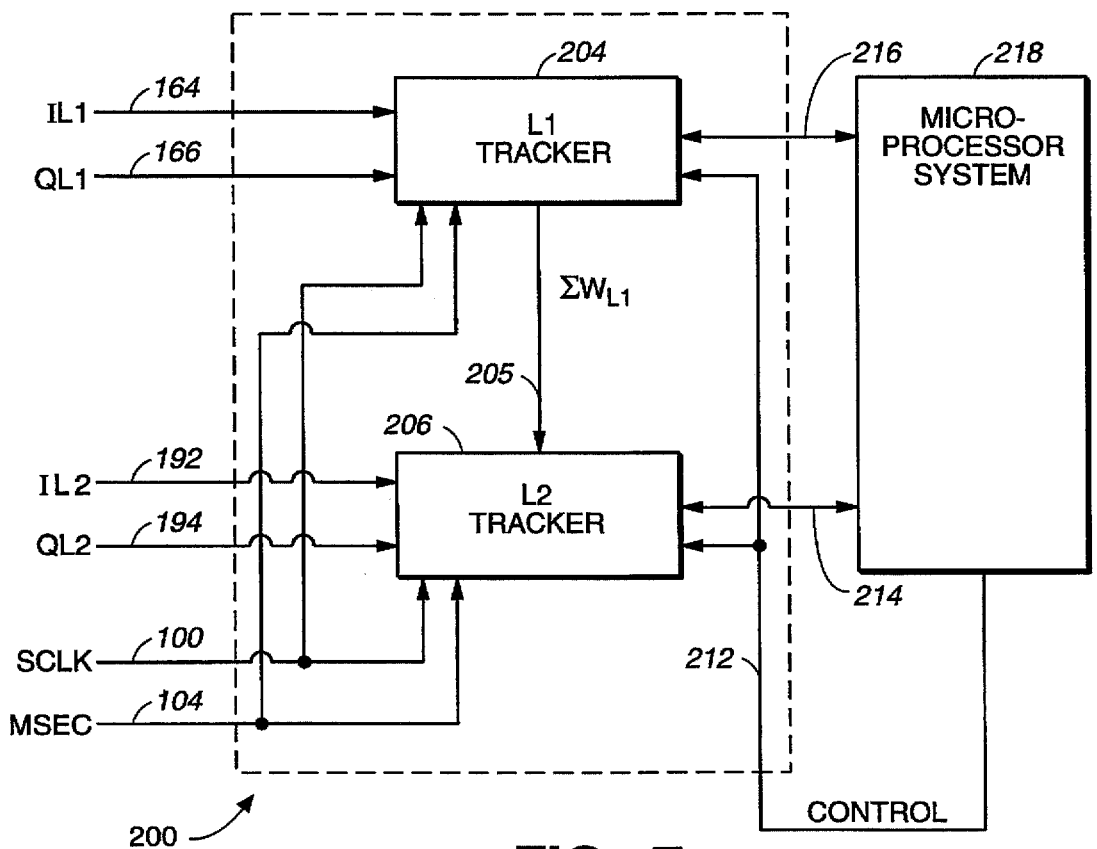
FIG._7

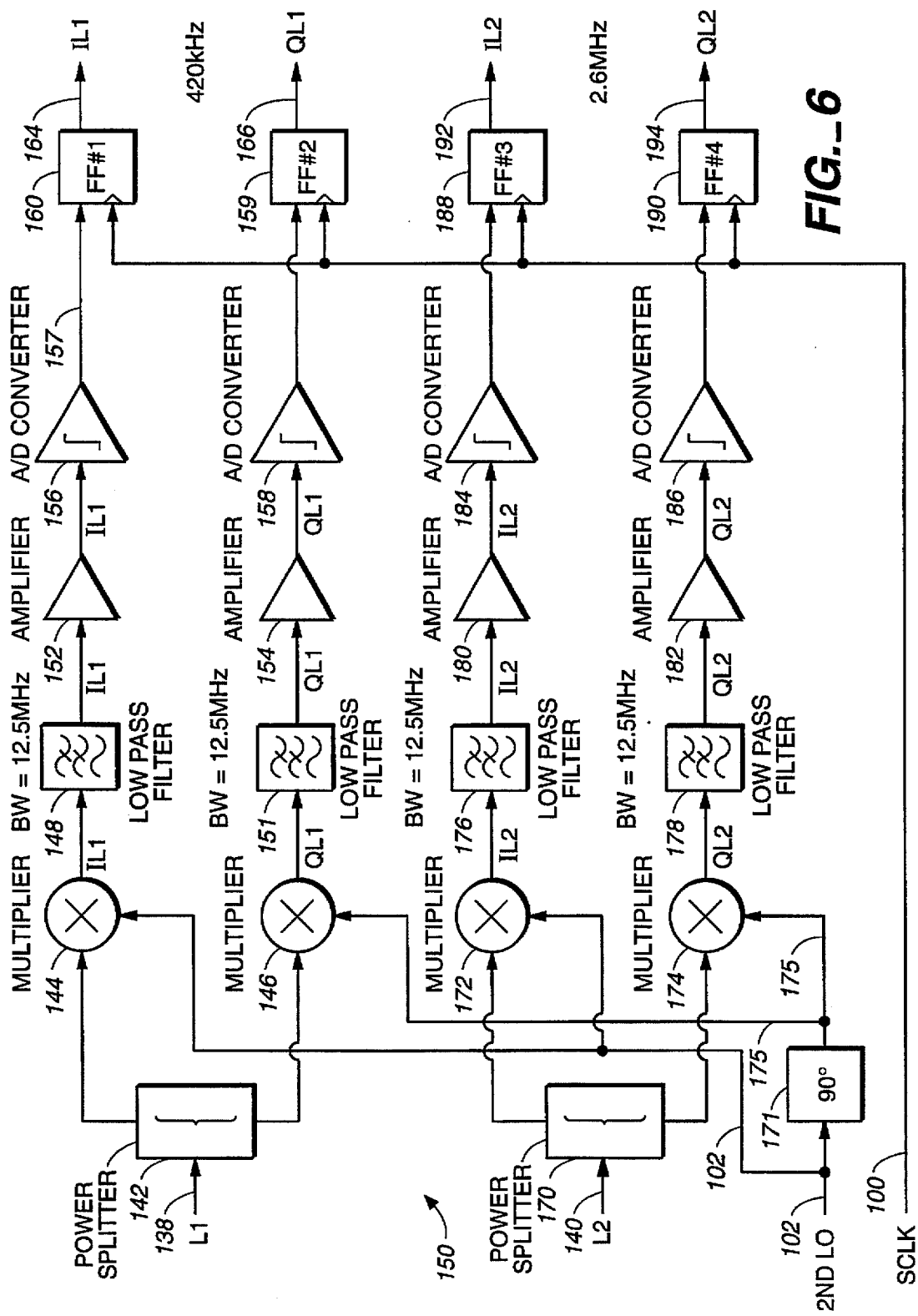
FIG._6

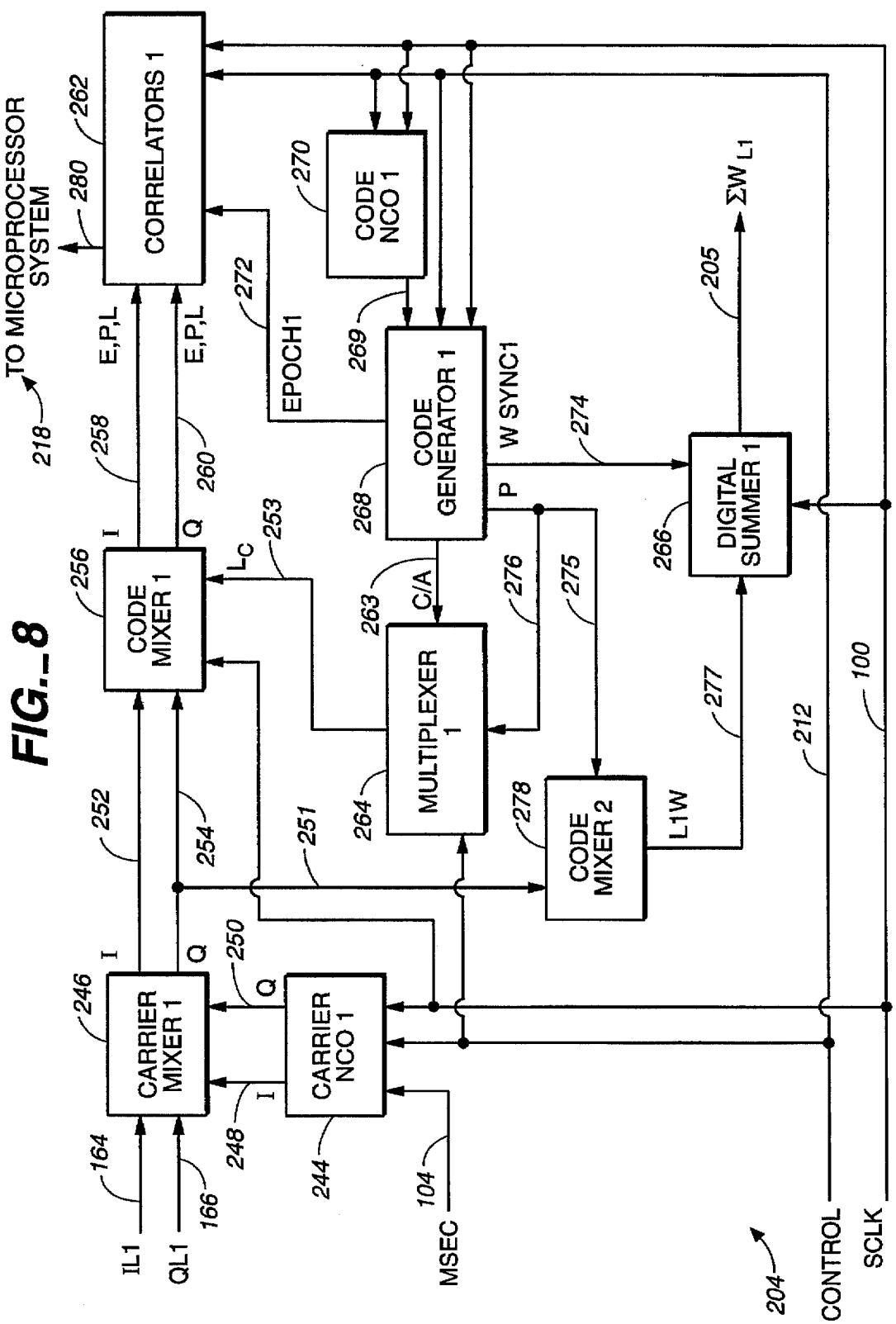
FIG._8

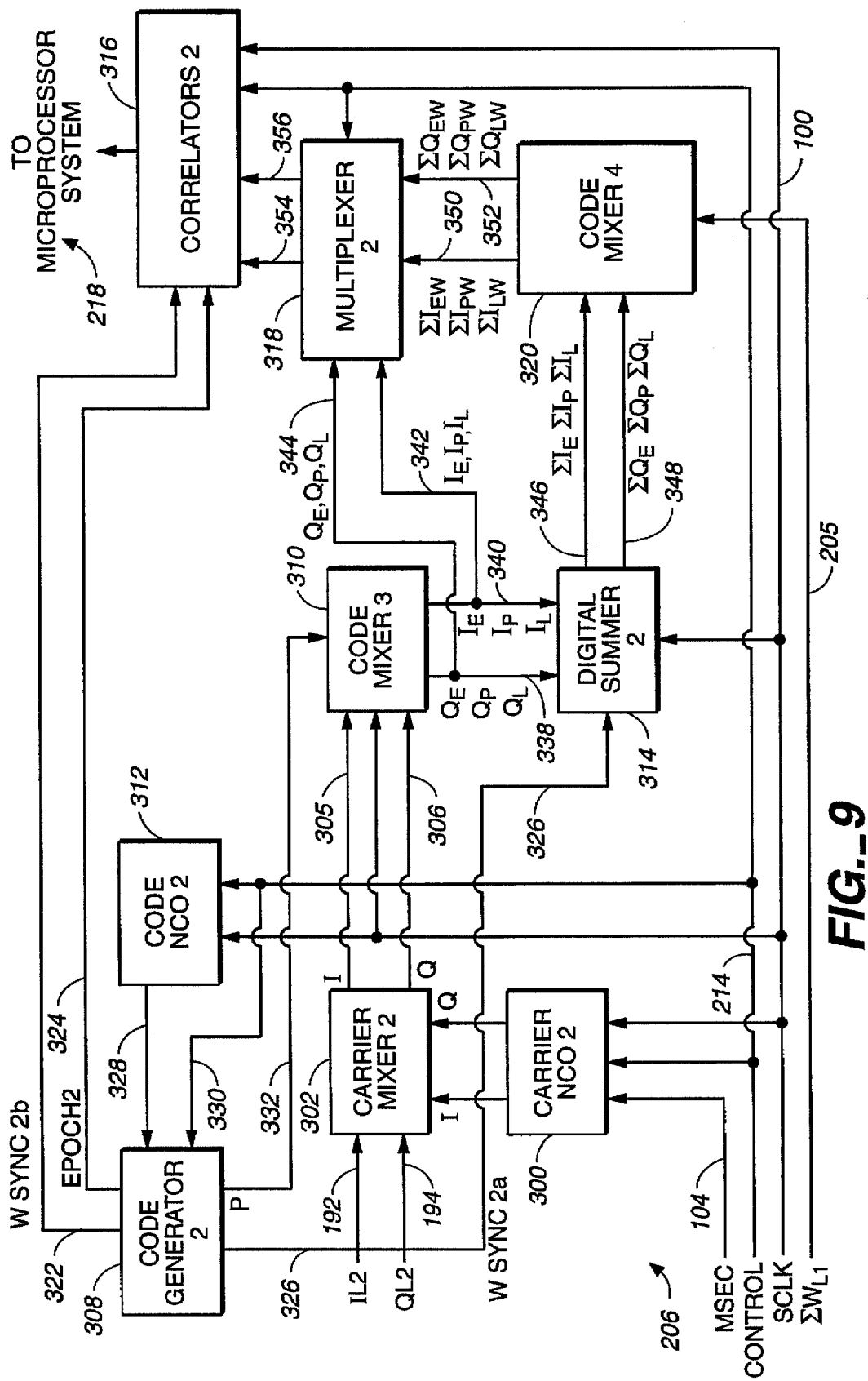
FIG._9

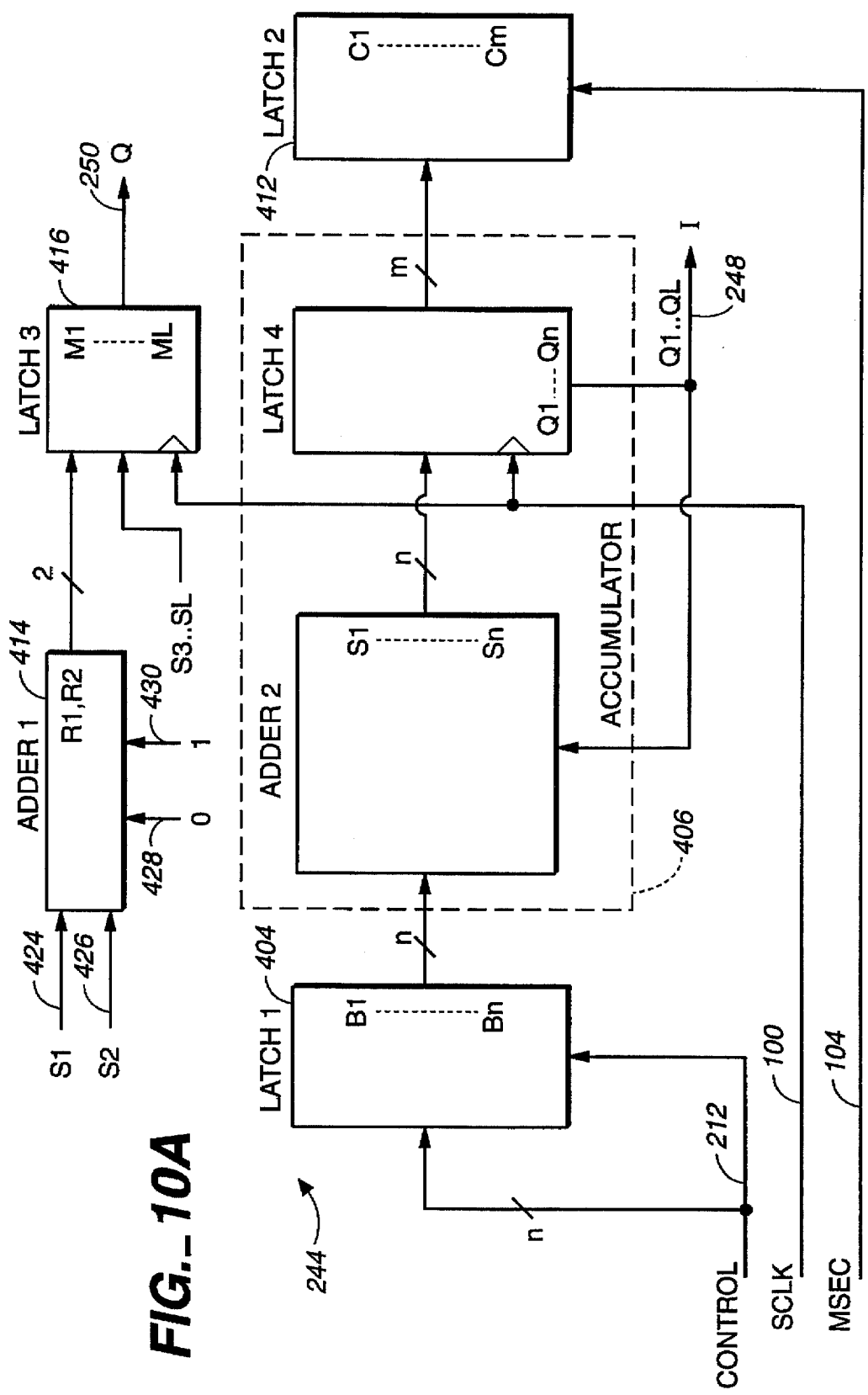
FIG._10A

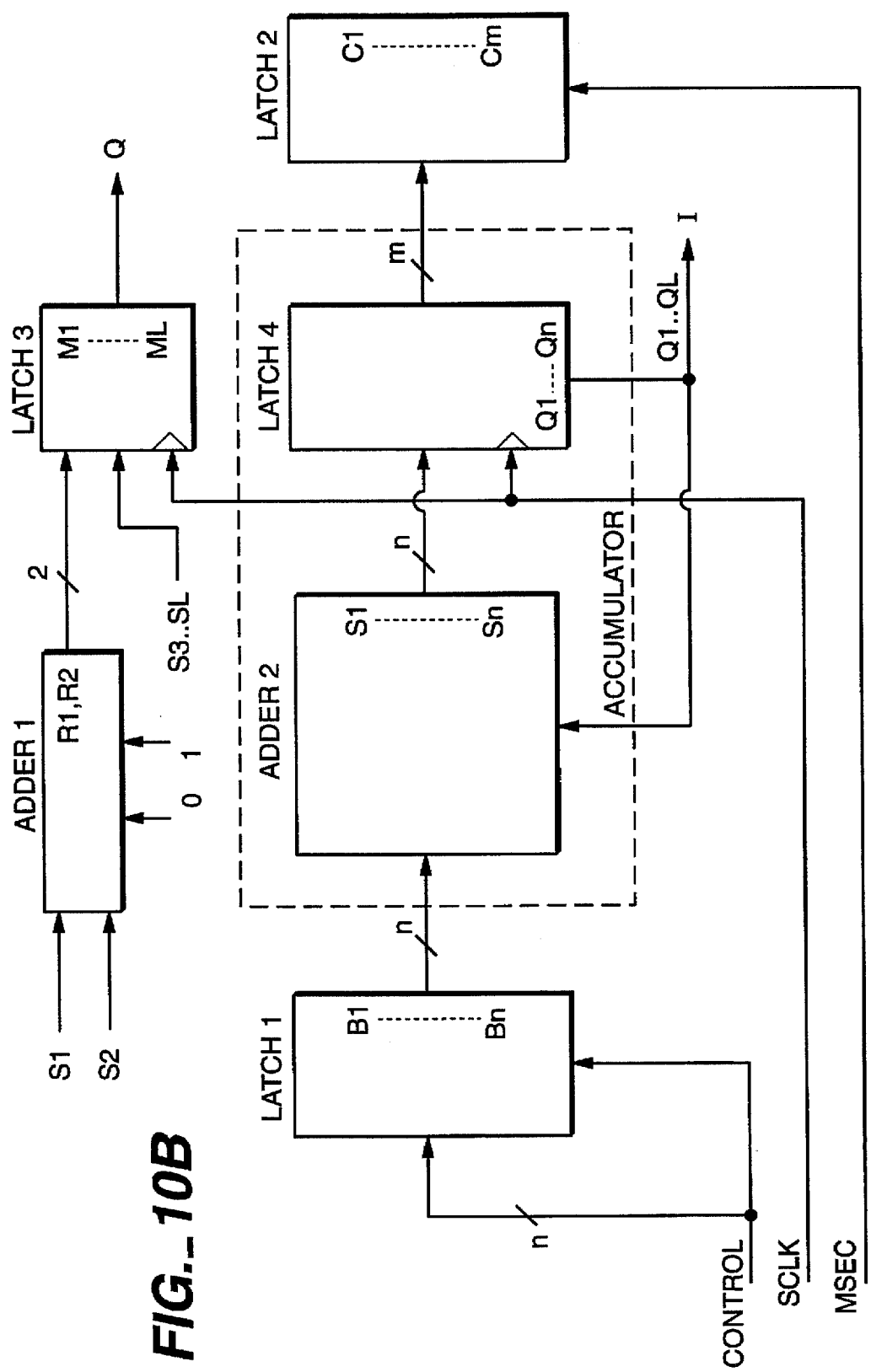
FIG._10B

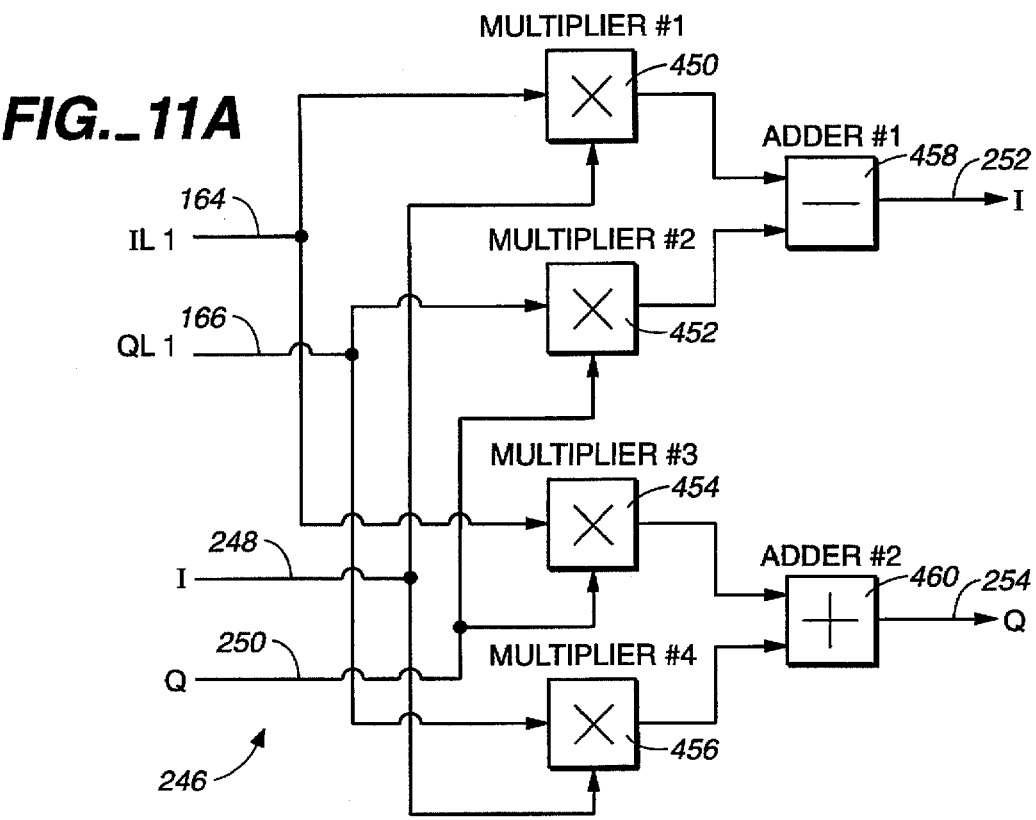
FIG._11A
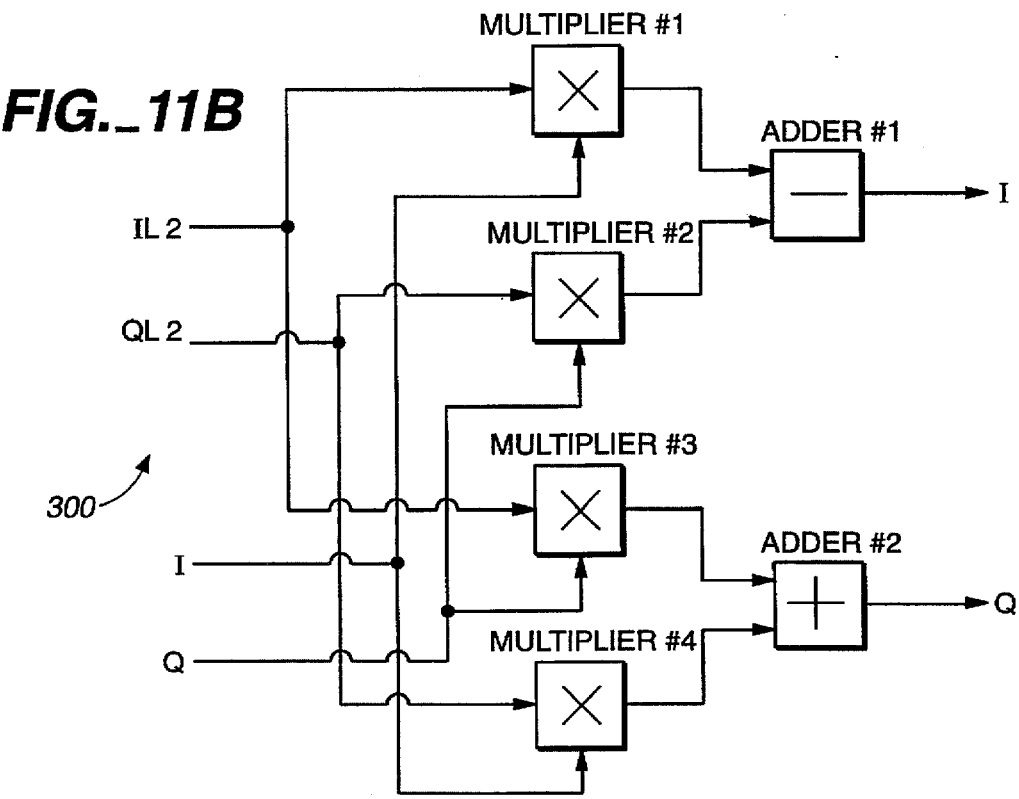
FIG._11B

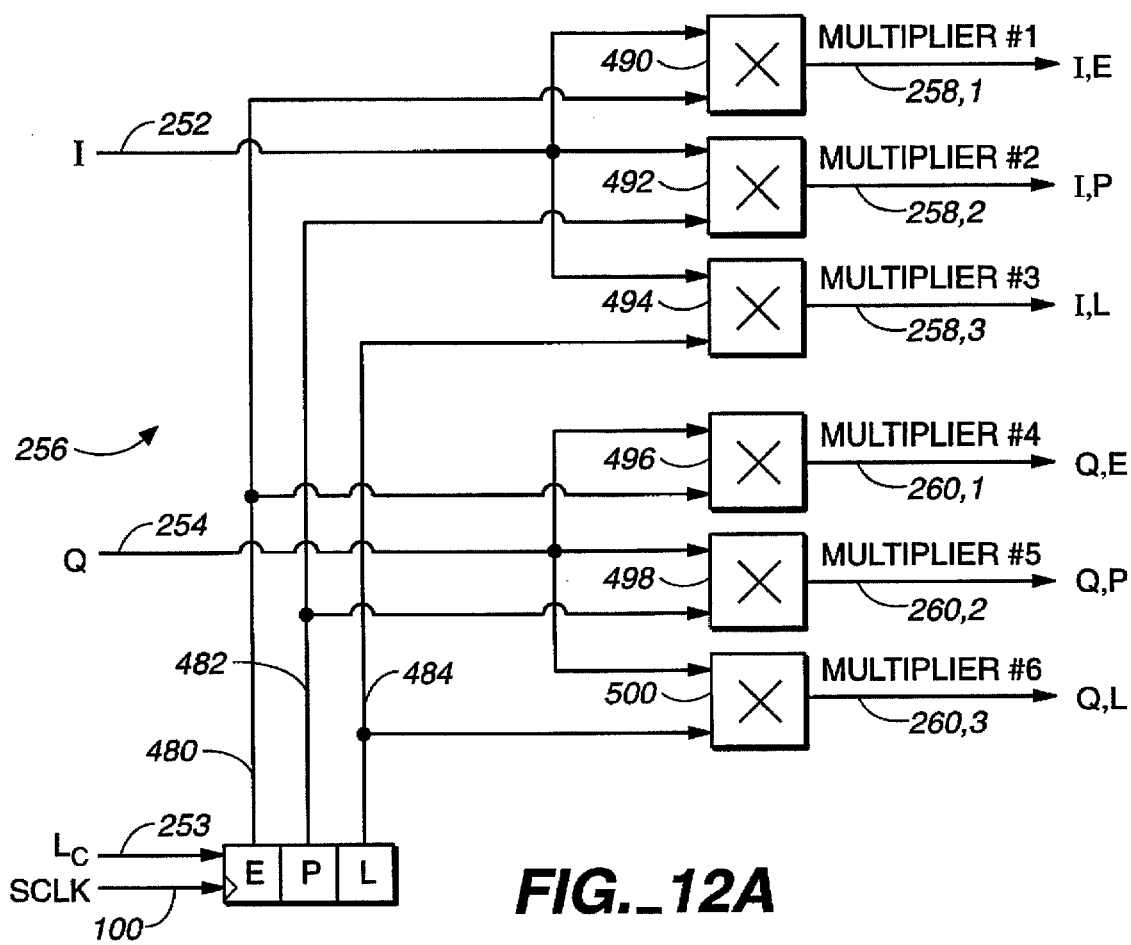
FIG._12A
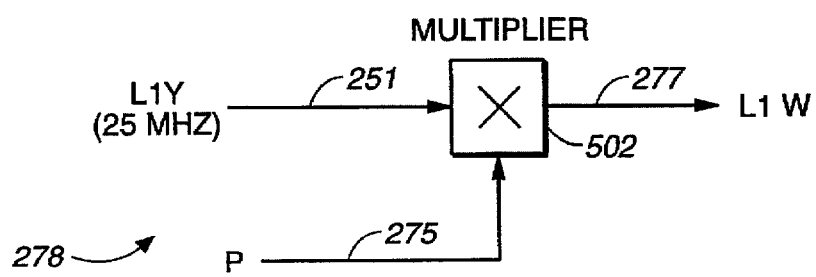
FIG._12B

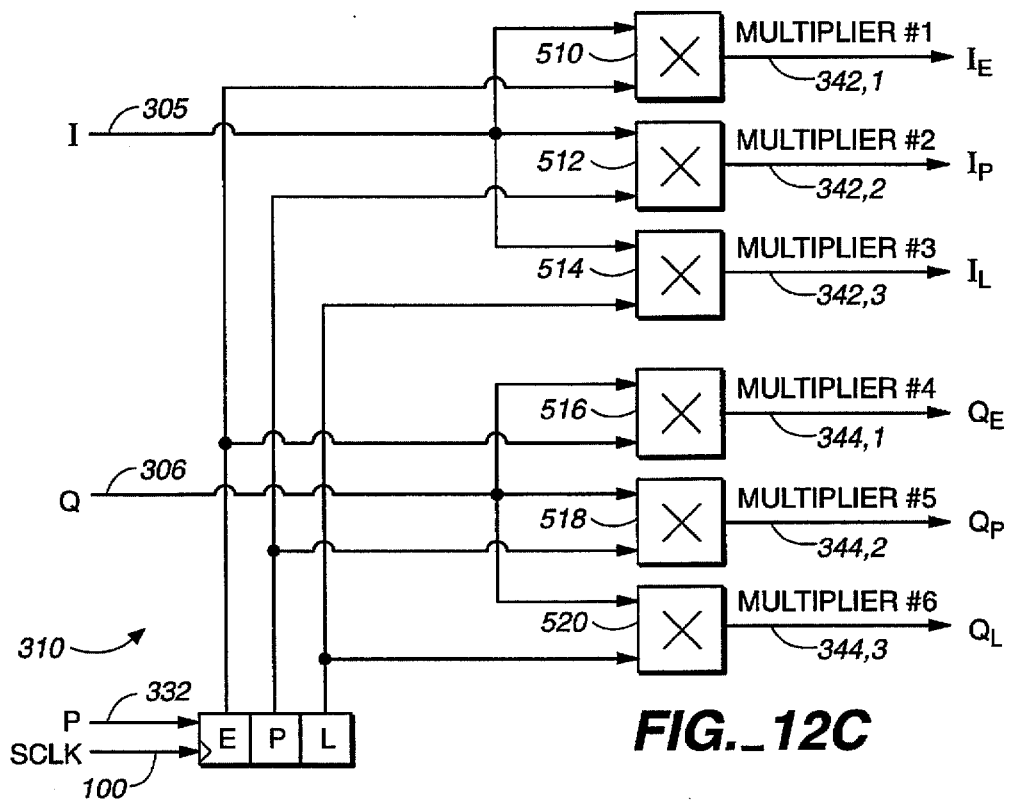
FIG._12C
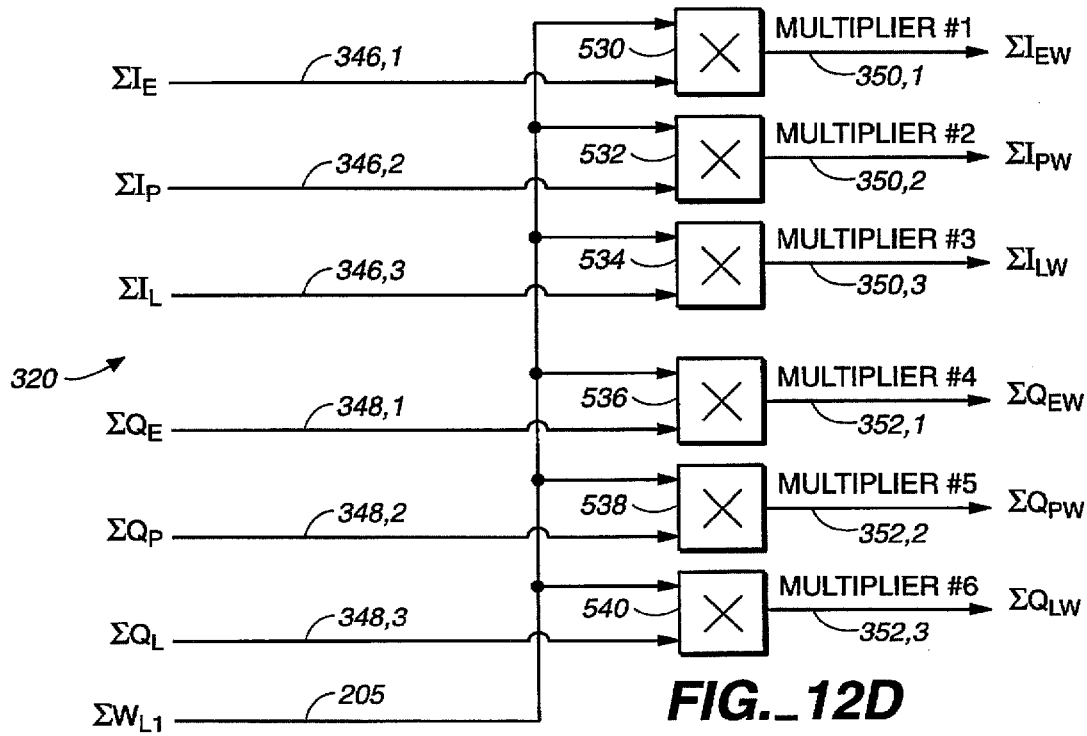
FIG._12D

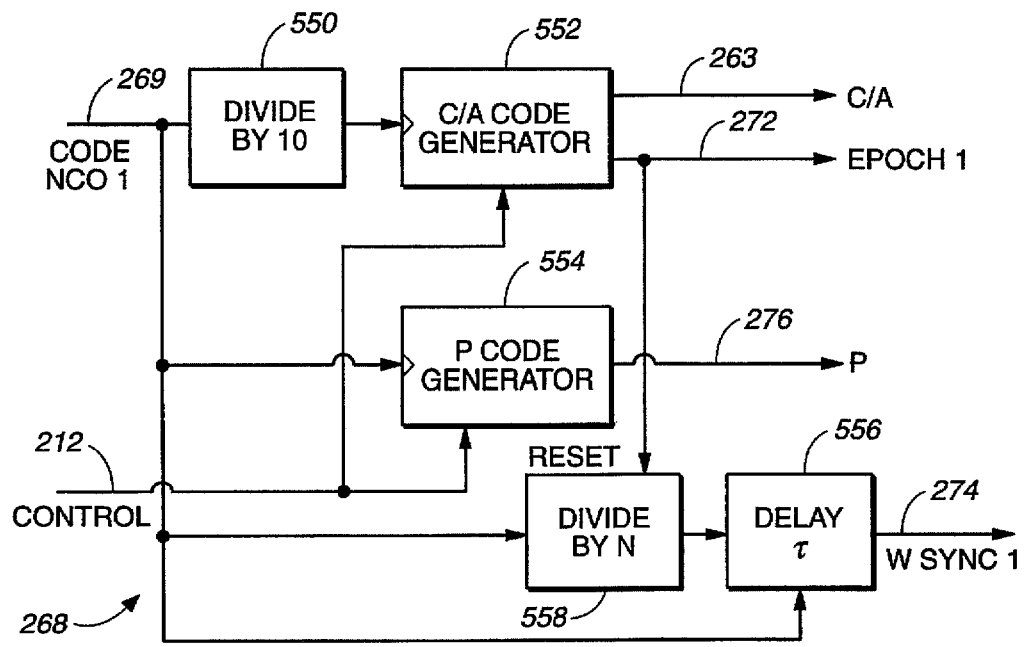
FIG._13A
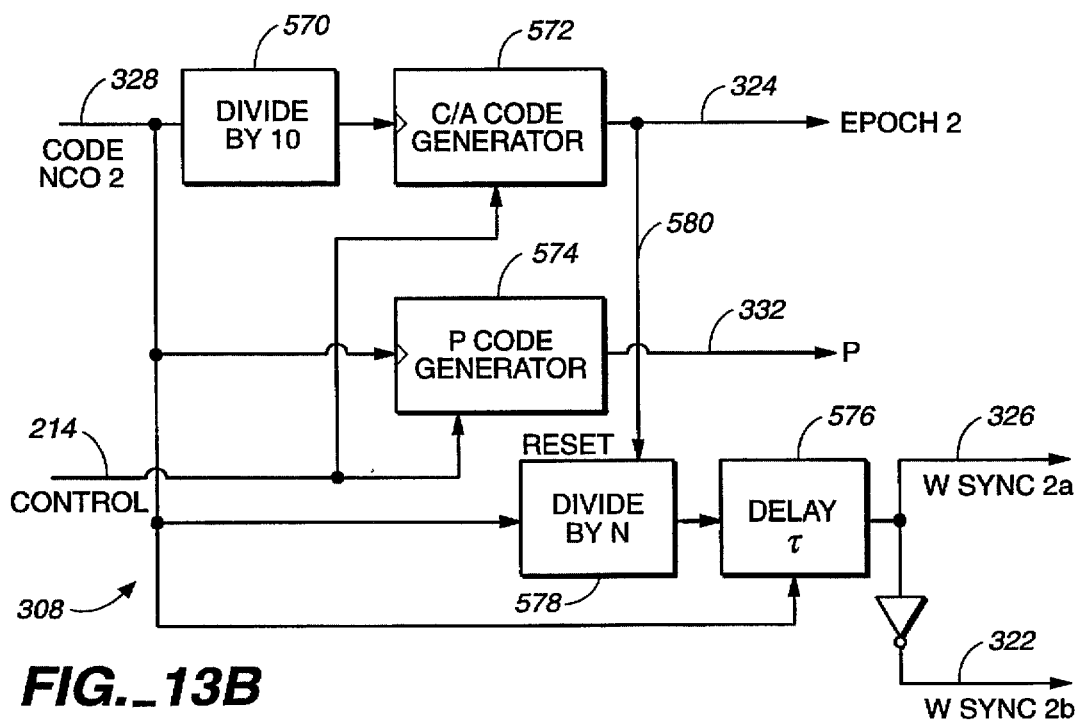
FIG._13B

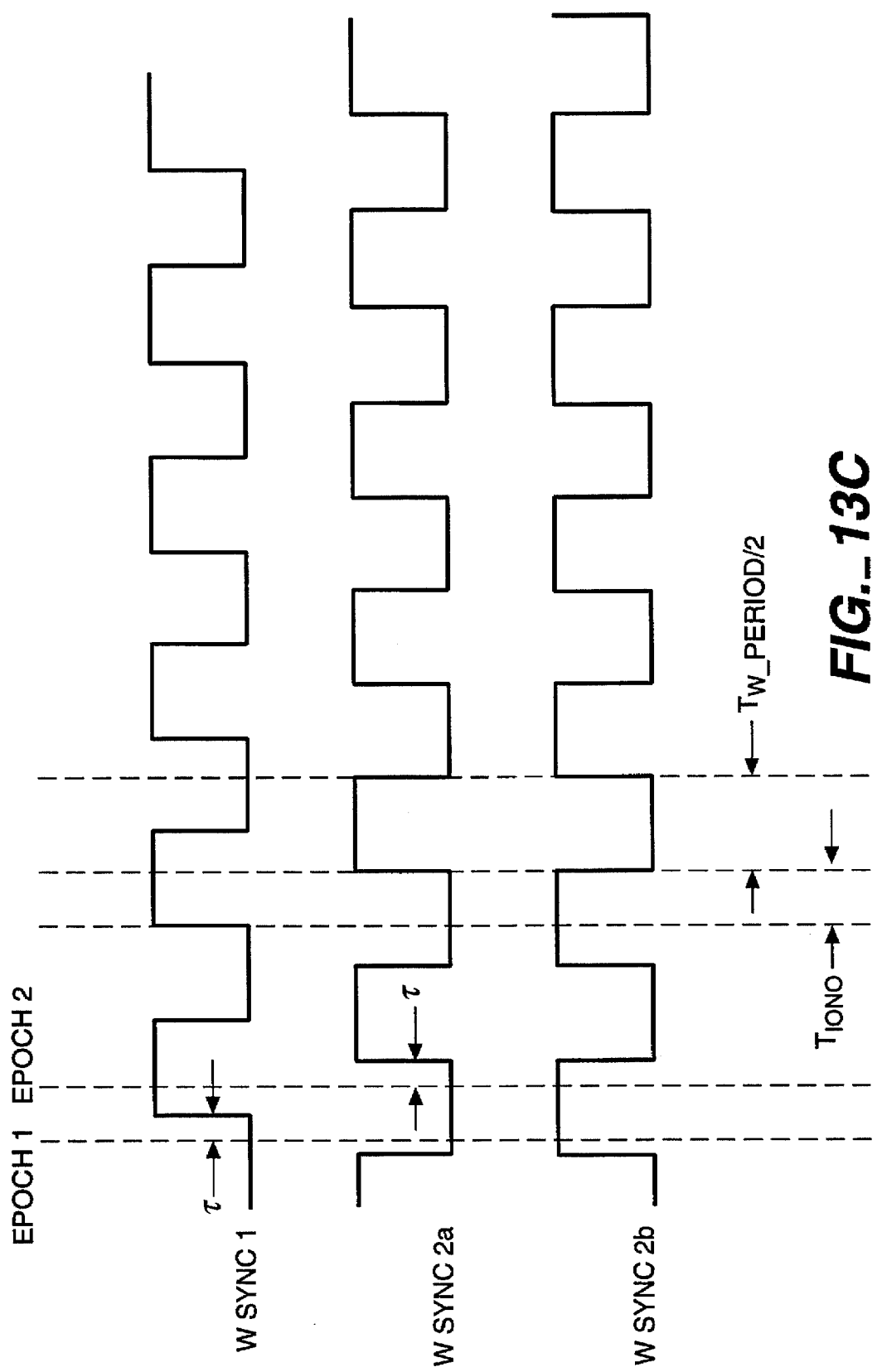
FIG._13C

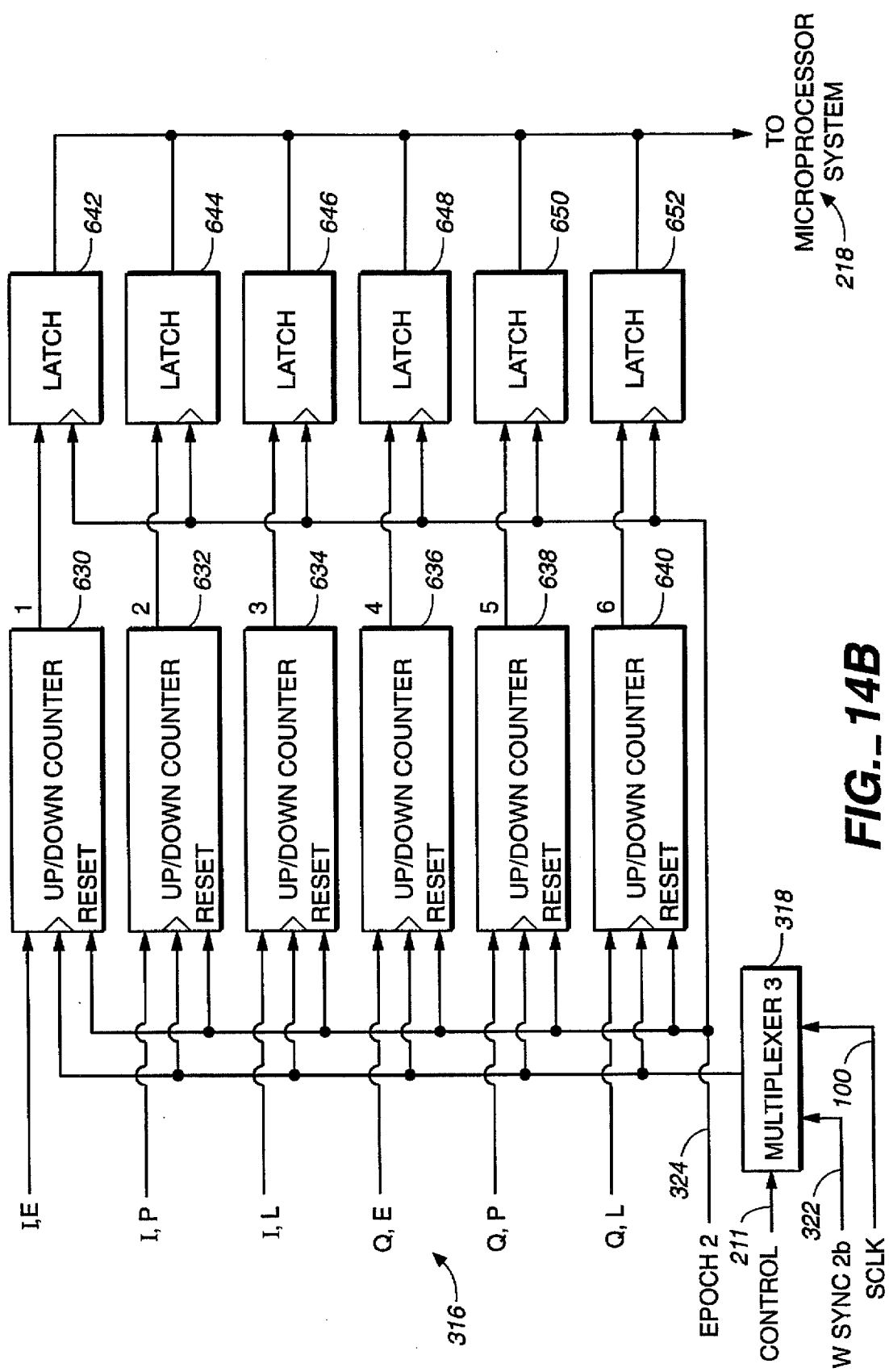
FIG._14B

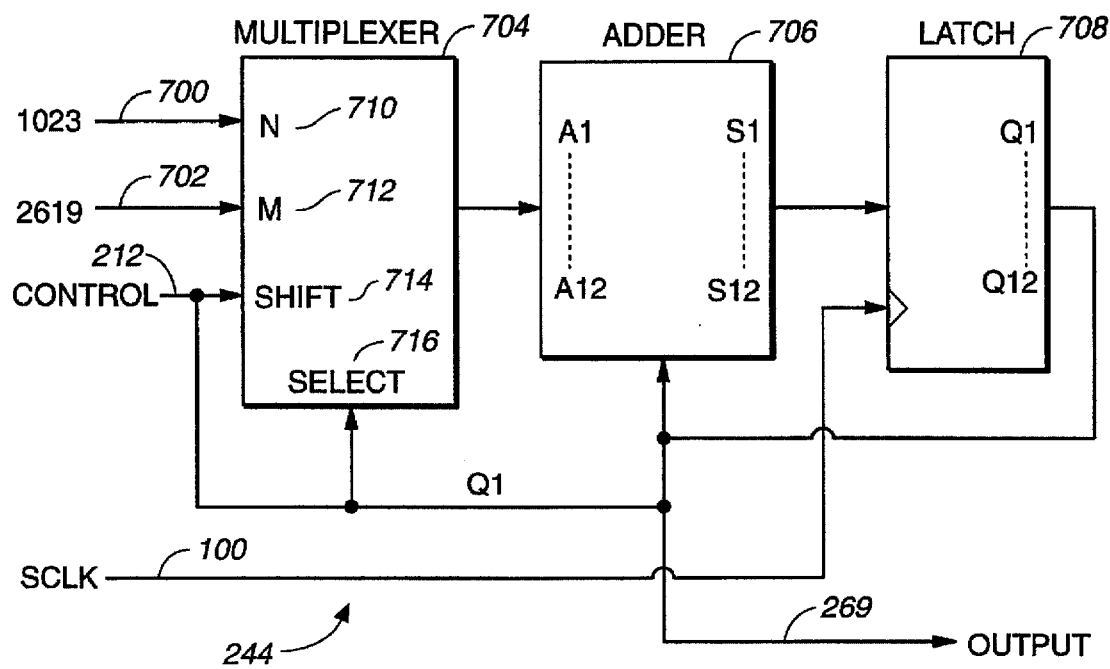
FIG._15
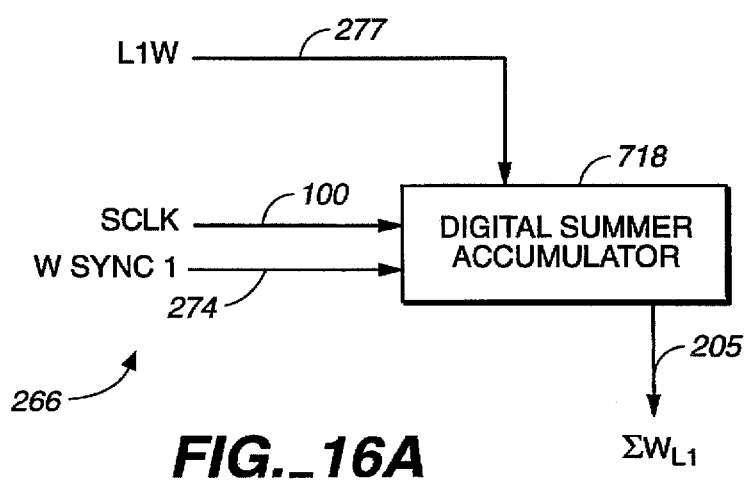
FIG._16A

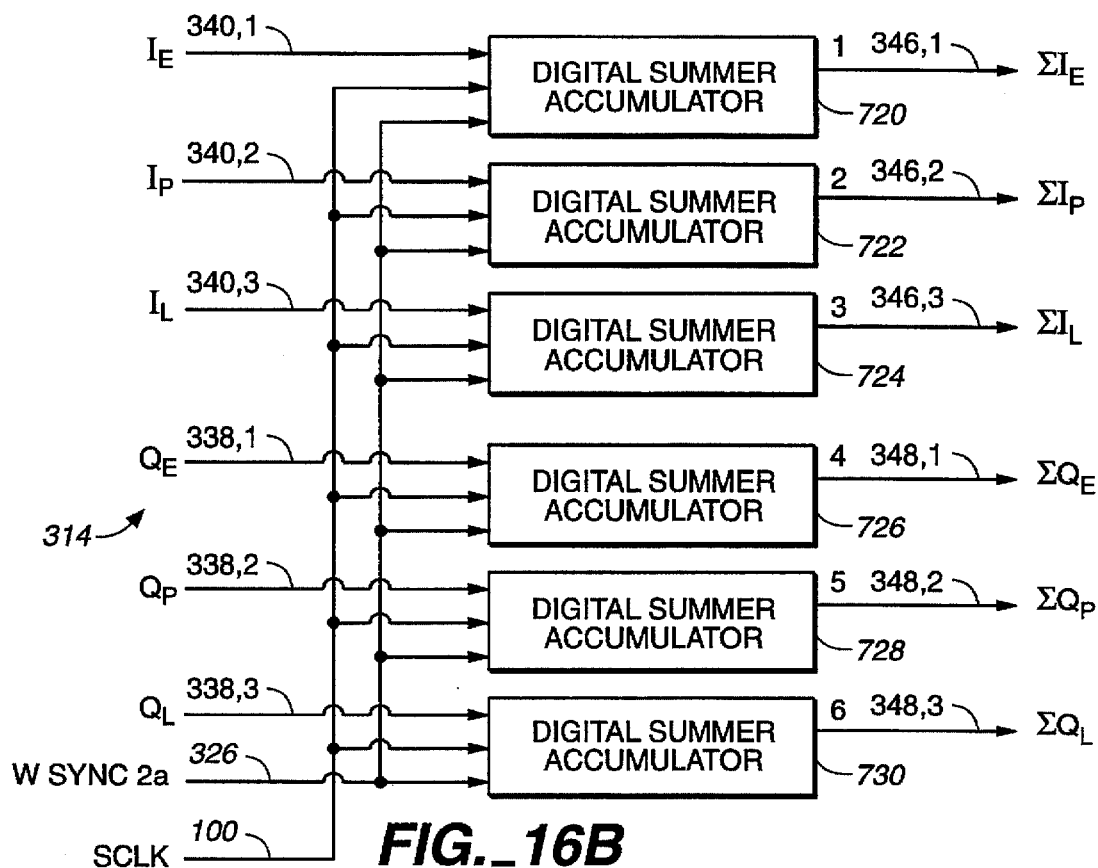
FIG._16B
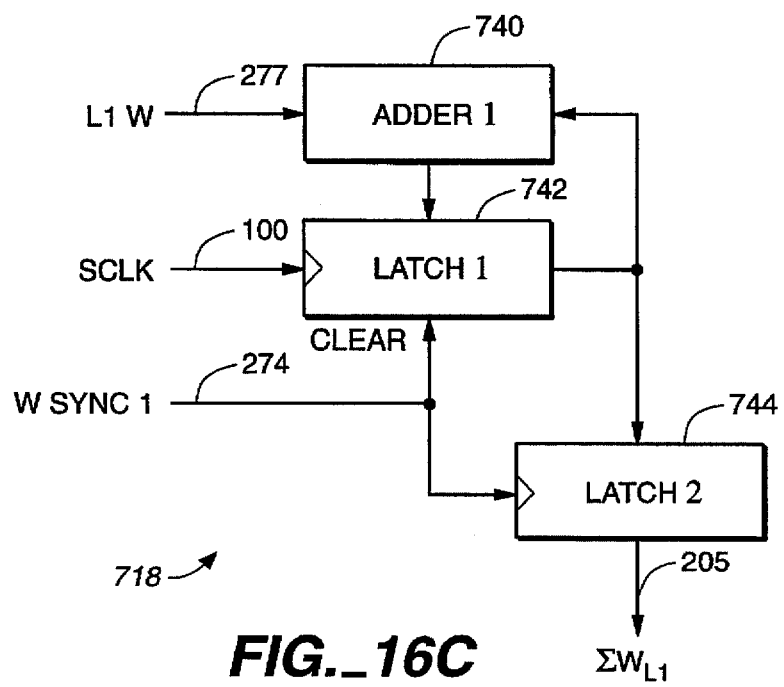
FIG._16C

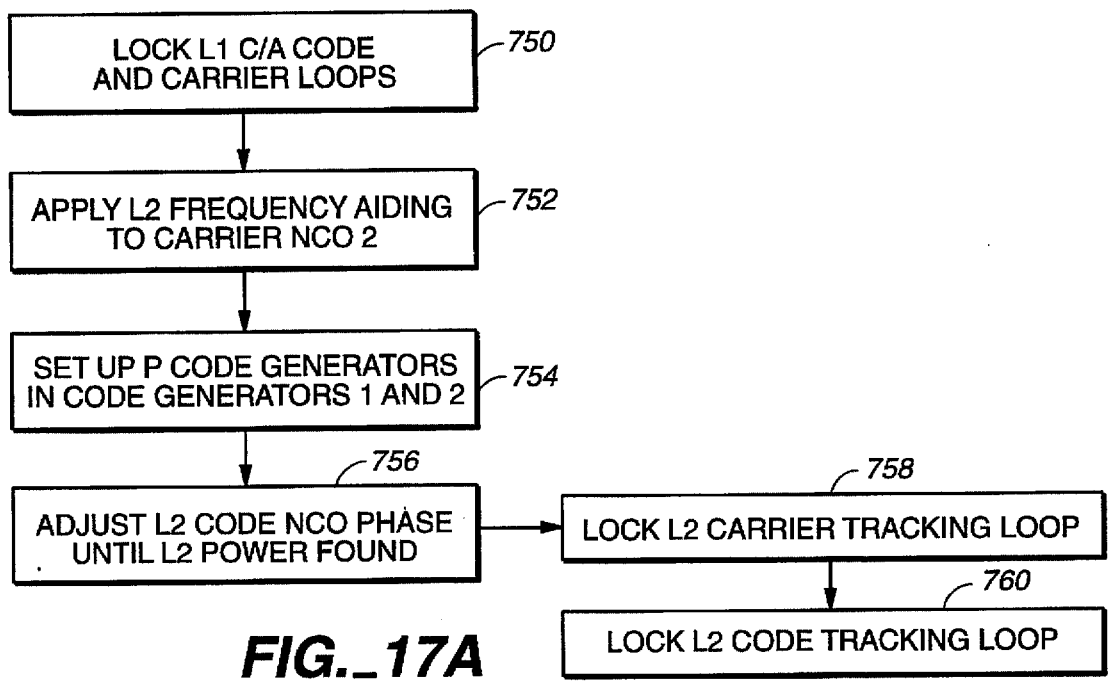
FIG._17A
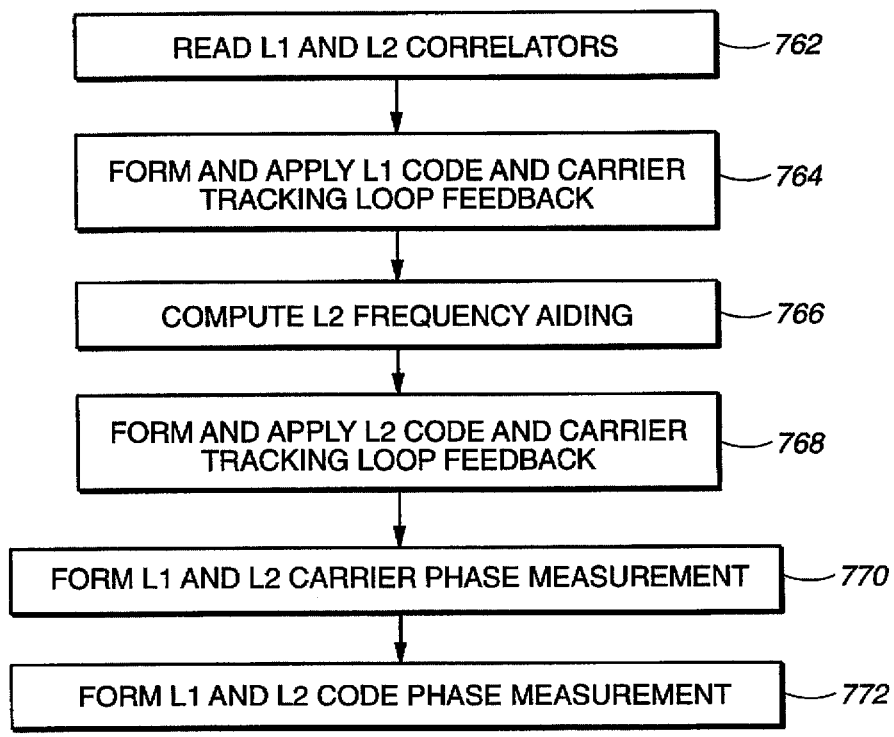
FIG._17B

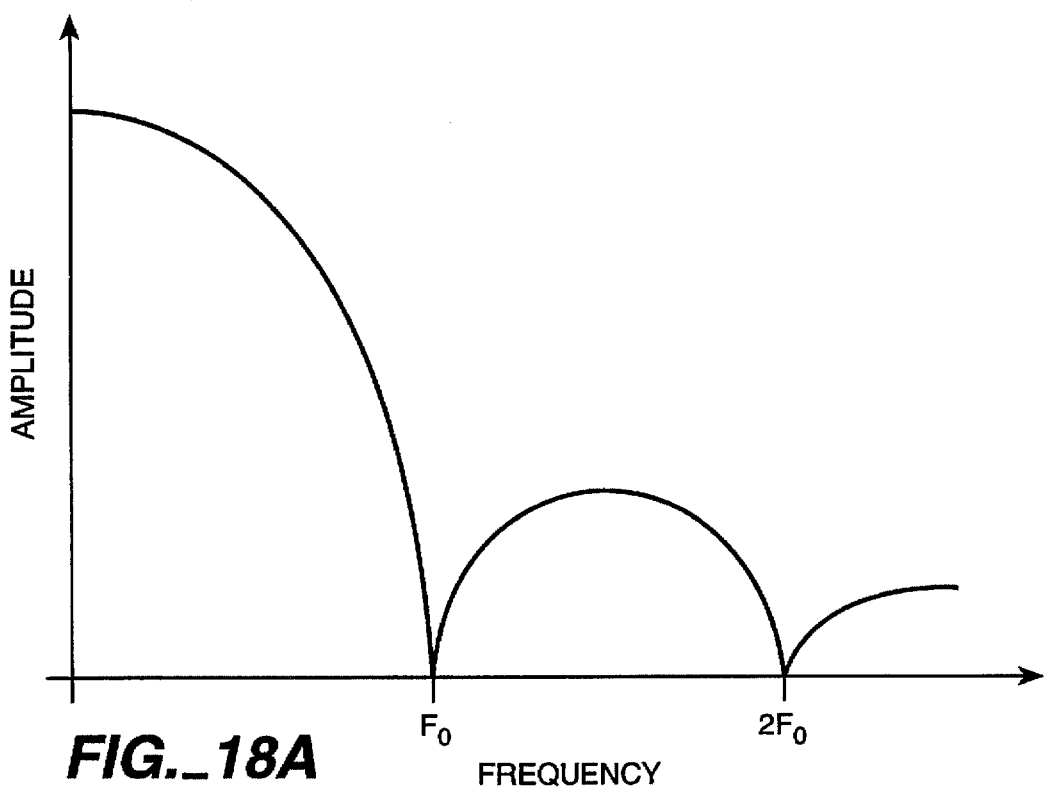
FIG._18A
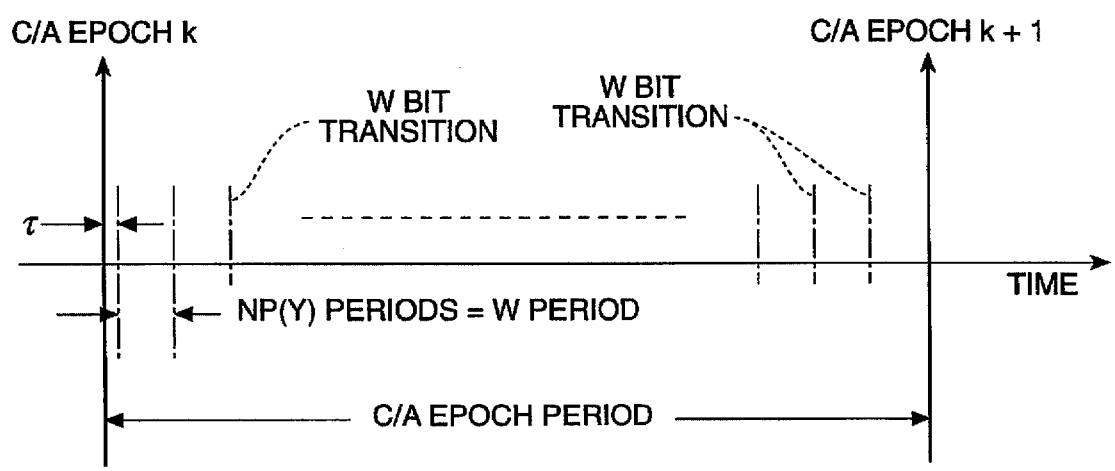
FIG._18B

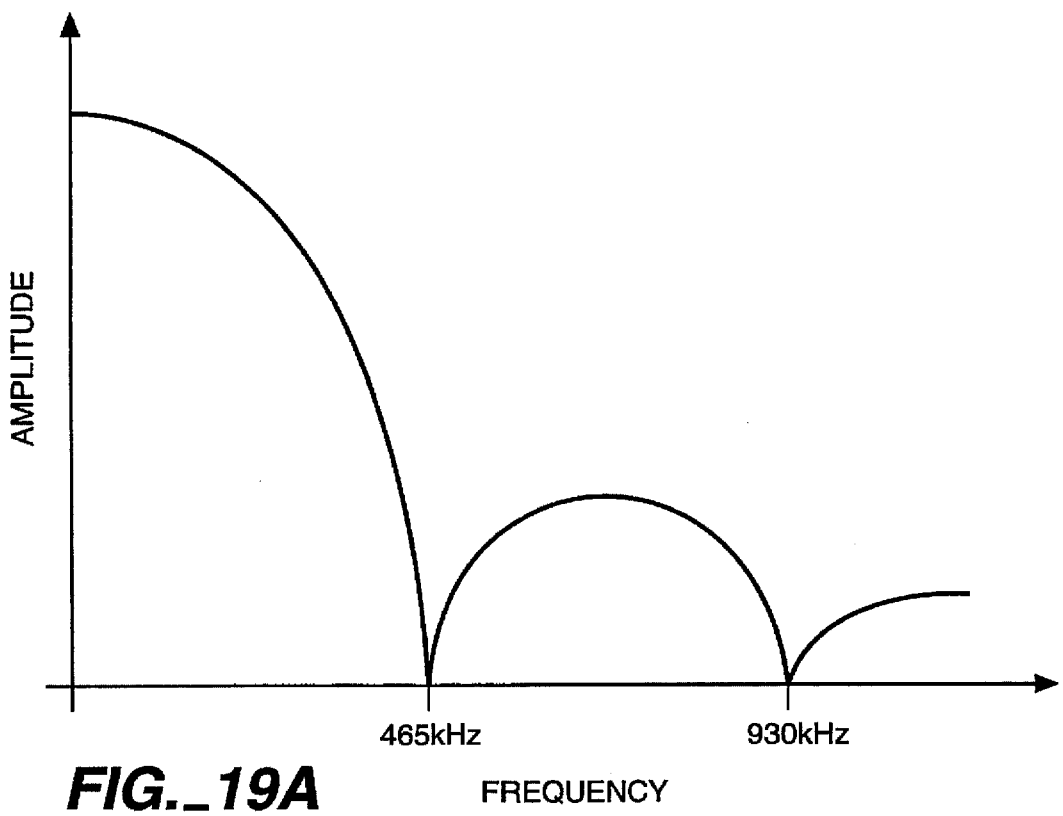
FIG._19A
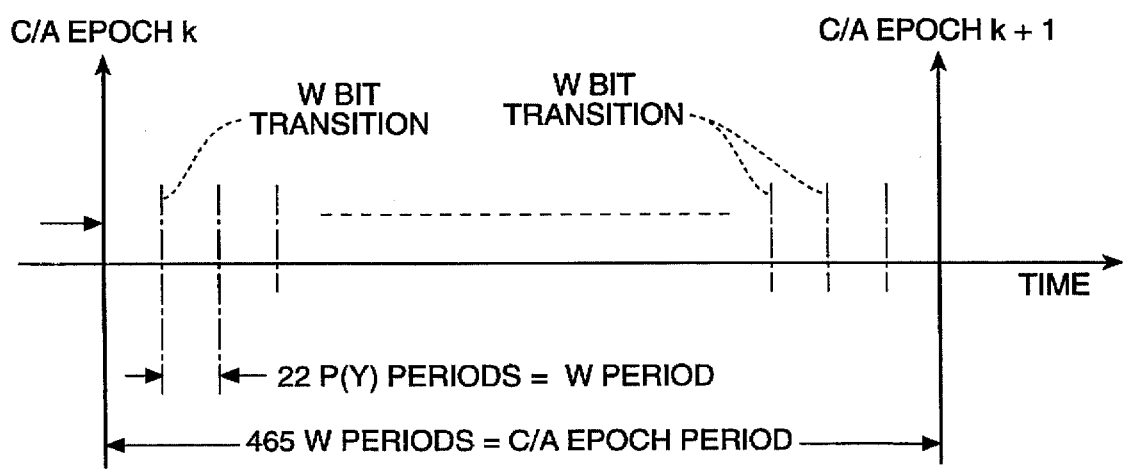
FIG._19B

DIGITAL BANDWIDTH COMPRESSION FOR OPTIMUM TRACKING IN SATELLITE POSITIONING SYSTEM RECEIVER

BACKGROUND

The invention relates to a satellite positioning system (SPS) receiver capable of receiving satellite signals which have been modulated with an unknown security code. The SPS includes different satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite (which includes complete information about the transmitting satellite within the next several hours of transmission) and an almanac for all GPS satellites (which includes less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k(=1,2, . . . 24) is the channel or satellite number. These frequencies lie in two bands at 1.597–1,617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites transmit navigational data at a rate of 50 Baud for C/A code and 100 Baud for P code. Because the channel frequencies are distinguishable from each other, the P-code is the same, and the C/A-code is the same, for each satellite.

The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. An SPS antenna receives SPS signals from a plurality (preferably four or more) of SPS satellites and passes these signals to an SPS signal receiver/processor, which (1) identifies the SPS satellite source for each SPS signal, (2) determines the time at which each identified SPS signal arrives at the antenna, and (3) determines the present location of the SPS satellites.

The range (Ri) between the location of the i-th SPS satellite and the SPS receiver is equal to the speed of light c times ($\Delta$ti), wherein ($\Delta$ti) is the time difference between the SPS receiver's clock and the time indicated by the satellite when it transmitted the relevant phase. However, the SPS receiver has an inexpensive quartz clock which is not synchronized with respect to the much more stable and precise atomic clocks carried on board the satellites. Consequently, the SPS receiver actually estimates not the true range Ri to the satellite but only the pseudo-range (ri) to each SPS satellite.

After the SPS receiver determines the coordinates of the i-th SPS satellite by picking up transmitted ephemeris constants, the SPS receiver can obtain the solution of the set of the four equations for its unknown coordinates (x0, y0, z0) and for unknown time bias error (cb). The SPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SPS receiver.

The C/A code modulated phase quadrature carrier component of the L1 signal is provided for commercial use. If the accuracy desired in the quantity being measured by the receiver is not great, it is sufficient to use only the L1 signal carrier. However, for applications where high resolution measurements or fast high integrity measurements are to be made, e.g. surveying and machine control, both the L1 carrier and the L2 carrier must also be used, which allows elimination of the unknown component of the time delay of the signals by the ionosphere.

To prevent jamming signals from being accepted as actual satellite signals, the satellites are provided with a secret Y-code, which replaces the known P-code when the "anti-spoofing" is ON. When the "anti-spoofing" is OFF, the Y-code is turned OFF, and the known P-code is used. Thus, the secret Y-code can be turned ON or OFF at will by the U.S. Government. The "anti-spoofing" allows the GPS system to be used for the military or other classified United States Government projects. It has been disclosed publicly that the secret Y-code is the modulo-two sum of the known P-code and the unknown W-code. Since the W-code is classified, the commercial GPS users employ different techniques to obtain the quasi-demodulation of the L2 signal.

The GPS signals are intended to be recovered by correlating each incoming signal with a locally generated replica of the code: P-code or C/A code. The result of such correlation is that the carrier in the GPS signals is totally suppressed when the modulating signal is a pseudorange code sequence like the P-code or the C/A code. Thus, the received L2 signal contains no significant components at the L2 frequency. For survey applications it is important to be able to reconstruct the L2 carrier and to measure its phase and also to be able to measure the L2 pseudorange. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrowband peak centered at the carrier frequency. The carrier recovered by correlation provides the best available signal-to-noise ratio (SNR). Although the L2 carrier cannot be recovered by this correlation process when the P code is encrypted, L2 can still be recovered by squaring (multiplying the signal by itself) the incoming signal. This has an effect of removing all biphase modulation from the signal, and producing a single-frequency output signal at twice the frequency of the suppressed carrier. Thus, the L2 carrier can be obtained by squaring, regardless of whether or not the modulating P code is encrypted. However, the squaring the signal also squares the noise component of the signal. The resulting SNR is seriously degraded (by 30 dB or more) as compared with the ratio for the carrier recovered by correlation. Moreover, squaring provides the half-wavelength carrier phase which is different from the L2 real wavelength carrier phase.

The variation of the squaring technique is proposed by Counselman III in U.S. Pat. No. 4,667,203, wherein the incoming signal is divided into upper and lower sidebands, which are multiplied together to obtain the second harmonic of the carrier signal. However, the degradation of the SNR is the same as with squaring the entire signal.

U.S. Pat. No. 4,972,431 issued to Keegan, discloses a different approach to the quasi-demodulation of the L2 signal. The incoming encrypted P-code GPS signal is not immediately squared. Instead, after mixing with a local oscillator signal to lower its frequency to an intermediate frequency, the encrypted P-code signal is correlated with a locally generated P-code signal. Since the locally generated P-code signal does not perfectly match the encrypted P-code sequence, the correlation does not produce a sharp peak in the frequency spectrum. The result of the correlation is filtered by a bandpass filter, and the reduced-bandwidth signal is squared. The squared signal is processed in a delay lock code loop to maximize the spectral peak. An error signal is generated and is fed back to control the generator of P code signal as to maximize the peak in the frequency spectrum of the output signal and to effectively lock onto the incoming L2 P code signal. Simultaneously, the second harmonic of the suppressed carrier signal resulting from the squaring process is processed to provide L2 carrier phase measurements. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve carrier integer ambiguities.

In U.S. Pat. No. 5,293,170 issued to Lorenz, the integration of the L1 and L2 signals after demodulation by locally generated carrier and P-code signals, is repetitively accomplished over a duration that is estimated to be the period of the modulation code. And further, the modulated code period is estimated to be an integer multiple of P chips. The invention assumes the knowledge of the timing of the unknown W-code, however, such W-code timing information is not available to the commercial user and cannot be recovered without knowledge of the classified W-code information.

What is needed is a SPS receiver capable of achieving an optimally high L2 SNR on every satellite without requiring detailed knowledge of the secret W code structure. This can be done by observing the GPS satellites and discovering general W code structure information which is always present on every satellite observed and subsequently optimizing the SPS receiver design to these characteristics. This general structure being present on all satellites ensures that the SPS receiver design presented here will operate similarly and optimally for all satellites tracked.

SUMMARY

The present invention is unique because it allows the design of a high SNR SPS receiver capable of processing the satellite signals with an unknown W-code without making any assumptions about the W-code timing information.

One aspect of the present invention is directed to a system for optimum correlation processing of L1 and L2 signals received from a SPS satellite by a SPS RECEIVER. The system comprises: (A) a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and (B) at least one DIGITAL CHANNEL PROCESSING MEANS for: (1) locally generating replica of the C/A code modulated on the L1 carrier frequency signal; (2) locally generating replica of the P code modulated on L1 carrier frequency signal, wherein the locally generated replica of L1 signal does not contain propagation noise; (3) locally generating replica of the P code modulated on L2 carrier frequency signal, wherein the locally generated replica of L2 signal does not contain propagation noise; (4) extracting of an estimate of the Y code from the L1 signal, and from the L2 signal, wherein the estimate signals contain propagation noise; (5) correlating a locally generated replica of C/A code with the received L1 code for obtaining an estimate of L1 group delay ( L1 pseudorange) and L1 carrier phase; (6) removing the P code from the locally extracted estimate of the L1 Y code to obtain a locally extracted estimate of the L1 W code; (7) removing the P code from the locally extracted estimate of the L2 Y code to obtain a locally extracted estimate of the L2 W code; (8) integrating estimate of the L1 W-code across the period of $T_0$, wherein the period $T_0$ is equal to the inverse zero-frequency $1/F_0$ of the W-code energy spectrum, and wherein the zero-frequency $F_0$ is the first frequency at which the W-code energy spectrum is equal to zero, and wherein the L1 W-code is synchronized and not shifted in time in respect to the signal C/A code EPOCH 1; (9) integrating estimate of the L2 W-code estimate across the period of $T_0$, wherein the L2 W-code is synchronized and not shifted in time in respect to the signal C/A code EPOCH 2; and (10) multiplying the integrated estimates of L1 W-code with the integrated early, late, and punctual estimates of L2 W-code over a time period greater than a msec to ensure that the resulting correlated signal has a sufficient power for closing the L2-code and L2-carrier tracking loops.

In another embodiment the L1 W code is not synchronized to the signal C/A EPOCH 1, and the L2 W code signal is not synchronized to the signal C/A EPOCH 2. In one more embodiment, the L1 W-code is synchronized and shifted in time in respect to the signal C/A code EPOCH 1, and the L2 W- code is synchronized and shifted in time in respect to the signal C/A code EPOCH 2.

The RECEIVING MEANS further comprises a dual frequency patch ANTENNA for receiving the L1 and L2 satellite signals; a FILTER/LNA conductively connected to the ANTENNA for performing filtering and low noise amplification of the L1 and L2 signals, wherein the FILTER/LNA determines the signal/noise ratio (SNR) of the received signals L1 and L2; a DOWNCONVERTER conductively connected to the FILTER/LNA for mixing and converting the L1 and L2 signals; and an IF PROCESSOR conductively connected to the DOWNCONVERTER for transforming the converted L1 and L2 signals into digitally sampled quadrature versions of L1 and L2 signals (IL1, QL1, IL2, QL2). The system further comprises a MASTER OSCILLATOR and a FREQUENCY SYNTHESIZER for generating several timing signals.

The FILTER/LNA further includes a POWER SPLITTER for power splitting a single L1/L2 signal received by the ANTENNA into two separate L1 and L2 signals; two separate BANDPASS FILTERs connected to the POWER SPLITTER for filtering the L1 and L2 signals independently; and a POWER COMBINER for power combining the L1 and L2 signals into one combined signal L1/L2 before feeding the combined L1/L2 signal into the LNA. The LNA outputs amplified and filtered combined L1/L2 signal.

The FREQUENCY SYNTHESIZER further comprises a PHASE DETECTOR for comparing phases of two signals, wherein the first signal is an output signal from the MASTER OSCILLATOR, and wherein the second signal is generated by the FREQUENCY SYNTHESIZER, and wherein minimum voltage output signal from the PHASE DETECTOR represents the maximum phase alignment of the two signals. The FREQUENCY SYNTHESIZER further includes a LOOP FILTER for filtering out high frequency voltage noise, wherein an output LOOP FILTER voltage signal includes a low frequency voltage noise. A VOLTAGE CONTROLLED OSCILLATOR (VCO) is connected to the LOOP FILTER, wherein a voltage signal at the input of the VCO causes frequency change in the VCO output signal, and wherein the VCO nominal output signal is locked to the reference signal; and wherein the VCO nominal output signal is used as 1st local oscillator (LO1) signal. A first DIVIDER MEANS is connected to the VCO for dividing the VCO output signal to obtain the 2nd local oscillator (LO2) signal. A second DIVIDER connected to the first DIVIDER MEANS divides the 2nd LO2 signal to obtain the sampling clock (SCLK). Finally, a third DIVIDER is connected to the second DIVIDER for dividing the 2nd LO2 signal and for obtaining the signal MSEC used for measurement of local reference time.

The DIGITAL CHANNEL PROCESSING MEANS further comprises an L1 TRACKER for tracking L1 C/A code when encryption is ON and for tracking L1 P code when encryption is OFF; an L2 TRACKER connected to the L1 TRACKER for tracking an optimized enhanced cross-correlated W code when encryption is ON and for tracking L2 P code when encryption is OFF; and a MICROPRO- CESSOR SYSTEM connected to the L1 TRACKER and to the L2 TRACKER. The L1 TRACKER is fed by digitized inphase IL1 and quadrature QL1 of L1 signal outputted by the IF PROCESSOR. The L2 TRACKER is fed by digitized inphase I and quadrature Q components of L2 signal outputted by the IF PROCESSOR MEANS. Both the L1 TRACKER and the L2 TRACKER are synchronously clocked by SCLK signal and are synchronously referenced by MSEC signal to local reference time. The L2 TRACKER MEANS is fed from the L1 TRACKER MEANS by $\Sigma W_{L1}$ signal.

The L1 TRACKER for optimized enhanced cross correlation further comprises a CODE GENERATOR 1 for providing a locally generated replica of C/A code, and for providing a locally generated replica of P code; a MULTIPLEXER 1 for selecting a locally generated code C/A when Y code is ON and for selecting a locally generated P code when Y code is OFF, a carrier numerically controlled oscillator (CARRIER NCO MEANS 1); a CARRIER MIXER MEANS 1 for multiplying outputted by the IF PROCESSOR digitized inphase IL1 and Q L1 signals having carrier frequency with outputted by the CARRIER NCO 1 inphase and quadrature components of digital carrier; wherein the CARRIER MIXER MEANS 1 outputs inphase I and quadrature Q signals having zero carrier frequency. A CODE MIXER 1 is connected to the CARRIER MIXER 1 and to the MULTIPLEXER 1 for code correlating the CARRIER MIXER 1 output signals with the locally generated replica of C/A code or P-code. When the L1 TRACKER's carrier tracking loop is closed via the CARRIER NCO 1 the input to the CODE MIXER 1 represents the satellite signal L1 C/A code, wherein the CODE MIXER 1 performs the code correlation at 3 time points (early, punctual and late) on the autocorrelation function graph creating an early, a punctual and a late sample of the autocorrelation function.

The LI TRACKER further includes a block CORRELATORS 1 connected to the CODE MIXER 1 for integrating the early, punctual and late samples of the autocorrelation function over an integer multiple of EPOCH 1 signals; wherein the CORRELATORS 1 output signal is fed to the MICROPROCESSOR SYSTEM at a rate of L1 C/A code EPOCH 1, and wherein the MICROPROCESSOR uses the CORRELATORS 1 output signal to develop feedback signals for the L1 carrier tracking loop and for the L1 code tracking loop. A code numerically controlled oscillator (CODE NCO 1) connected to the CODE GENERATOR 1 provides a signal at the P-code rate for driving the CODE GENERATOR 1. The CODE NCO 1 also provides a mechanism for aligning the locally generated replica of C/A code or P-code with the incoming satellite C/A code or P-code. A CARRIER MIXER 1 generates in its Q channel an estimate of L1 Y code as an input to the CODE MIXER 2 when the L1 TRACKER is tracking L1 C/A code. A CODE GENERATOR 1 outputs a local replica of known L1 P code as an input to the CODE MIXER 2. The CODE MIXER 2 removes the known L1 P code from the estimate of L1 Y code and outputs an estimate of L1 W code. The estimate of L1 W code is accumulated by a DIGITAL SUMMER 1 over periods given by a W SYNC 1 signal outputted by the CODE GENERATOR 1. The DIGITAL SUMMER 1 outputs a $\Sigma W_{L1}$ signal for further processing by the L2 TRACKER MEANS block, wherein the $\Sigma W_{L1}$ signal represents a series of accumulated L1 W code at the rate of the W SYNC 1 signal.

In the preferred embodiment, the W SYNC 1 signal represents a period of 22 L1 P(Y) code clocks, and the W SYNC 1 signal is synchronized with the L1 C/A code EPOCH 1 signal.

The CODE GENERATOR 1 further comprises: (1) a first DIVIDING MEANS for dividing an input signal from the CODE NCO 1 to provide a C/A CODE GENERATOR clock signal; (2) a C/A CODE GENERATOR MEANS connected to the first DIVIDING MEANS for generating the C/A code signal and the EPOCH 1 signal under the CONTROL signal of the MICROPROCESSOR, wherein the C/A code signal is the locally generated C/A code, and wherein the EPOCH 1 signal is the repetition rate of the C/A code, and wherein the C/A CODE GENERATOR can be adjusted under CONTROL signal to generate a particular satellite's C/A code; (3) a P CODE GENERATOR connected to the CODE NCO 1, wherein the P CODE GENERATOR is clocked by the CODE NCO 1 signal under the CONTROL signal of the MICROPROCESSOR, and wherein the P CODE GENERATOR generates a P-code signal, and wherein the P CODE GENERATOR can be adjusted under CONTROL signal to generate a particular satellite's P code; (4) a DIVIDE BY N block connected to the C/A CODE GENERATOR, wherein the EPOCH 1 signal is used to reset the DIVIDE BY N block; and (5) a DELAY BY $\tau$ block connected to the DIVIDE BY N block for generating the W SYNC 1 signal, wherein the W SYNC 1 signal is used as the L1 W code estimate timing signal.

In the preferred embodiment, the DIVIDE BY N block comprises a DIVIDE BY 22 block, and the first DIVIDING MEANS comprises a DIVIDE BY 10 block, and the $\tau$ delay is equal to zero.

The DIGITAL SUMMER 1 further comprises a DIGITAL SUMMER ACCUMULATOR block accumulating the L1 W code over the period of W SYNC 1 signal and outputting an $\Sigma W_{L1}$ signal equal to an $\Sigma(L1W)$ code accumulation during said W SYNC 1 period.

The L2 TRACKER MEANS further comprises a carrier numerically controlled oscillator (CARRIER NCO MEANS 2); a CARRIER MIXER MEANS 2 connected to the CARRIER NCO MEANS 2 for mixing outputted by the IF PROCESSOR MEANS digitized inphase I L2 and Q L2 signals having carrier frequency with outputted by the CARRIER NCO MEANS 2 inphase and quadrature components of digital carrier. The CARRIER MIXER 2 outputs inphase I L2 and quadrature Q L2 signals having zero carrier frequency. When the L2 TRACKER is locked onto the L2 signal, the I output of the CARRIER MIXER 2 represents an estimate of L2 Y code, and the Q output of the CARRIER MIXER 2 contains no signal power.

A CODE NCO 2 is controlled by the L2 code tracking loop. A CODE GENERATOR 2 is connected to the CODE NCO 2, wherein the CODE NCO 2 drives the CODE GENERATOR 2 to produce a locally generated P code which is aligned with the incoming L2 satellite signal. A CODE MIXER 3 is connected to the CARRIER MIXER 2 and is connected to the CODE GENERATOR 2 for code correlating I and Q signals outputted by the CARRIER MIXER 2 with the P code outputted by the CODE GENERATOR 2. The CODE MIXER 3 removes P code from L2 Y code and develops six outputs $(I_E;I_P;I_L;Q_E;Q_P;Q_L)$ which are correlations of I and Q signals outputted by the CARRIER MIXER 2 with P code outputted by the CODE GENERATOR 2 at three time points (early, punctual, and late); and wherein when the encryption is off these six outputs $(I_E;I_P;I_L;Q_E;Q_P;Q_L)$ are used for closing the L2 code and carrier tracking loops. A DIGITAL SUMMER 2 accumulates six signals $(I_E;I_P;I_L;Q_E;Q_P;Q_L)$ outputted by the CODE MIXER 3 across a period defined by a W SYNC 2$a$ signal, wherein the W SYNC 2$a$ signal is outputted by the CODE GENERATOR 2. The DIGITAL SUMMER 2 outputs accumulations of six signals ($\Sigma I_E$; $\Sigma I_P$; $\Sigma I_L$; $\Sigma Q_E$; $\Sigma Q_P$; $\Sigma Q_L$) at a rate of the W SYNC 2a signal at different time points (early, punctual, and late) on the autocorrelation function of the incoming P(Y) code and the local P code generated by the CODE GENERATOR 2. A CODE MIXER 4 is connected to the DIGITAL SUMMER 2 for correlating six ($\Sigma I_E$; $\Sigma I_P$; $\Sigma I_L$; $\Sigma Q_E$; $\Sigma Q_P$; $\Sigma Q_L$) signals outputted by the DIGITAL SUMMER 2 with the $\Sigma W_{L1}$ signal outputted by the DIGITAL SUMMER 1; and wherein the CODE MIXER 4 performs the code correlation at 3 time points (early, punctual and late) on the autocorrelation function graph creating an early, a punctual and a late sample of the autocorrelation function.

The L2 TRACKER further includes a MULTIPLEXER 2. The MULTIPLEXER 2 selects under the control of the MICROPROCESSOR L2 P code correlation when the satellite is not encrypted, and optimal digital bandwidth compression L2 tracking when the satellite is encrypted. When the satellite is not encrypted the MICROPROCESSOR selects the output of CODE MIXER 3; and wherein when the satellite is encrypted the MICROPROCESSOR selects the output of CODE MIXER 4. A block CORRELATORS 2 is connected to the MULTIPLEXER 2 for integrating the early, punctual and late samples of the autocorrelation function. The CORRELATORS 2 accumulates correlations at a rate of SCLK if the satellite is not encrypted and a rate of W SYNC 2b if the satellite is encrypted. The output signal of the CORRELATORS 2 is fed to the MICROPROCESSOR SYSTEM at a rate of EPOCH 2. The MICROPROCESSOR SYSTEM uses the CORRELATORS 2 output signal to develop feedback signals for the L2 carrier tracking loop and for the L2 code tracking loop.

In the preferred embodiment, the W SYNC 2a signal represents an L2 P code clock divided by 22, and the W SYNC 2a signal is synchronized with the L2 C/A code EPOCH 2 signal.

The CODE GENERATOR 2 further comprises: (1) a first DIVIDING MEANS for dividing an input signal from the CODE NCO 2 to provide a C/A CODE GENERATOR clock signal; (2) a C/A CODE GENERATOR connected to the first DIVIDING MEANS for generating the EPOCH 2 signal under the CONTROL signal of the MICROPROCESSOR, and wherein the EPOCH 2 signal is used as one of the CORRELATORS 2 block control signals; (3) a P CODE GENERATOR connected to the CODE NCO 2, wherein the P CODE GENERATOR is clocked by the CODE NCO 2 signal under the CONTROL signal of the MICROPROCESSOR, and wherein the P CODE GENERATOR generates the P-code signal, and wherein the P CODE GENERATOR can be adjusted under CONTROL signal to generate a particular satellite's P code; (4) a DIVIDE BY N block connected to the C/A CODE GENERATOR, wherein the EPOCH 2 signal is used to reset the DIVIDE BY N block; and (5) a DELAY BY $\tau$ block connected to the DIVIDE BY N block for outputting the W SYNC 2a signal and the W SYNC 2b signal, wherein the W SYNC 2a and W SYNC 2b signals are synchronized to the estimate of the L2 W code.

In the preferred embodiment, the DIVIDE BY N block comprises a DIVIDE BY 22 block, and the first DIVIDING MEANS comprises a DIVIDE BY 10 block, and the $\tau$ delay is equal to zero.

The DIGITAL SUMMER 2 further comprises: a DIGITAL SUMMER ACCUMULATOR 1 block accumulating the I component of L2 W code early estimate $I_E$ over the period of W SYNC 2a signal and outputting an $\Sigma I_E$ accumulation every W SYNC 2a period; a DIGITAL SUMMER ACCUMULATOR 2 block accumulating the I component of L2 W code punctual estimate $I_P$ over the period of W SYNC 2a signal and outputting an $\Sigma I_P$ accumulation every W SYNC 2a period; a DIGITAL SUMMER ACCUMULATOR 3 block accumulating the I component of L2 W code late estimate $I_L$ over the period of W SYNC 2a signal and outputting an $\Sigma I_L$ accumulation every W SYNC 2a period; a DIGITAL SUMMER ACCUMULATOR 4 block accumulating the Q component of L2 W code early estimate $Q_E$ over the period of W SYNC 2a signal and outputting an accumulation every W SYNC 2a period; a DIGITAL SUMMER ACCUMULATOR 5 block accumulating the Q component of L2 W code punctual estimate $Q_P$ over the period of W SYNC 2a signal and outputting an $\Sigma Q_P$ accumulation every W SYNC 2a period; and a DIGITAL SUMMER ACCUMULATOR 6 block accumulating the Q component of L2 W code late estimate $Q_L$ over the period of W SYNC 2a signal and outputting an accumulation every W SYNC 2a period. The DIGITAL SUMMER ACCUMULATOR (as applied to DIGITAL SUMMER 1) takes as an input signal the L1 W code, accumulates the L1 W code every SCLK edge over the period of W SYNC 1 signal, and outputs an $\Sigma W_{L1}$ signal equal to an $\Sigma(L1W)$ code accumulation during W SYNC 1 period. The DIGITAL SUMMER 2 also uses the DIGITAL SUMMER ACCUMULATOR in the similar manner.

Another aspect of the present invention is directed to a method for optimum correlation processing of L1 and L2 signals received from a SPS satellite by a correlation processing system. The correlation processing system comprises a RECEIVING MEANS and at least one DIGITAL CHANNEL PROCESSING MEANS. The method comprises the steps of: (1) providing the RECEIVING MEANS and at least one DIGITAL CHANNEL PROCESSING MEANS; (2) receiving a known C/A code modulated on L1 carrier frequency, an unknown Y code modulated on L1 carrier frequency signal, an unknown Y code modulated on L2 carrier frequency signal by the RECEIVING MEANS; wherein the received L1, and L2 signals contain propagation noise; and wherein the Y code comprises a known P code and an unknown W code; (3) generating local replica of the C/A code modulated on L1 carrier frequency signal by each DIGITAL CHANNEL PROCESSING MEANS; (4) generating local replica of the P code modulated on L1 carrier frequency signal by each DIGITAL CHANNEL PROCESSING MEANS; wherein the locally generated replica of L1 signal does not contain propagation noise; (5) generating local replica of the P code modulated on L2 carrier frequency signal by each DIGITAL CHANNEL PROCESSING MEANS; wherein the locally generated replica of L2 signal does not contain propagation noise; (6) extracting of an estimate of the Y code from the L1 signal, and from the L2 signal by each DIGITAL CHANNEL PROCESSING MEANS; wherein the estimate signals contain propagation noise; (7) correlating a locally generated replica of C/A code with the received L1 code for obtaining an estimate of L1 group delay (L1 pseudo-range) and L1 carrier phase; (8) removing the P code from the locally extracted estimate of the L1 Y code by each DIGITAL CHANNEL PROCESSOR to obtain a locally extracted estimate of the L1 W code; (9) removing the P code from the locally extracted estimate of The L2 Y code by each DIGITAL CHANNEL PROCESSOR MEANS to obtain a locally extracted estimate of the L2 W code; (10) synchronizing the L1 W-code in respect to the signal C/A code EPOCH 1; (11) shifting in time the L1 W-code in respect to the signal C/A code EPOCH 1; (12) integrating the estimate of the L1 W-code across the period of $T_0$, wherein the period $T_0$ is equal to the inverse zero-frequency $1/F_0$ of the W-code energy spectrum, and wherein the zero-frequency $F_0$ is the first frequency at which the W-code energy spectrum is equal to zero; (13) synchronizing the L2 W-code in respect to the signal C/A code EPOCH 2; (14) shifting in time the L2 W-code in respect to the signal C/A code EPOCH 2; (15) integrating the estimate of L2 W-code across the period of $T_0$; and (16) multiplying the integrated estimates of L1 W-code with the integrated early, late, and punctual estimates of L2 W-code over a time period greater than a msec to ensure that the resulting correlated signal has a sufficient power for closing the L2-code and L2-carrier tracking loops.

In the preferred embodiment, the shift in time of the L1 W code in respect to the EPOCH 1 is equal to zero, and the shift in time of the L2 W code in respect to the EPOCH 2 is equal to zero.

In another embodiment, the L1 W code is not synchronized in respect to the EPOCH 1 signal, and the L2 W code is not synchronized in respect to the EPOCH 2 signal.

Yet, one more aspect of the present invention is directed to a method of acquisition of an L1 and an L2 satellite signals by an OPTIMIZED SATELLITE RECEIVER; wherein the OPTIMIZED SATELLITE RECEIVER comprises a L1 TRACKER MEANS, a L2 TRACKER MEANS, and a MICROPROCESSOR SYSTEM; and wherein the L1 TRACKER MEANS comprises a MULTIPLEXER MEANS 1, a CARRIER NCO MEANS 1, a CARRIER MIXER MEANS 1, a CODE GENERATOR 1 MEANS, a CODE MIXER MEANS 1, a CODE NCO MEANS 1, a CODE MIXER MEANS 2, a DIGITAL SUMMER 1, and a CORRELATORS 1; and wherein the L2 TRACKER comprises a CODE GENERATOR MEANS 2, a CARRIER NCO MEANS 2, a CARRIER MIXER MEANS 2, a CODE NCO MEANS 2, a CODE MIXER MEANS 3, a CODE MIXER MEANS 4, a DIGITAL SUMMER 2, a MULTIPLEXER 2, and a block CORRELATORS MEANS 2. The method comprises the steps of: (1) locking L1 C/A code tracking loop by the MICROPROCESSOR SYSTEM; (2) locking L1 C/A carrier tracking loop by the MICROPROCESSOR SYSTEM; (3) computing the L2 carrier frequency aiding term by the MICROPROCESSOR SYSTEM using the value of L1 frequency; (4) applying the L2 frequency aiding term to the CARRIER NCO MEANS 2; wherein the L1 and L2 satellite signals are separated in time by ionospheric delay; (5) setting up a P CODE GENERATOR in the CODE GENERATOR 1 and in the CODE GENERATOR 2; (6) adjusting the CODE NCO 2 phase to compensate for the ionospheric delay between the L1 and the L2 signals until power is found in the L2 CORRELATORS MEANS 2; (7) locking the L2 carrier tracking loop using the MICROPROCESSOR SYSTEM; and (8) locking the L2 code tracking loop using the MICROPROCESSOR SYSTEM.

Yet another aspect of the present invention is directed to a method of tracking the L1 and L2 satellite signals. The method comprises the steps of: (1) reading the L1 CORRELATORS MEANS and the L2 CORRELATORS MEANS by the MICROPROCESSOR MEANS; (2) forming the L1 code tracking loop and applying the output to the CODE NCO 1 MEANS; (3) forming the L1 carrier tracking loop and applying the output to the CARRIER NCO MEANS 1; (4) computing the L2 frequency aiding term; (5) forming the L2 code tracking loop and applying the output to the CODE NCO MEANS 2; (6) forming the L2 carrier tracking loop and applying the output to the CARRIER NCO MEANS 2; (7) performing the L1 and L2 carrier phase measurements by reading CARRIER NCO MEANS 1's output phase and CARRIER NCO MEANS 2's output phase at a chosen MSEC reference time; and (8) performing the L1 and L2 code phase measurements by keeping track in the MICROPROCESSOR MEANS of what shifts have been applied to the CODE NCO MEANS 1 and CODE NCO MEANS 2 respectively; whereby the tracking of the satellite signals L1 and a L2 is achieved.

BRIEF DESCRIPTION OF THE DRAWINGS.

FIG. 1 illustrates a simplified block-diagram of the GPS RECEIVER having two major parts—a RECEIVER and a DIGITAL CHANNEL PROCESSOR.

FIG. 2 shows a FILTER/low noise amplifier LNA for filtering and amplifying L1 and L2 signals.

FIG. 3 depicts a MASTER OSCILLATOR for generating timing signals with reference frequency 10 MHz and 5 MHz.

FIG. 4 illustrates a FREQUENCY SYNTHESIZER for outputting a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

FIG. 5 shows a DOWNCONVERTER for converting an L1 signal into a 175.42 MHz signal and for converting an L2 signal into a 172.4 MHz signal.

FIG. 6 is an illustration of an IF (intermediate frequency) PROCESSOR for generating digitized output samples of the GPS signals with carrier frequencies of 420 KHz and 2.6 MHz respectively.

FIG. 7 depicts a DIGITAL CHANNEL PROCESSOR including an L1 TRACKER, an L2 TRACKER, and a MICROPROCESSOR SYSTEM.

FIG. 8 shows an L1 TRACKER for (optimized enhanced cross correlation.)

FIG. 9 illustrates an L2 TRACKER for (optimized enhanced cross correlation.)

FIG. 10a is a depiction of a first CARRIER NCO 1 for performing the tracking and carrier phase measurements of the L1 signal.

FIG. 10b is an illustration of a second CARRIER NCO 2 for performing the tracking and carrier phase measurements of the L2 signal.

FIG. 11a shows a first CARRIER MIXER 1 for mixing the sampled signal L1 at 420 kHz frequency to 0 HZ frequency.

FIG. 11b illustrates a second CARRIER MIXER 2 for mixing the sampled signals L2 at 2.6 MHz frequency to 0 HZ frequency.

FIG. 12a depicts a first CODE MIXER 1 for correlating the L1 signal with a locally generated code (either C/A or P-code).

FIG. 12b is an illustration of a second CODE MIXER 2 for mixing the L1 Y code with a locally generated version of the P code.

FIG. 12c is a depiction of a third CODE MIXER 3 for removing the P code from the L2 Y-code and for providing for the L2 code tracking mechanism.

FIG. 12d shows a fourth CODE MIXER 4 for mixing the estimated L2 W code accumulated across the period of W SYNC 2a signal with the estimated L1 W code accumulated across the period of W SYNC 1 signal.

FIG. 13a depicts a CODE GENERATOR 1 for generating a local C/A code, a P-code, and a W SYNC 1 signal.

FIG. 13b is a depiction of a CODE GENERATOR 2 which locally generates a P-code, a W SYNC 2a, and W SYNC 2b signals, wherein the P code is aligned with the incoming L2 satellite signal.

FIG. 13c illustrates a W SYNC 1, a W SYNC 2a, and W SYNC 2b waveforms.

FIG. 14b shows a block CORRELATORS 2 for accumulating correlations at a rate of SCLK if the satellite is not encrypted and a rate W SYNC 2b if encrypted.

FIG. 15 illustrates a CODE NCO (1 and 2) for providing a clock that drives the CODE GENERATOR (1 and 2 respectively).

FIG. 16a is a depiction of a DIGITAL SUMMER 1 for accumulating L1 W code estimates over periods given by W SYNC 1.

FIG. 16b is an illustration of a DIGITAL SUMMER 2 for accumulating the output of CODE MIXER 3 across a period defined by W SYNC 2a.

FIG. 16c shows a DIGITAL SUMMER ACCUMULATOR that takes the estimated L1 W code samples and accumulates them every SCLK edge for a period given by input W SYNC 1.

FIG. 17a depicts an ACQUISITION block diagram illustrating the signal acquisition phase of the MICROPROCESSOR SYSTEM.

FIG. 17b shows a TRACKING block diagram illustrating the signal tracking phase of the MICROPROCESSOR SYSTEM.

FIG. 18a illustrates a W code profile in frequency domain.

FIG. 18b shows a W code profile in time domain.

FIG. 19a depicts an observed W code profile in frequency domain.

FIG. 19b is an illustration of an observed W code profile in time domain.

FULL DESCRIPTION OF THE PREFERRED EMBODIMENT

Figure 14A:
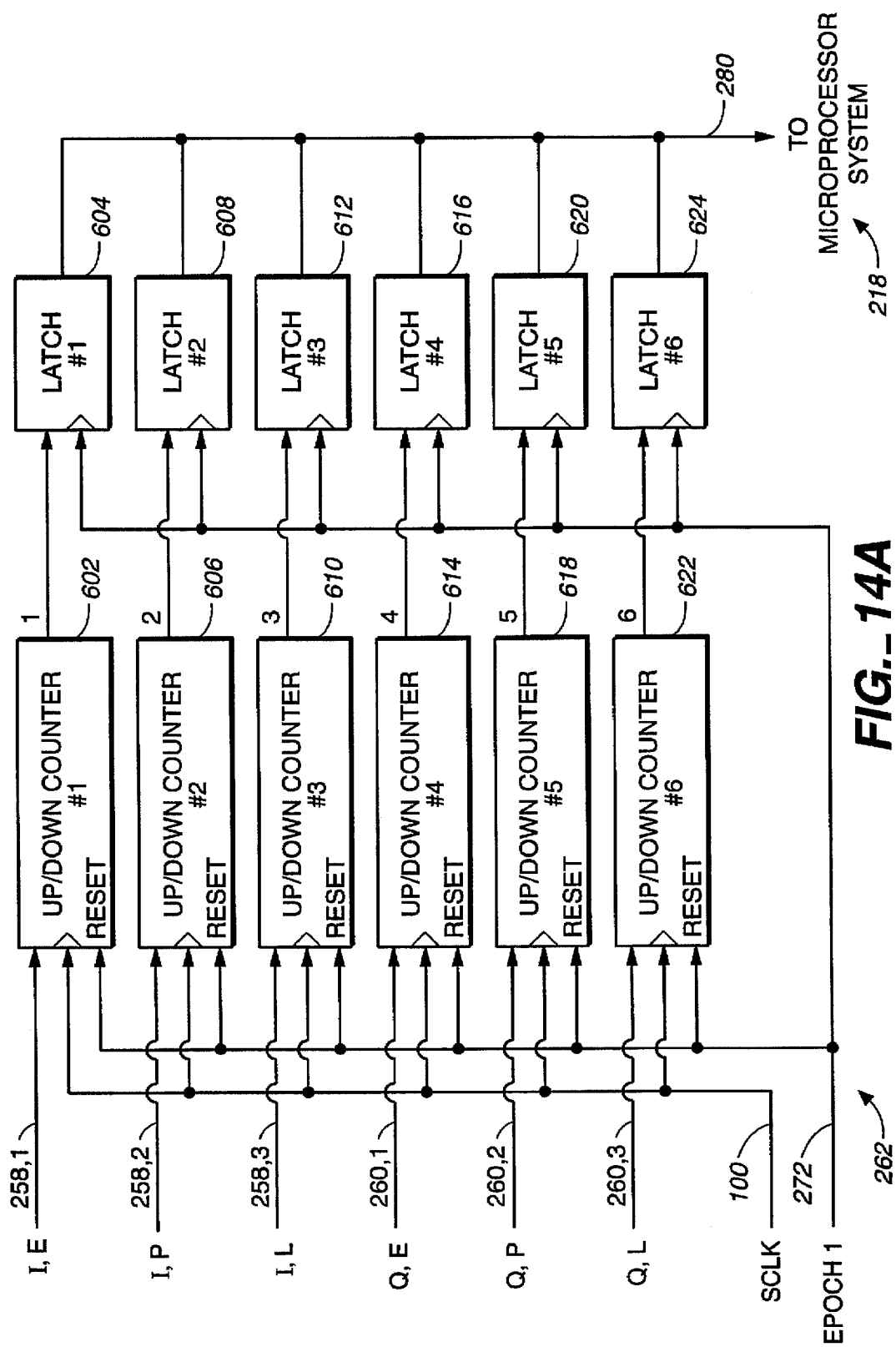
FIG. 14a depicts a block CORRELATORS 1 for integrating the early, punctual and late samples of the autocorrelation function of the L1 C/A code (or L1 P code) signal over the period of the L1 C/A EPOCH 1 signal.

FIG. 1 illustrates a block diagram 10 of the GPS RECEIVER capable of demodulating the satellite signals modulated by the secret W code. Each satellite generates different signals and they are processed by different DIGITAL CHANNEL PROCESSORS, which operate exactly the same way.

FIG. 1 is an overview of the GPS receiver, all elements of which are explained in detail below. The GPS signals (L1=1575.42 MHz, L2=1227.60 MHz) enter through a dual frequency patch ANTENNA 12. The GPS ANTENNA may be a magnetically mountable model 21423-00 commercially available from Trimble Navigation of Sunnyvale, Calif. The MASTER OSCILLATOR 28 provides the reference oscillator which drives all other clocks in the system. The FREQUENCY SYNTHESIZER 18 takes the output of the MASTER OSCILLATOR and generates important clock and local oscillator frequencies used throughout the system.

A FILTER/LNA 14 performs filtering and low noise amplification of both L1 and L2 signals. The noise figure of the RECEIVER system is dictated by the performance of the FILTER/LNA combination. The DOWNCONVERTER 16 mixes both L1 and L2 signals in frequency down to approximately 175 MHz and outputs the analogue L1 and L2 signals into an IF PROCESSOR 30. The IF PROCESSOR takes the analog L1 and L2 signals at approximately 175 MHz and converts them into the digitally sampled L1 and L2 inphase and quadrature signals at carrier frequencies 420 KHz for L1 and at 2.6 MHz for L2 signals respectively.

At least one DIGITAL CHANNEL PROCESSORS 32 input the digitally sampled L1 and L2 inphase and quadrature signals. All DIGITAL CHANNEL processors are identical by design and operate on identical input samples. Each DIGITAL CHANNEL PROCESSOR is designed to digitally track the L1 and L2 signals produced by one satellite by tracking code and carrier signals and to perform code and carrier phase measurements in conjunction with the MICROPROCESSOR SYSTEM 34. One DIGITAL CHANNEL PROCESSOR is capable of tracking one satellite in both L1 and L2 channels. MICROPROCESSOR SYSTEM is a general purpose computing device which facilitates tracking and measurements processes, providing pseudorange and carrier phase measurements for a NAVIGATION PROCESSOR 38. The NAVIGATION PROCESSOR performs the higher level function of combining measurements in such a way as to produce position, velocity and time information for the differential and surveying functions.

The present invention provides for the independent estimate of pseudorange of L2 signal by moving the locally generated L2 P code in time with respect to incoming L2 Y code signal. L1 signal provides for the local estimate of W code but is not used for purposes of computation of pseudorange of L2 signal. L1 signal is used only for correlation purposes.

FIG. 2 shows the detailed embodiment of the FILTER/LNA 40. The L1/L2 signal from the ANTENNA 12 is power split by POWERSPLITTER 44 into L1=1575.42 MHz signal 46 and L2=1227.60 MHz signal 48. The L1 and L2 signals are separately bandpass filtered by the BANDPASS FILTERs 50 and 52 with bandwidth BW=30 MHz. Filtered L1 signal 54 and L2 signal 56 are recombined in a POWER COMBINER 58 before being fed into the low noise amplifier LNA 60. The output signal 62 represents filtered and amplified L1/L2 signal at 1575.42 MHz and 1227.60 MHz respectively.

The MASTER OSCILLATOR 70 is depicted in FIG. 3. The 5 MHz signal 76 is obtained by dividing the 10 MHz oscillator output signal 72 by 2 in the DIVIDE BY 2 block 74.

FIG. 4 illustrates the FREQUENCY SYNTHESIZER 80 which takes as an input the 5 MHz signal 82 provided by the MASTER OSCILLATOR and outputs a 1st LO1 signal 90, a 2nd LO2 signal 102, a SCLK signal 100, and a MSEC signal 104; wherein these timing signals are used by different blocks of the GPS RECEIVER.

The 5 MHz signal 82 is compared with the 5 MHz signal output from a block "DIVIDE BY 5" in a PHASE DETECTOR 84. The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER 86 filters out the high frequency voltage noise signal having a large phase error and outputs the low frequency noise signal 87 having a small phase error which is applied to a voltage controlled oscillator (VCO) 88. The low frequency noise signal 87 causes frequency change in the VCO output signal 90. When the loop is locked, the VCO output signal having a 1400 MHz frequency is used as the 1st LO1 (local oscillator) signal. By dividing the 1st LO1 signal by 8, a block 92 "DIVIDE BY 8" outputs the 2nd LO2 local oscillator signal 102 having 175 MHz. A block 94 "DIVIDE BY 7" divides the LO2 signal and outputs the sampling clock (SCLK) signal 100 having 25 MHz. A block 98 "DIVIDE BY 25000" further divides the SCLK signal and outputs the MSEC signal 104 having 1 KHz which is used by the system for measurement of local reference time. A "DIVIDE BY 5" block 96 is used to close the LO1 loop.

The DOWNCONVERTER 110 is depicted in detail in FIG. 5 which decreases the frequency of the L1/L2 signal outputted by the FILTER/LNA. The L1/L2 signal output 62 from the FILTER/LNA shown in FIG. 2 (L1=1575.42 MHz; L2=1227.60 MHz) is split in a POWER SPLITTER 116 into two signals L1 signal 118 and L2 signal 120. The L1 and L2 signals are mixed separately by the 1st LO1 1400 MHz signal 90 ( outputted by the FREQUENCY SYNTHESIZER in FIG. 4) in the MIXERs 122 and 124. The L1 signal 118 after mixing becomes an L1 signal 123 signal having 175.42 MHz frequency=(1575.42−1400) MHz which is bandpass filtered by the BANDPASS FILTER 126 having a bandwidth BW=30 MHz. This operation results in a L1 signal having a BW=30 MHz. Similarly, the L2 signal after being mixed in the BANDPASS FILTER 128 with BW=30 MHz becomes an L2 signal 132 having 172.40 MHz frequency and BW=30 MHz. The AMPLIFIERs 134 and 136 respectively amplify the L1 signal 130 and L2 signal 132 and output L1 signal 138 and L2 signal 140.

FIG. 6 describes an IF (intermediate frequency) PROCESSOR 150 which has as input signals the L1 (175.42 MHz) signal 138 and the L2 (172.4 MHz) signal 140 outputted by the DOWNCONVERTER 110. (See FIG. 5). The IF PROCESSOR also uses the 2nd LO2 signal 102 and the SCLK signal 100 outputted by the FREQUENCY SYNTHESIZER 80 (see FIG. 4) as its timing signals. The POWERSPLITTERs 142 and 170 split the L1 and the L2 signals into two L1 and L2 signals respectively. The inphase (I) version 102 of the 2nd LO2 signal and generated by a 171 block 90° the quadrature (Q) version 175 of the 2nd LO2 signal (175 MHz) are multiplied by the L1 signal in the MULTIPLIERs 144, and 146 to produce the inphase version IL1 and the quadrature version QL1 of the L1 signal at frequency 420 KHz=175.42 MHz−175 MHz and at 25 MHz sampling rate. Similarly, the inphase IL2 and the quadrature QL2 versions of the L2 signal at frequency 2.6 MHz=(175 MHz−172.4 MHz) and at 25 MHz sampling rate are generated in the MULTIPLIERS 172 and 174.

The IL1 signal is lowpass filtered by a LOWPASS FILTER 148 with the BW=12.5 MHz which satisfies the Nyquist Theorem for 25 MHz sampling rate of the IL1 signal, amplified by an AMPLIFIER 152, converted by an A/D CONVERTER 156, and sampled by clocking the input signal 157 through a 160 FLIP-FLOP 1 at sampling clock (SCLK) rate. The A/D conversion can be performed by using an L-bit quantization operation, L being an integer greater or equal to 1. If L=1, the 1-bit quantization is performed and the output signal 164 contains only the Most Significant Bit (MSB) of the IL1 signal at 420 KHz. The QL1 signal is similarly processed by a LOWPASS FILTER 151, an AMPLIFIER 154, an A/D CONVERTER 158, and a FLIP-FLOP 2 159, wherein the output 166 signal is a digitized QL1 signal at 420 KHz. The L2 signal is being processed by a LOWPASS FILTER 176 (178), an AMPLIFIER 180 (182), an A/D CONVERTER 184 (186), and a 188 (190) FLIP-FLOP 3 (4) respectively to produce an inphase version IL2 (quadrature version QL2) of the output signal 192 (194) at 2.6 MHZ. Thus, the digital output of IF PROCESSOR block are the sampled versions of GPS signal with carrier frequencies of 420 KHz and 2.6 MHZ respectively. The samples include all visible satellite carrier and codes at the respective frequencies.

A DIGITAL CHANNEL PROCESSOR 200 ( the number of channels is equal to the number of satellites that are available for reception by the GPS ANTENNA) given in FIG. 7 includes two main subprocessors: an L1 TRACER 204 and an L2 TRACKER 206 which are controlled by the MICROPROCESSOR SYSTEM 218. The inputs represent the digital signals IL1 164, IL2 192, QL1 166, and QL2 194 outputted by the IF PROCESSOR as shown in FIG. 6. The timing signals SCLK 100 and MSEC 104 are supplied by the FREQUENCY SYNTHESIZER 80 as depicted in FIG. 4. The L1 TRACKER 204 is designed to track L1 C/A code when the encryption is ON and to track L1 P code when the encryption is OFF. The L1 TRACKER further develops a signal $\Sigma W_{L1} 205$ which is sent to the L2 TRACKER. The L2 TRACKER 206 is designed to track the optimized enhanced W code cross correlation when encryption is ON and to track L2 P code when encryption is OFF. All signals in each DIGITAL CHANNEL PROCESSOR are clocked synchronously with the sampling clock SCLK 100. MSEC signal 104 is used to synchronize each DIGITAL CHANNEL PROCESSOR's measurements to local reference time. The MICROPROCESSOR SYSTEM 218 coordinates the performance of the L1 TRACKER and the L2 TRACKER by employing CONTROL signals 216, 214, and 212.

The L1 TRACKER 204 (see FIG. 7) designed for tracking L1 C/A code when encryption is ON and L1 P code when encryption is OFF is given in FIG. 8. The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The RECEIVER can track the received GPS signals having very low signal levels by using a Delay-Lock Loop. The essential element of the Delay-Lock Loop is the block 262 CORRELATORS 1, wherein the received code is multiplied by a reference code having a time offset $\tau < T$; T being a code chip interval. The code correlation is performed at 3 time points (E-early, P-punctual and L-late) on the autocorrelation .function graph. The E, P, and L samples of the autocorrelation function are integrated in the block 262 CORRELATOR 1. The CORRELATORs 1 output provides an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (the block 270 CODE NCO 1) or clock. This clock CODE NCO 1 in turn drives the CODE GENERATOR 1 (268) in such a manner that if the clock is lagging in phase, the correction signal drives the clock faster and the reference code speeds up and runs in coincidence with the received signal. Thus, the reference code is tracking the received code. The EPOCH 1 time signal 272 measures the timing of the received signal. The RECEIVER also contains a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the user's RECEIVER may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips. If acquisition of the C/A code of one satellite can be accomplished within acquisition time T, then the total acquisition time for 4 satellites can be less than or equal to 4 T if a single RECEIVER is time sequenced over the four satellites.

Referring again to FIG. 8, the input signals to the L1 TRACKER include the sampled L1 IF signals IL1 (164) and QL1 (166), having frequency of 420 kHz plus Doppler. The combination of blocks CARRIER MIXER 1 (246) and CARRIER NCO 1 (244) translates the frequency of the IL1 (164) and QL1 (166) signals to 0 HZ at the I output 252 and Q output 254 of CARRIER MIXER 1. CODE MIXER 1 (256) performs code correlation of the L1 signal with a locally generated code Lc (253). The locally generated code Lc is selected by the MULTIPLEXER 1 (264) to be either C/A code 263 or P-code (276) (encrypted and non-encrypted operation respectively). The local code is provided by the CODE GENERATOR 1 block. The C/A or P-code correlation is selected via MULTIPLEXER 1 under the MICROPROCESSOR CONTROL signal. The correlated samples are summed (integrated) for an integer multiple of EPOCH 1 signals 272 in the CORRELATORS 1 block. CORRELATORS 1 output signals are read by the MICROPROCESSOR system 218 (see also FIG. 7). The MICROPROCESSOR system then processes these values to provide code and carrier feedback mechanisms.

The output of CARRIER MIXER 1 in Q channel 251 contains an estimate of the L1 Y code when the L1 TRACKER is tracking L1 C/A code. The locally generated by the CODE GENERATOR 1, P code (275) is substantially aligned in time with the satellite signal because the L1 TRACKER is tracking the L1 C/A code. The locally generated P code 275 is mixed with the Q L1 Y code estimate 251 in CODE MIXER 2 (278). Thus, the output 277 of CODE MIXER 2 represents an estimate of the L1 W code in a (+/−) 12.5 MHz bandwidth.

In the preferred embodiment a W SYNC 1 signal 274 generated by the CODE GENERATOR 1 represents a period of 22 L1 P code clocks (see discussion below about the observed W code profile in frequency domain depicted in FIG. 19b). The estimate of L1 W code (L1 W) is further processed by a DIGITAL SUMMER 1 block (266). The DIGITAL SUMMER 1 accumulates L1 W code estimates over periods given by the W SYNC 1 signal. The output of the DIGITAL SUMMER 1 block represents a series of accumulated L1 W code estimates at the rate of W SYNC 1 signal. In essence, the developed signal $\Sigma W_{L1}$ (205, see also FIG. 7) is an optimal estimate of an L1 W code bit. The signal $\Sigma W_{L1}$ is sent to the L2 TRACKER block for further processing.

The L2 TRACKER 206 is illustrated in FIG. 9. The L2 TRACKER allows accomplishment of the code and carrier tracking of the L2 satellite signals and to make the code and carrier measurements of the L2 satellite signals.

Samples of the IL2 (192) and QL2 (194) IF signal, at 2.6 MHZ plus Doppler, are frequency translated to 0 HZ via the CARRIER MIXER 2 (302) and CARRIER NCO 2(300) blocks. When the L2 TRACKER is locked onto the L2 signal, the I (305) output of CARRIER MIXER 2 represents an estimate of the L2 Y code. The Q channel (306) contains no signal power when the L2 carrier tracking loop is locked.

The CODE MIXER 3 (310) provides a mechanism for removing the P code from the L2 Y code and provides the L2 code tracking mechanism. CODE MIXER 3 develops six outputs ($I_E$, $I_P$, $I_L$, $Q_E$, $Q_P$ and $Q_L$) which are comparisons of the incoming signal (I and Q) with the locally generated P code at three time points (early, punctual, and late). The early and late correlations are used to close the L2 code tracking loop.

The output of CODE MIXER 3 is processed by DIGITAL SUMMER 2 (314). Operation of DIGITAL SUMMER 2 is similar to DIGITAL SUMMER 1. DIGITAL SUMMER 2 accumulates the output of CODE MIXER 3 across a period defined by a W SYNC 2a (326) signal.

In the preferred embodiment, the W SYNC 2a signal is the L2 P code clock divided by 22. (See below more detailed discussion in connection with the observed W code spectrum shown in FIG. 19b). The L2 TRACKER generates an L2 P code clock independently of the L1 TRACKER via the CODE NCO 2 (312) and CODE GENERATOR 2 (308) blocks.. The CODE NCO 2 block is controlled by the L2 code tracking loop such that it drives the CODE. GENERATOR 2 block to produce a locally generated P code which is aligned with the incoming L2 satellite signal.

The I (346) ($\Sigma I_E$, $\Sigma I_P$, $\Sigma I_L$) and Q (348) ($\Sigma Q_E$, $\Sigma Q_P$ and $\Sigma Q_L$) outputs of the DIGITAL SUMMER 2 represent accumulations, at a rate of W SYNC 2a, of the estimated L2 W code at different time points (early, punctual, and late) on the autocorrelation function of the incoming P(Y) code and the locally generated P code. The estimated L2 W code, accumulated across the period W SYNC 2a, ($\Sigma I_E$, $\Sigma I_P$, $\Sigma I_L$, $\Sigma Q_E$, $\Sigma Q_P$ and $\Sigma Q_L$) are mixed with the estimated L1 W code, accumulated across the period W SYNC 1 ($\Sigma W_{L1}$ signal 205) in CODE MIXER 4 (320). CODE MIXER 4 outputs in its I channel (350) $\Sigma I_{EW}$, $\Sigma I_{PW}$, and $\Sigma I_{LW}$ signals, and in its Q channel (352) $\Sigma Q_{EW}$, $\Sigma Q_{PW}$, and $\Sigma Q_{LW}$ signals.

MULPTIPLEXER 2 (318) provides a mechanism for selecting the output ($I_E$, $I_P$, $I_L$, $Q_E$, $Q_P$ and $Q_L$) of CODE MIXER 3 when the satellite is not encrypted, and the output ($\Sigma I_{EW}$, $\Sigma I_{PW}$, $\Sigma I_{LW}$, $\Sigma Q_{EW}$, $\Sigma Q_{PW}$, and $\Sigma Q_{LW}$) of CODE MIXER 4, when the satellite is encrypted.

CORRELATORS 2 (316) accumulates correlations at a rate of SCLK (100) if the satellite is not encrypted and a rate of W SYNC 2b (322), if the satellite is encrypted. The output of CORRELATORS 2 is read into the MICROPROCESSOR SYSTEM 218 at a rate of EPOCH 2 (1 kHz) to form L2 code and carrier tracking feedback values which are applied to CODE NCO 2 and CARRIER NCO 2 respectively.

FIG. 10a illustrates the CARRIER NCO 1 (244) used in the L1 TRACKER for removing the carrier frequency from the IL1 and QL1 signals. This device is described in the article "All-Digital GPS Receiver Mechanization" by Peter Ould and Robert VanWechel, pp. 25–35, "Global Positioning System", Vol. II, The Institute, of Navigation, Alexandria, Va., 1984. This paper is incorporated herein by reference.

The CARRIER NCO 1 includes a 32-bit ACCUMULATOR 406 which is caused to overflow periodically at the desired output frequency. The ACCUMULATOR's L-top bits, L is an integer greater or equal to 1, can be used as the CARRIER NCO 1 output wave for producing a carrier mixing signal used by the CARRIER MIXER 1 (see FIG. 8) for frequency translation. The L=1 results in the relatively strong quantization noise produced by the one-bit approximation of the output sine wave. For all practical purposes, L=3 is sufficient to significantly reduce the quantization noise.

The satellite speed is not constant even if the RECEIVER is not movable. The RECEIVER's quartz clock is not precise enough and keeps changing all the time. Those are the two main reasons why the frequency of the received satellite signal keeps changing. To accommodate for those changes the MICROPROCESSOR keeps the carrier tracking loop locked by continuously adjusting the frequency word inputted to the CARRIER NCO 1 thus affecting the output.

The average CARRIER NCO 1 output frequency Fout can be expressed as: Fout=(Wc/$2^n$)Fc; where Wc is the frequency word given by (B1 . . . BL), Fc is the NCO clock frequency which is SCLK (25 MHZ), n is the length of NCO frequency word in bits (a typical value might be 24 bits).

EXAMPLE 1

If we wish to generate the frequency Fout=420 KHz, we should use the frequency word: Wc=(Fout*$2^n$)/Fc=(420 KHz * $2^{24}$)/25 MHZ=044D01(hex).

The value of Wc is being continuously adjusted by the MICROPROCESSOR SYSTEM to keep the carrier tracking loop locked.

The MICROPROCESSOR controls the CARRIER NCO 1 frequency by latching in a new frequency word (B1 . . . Bn) in a LATCH 1 (404). The frequency word (B1 . . . Bn) is added to the previous CARRIER NCO 1 output sum (Q1 . . . Qn) on each sample clock SCLK (100). The L-top bits of the ACCUMULATOR output wave (Q1 . . . Q1) are used as the CARRIER NCO 1 output wave in the I channel (248).

The first two bits (R1R2) of the carrier Q output signal 250 (see also FIG. 8) are generated by a first ADDER 1 (414) by adding two bits (01) (428 and 430) to the two first bits S1(424) and S2 (426) of the CARRIER NCO 1 output signal (S1 . . . Sn). There are the following possibilities: (S1, S2)=(0,0)=0 degrees; (0,1)=90 degrees; (1,0)=180 degrees; (1,1)=270 degrees. A third LATCH 3 (416) generates a quadrature version Q of carrier output signal L1 (250) in the form of L-bit word (R1 R2 S3 . . . SL)=(M1 . . . ML) by clocking in at the rate of SCLK signal the 2-top bits (R1 R2) and the L-2 least significant bits (S3 . . . SL).

When the carrier tracking loop is locked, the output of the CARRIER NCO represents the phase of the local carrier which provides the phase lock with the satellite signal. The top m bits (C1 . . . Cm) latched by a second LATCH 2 (412) on the MSEC timing signal represent a carrier phase measurement at this time. FIG. 10b illustrates the CARRIER NCO 2 (see also 300 in FIG. 9) which functions in the same way as the discussed above CARRIER NCO 1.

The CARRIER MIXER 1 (246) shown in FIG. 11a is used by the L1 TRACKER to perform the frequency translation of the IL1 signal (164) and QL1 signal (166) outputted by the IF PROCESSOR to the baseband frequency signals I (252) and Q (254) using the I (248) and Q (250) output frequency words of the CARRIER NCO 1 according to the standard complex mixing operation:

$$Iout=(QL1)*Q-(IL1)*I; \quad Qout=(IL1)*Q+(QL1)*I.$$

MULTIPLIERS (450, 452, 454 and 456) and ADDERS (458 and 460) are employed in the CARRIER MIXER 1 (246) to perform these operations and to obtain the output signals Iout (252) and Qout (254). FIG. 11b illustrates the CARRIER MIXER 2 (302) employed by the L2 TRACKER to perform the same operation on the L2 signal.

The CODE MIXER 1 (256 in FIG. 8) depicted in FIG. 12a removes the modulated code from the satellite signal L1 and allows the demodulation of the information contained in the L1 signal. The Lc code (253) is selected by the MULTIPLEXER 1 (264) (see FIG. 8) and can be a locally generated by the CODE GENERATOR 1 (268) either C/A code 263 or P code 276. The signals I (252) and Q (254) outputted by the CARRIER MIXER 1 are multiplied by the early (480), punctual (482), and late (484) samples of the locally generated code Lc (253). This operation is performed by MULTIPLIERs (490), (492), (494), (496), (498), and (500) resulting in the early (258,1), punctual (258,2) and late (258,3) samples of the I signal; and in the early (260,1), punctual (260,2) and late (260,3) samples of the Q signal.

FIG. 12b illustrates the CODE MIXER 2 (278 in FIG. 8), wherein the incoming L1 Y signal 251 is multiplied with the locally generated L1 P code (275) by the MULTIPLIER 502 to produce the W code signal 277.

The CODE MIXER 3 (310) (see also FIG. 9) shown in FIG. 12c is designed to mix the I (305) and Q (306) versions of the incoming L2 signal with the locally generated L2 P code (332) at three different time points on the autocorrelation function between local and satellite generated L2 P codes. The mixing operation is performed by the MULTIPLIER 1 (510) outputting the early $I_E$ signal (342,1); by the MULTIPLIER 2 (512) outputting the punctual $I_P$ signal (342,2), by the MULTIPLIER 3 (514) outputting the late $I_L$ signal (342,3), by the MULTIPLIER 4 (516) outputting the early $Q_E$ signal (344,1); by the MULTIPLIER 5 (518) outputting the punctual $Q_P$ signal (344,2), and by the MULTIPLIER 6 (520) outputting the late $Q_L$ signal (344,3).

FIG. 12d depicts the CODE MIXER 4 (320) (see also FIG. 9). The CODE MIXER 4 is designed to mix the L2 time delayed signals $\Sigma I_E$ (346,1), $\Sigma I_P$(346,2), $\Sigma I_L$(346,3), $\Sigma Q_E$ (348,1), $\Sigma Q_P$(348,2), and $\Sigma Q_L$ (348,3) with the estimated L1 W code bit ($\Sigma W_{L1}$) (205). This operation is performed by the MULTIPLIER 1 (530) outputting the $\Sigma I_{EW}$ signal (350, 1); by the MULTIPLIER 2 (532) outputting the $\Sigma I_{PW}$ signal (350,2); by the MULTIPLIER 3 (534) outputting the $\Sigma I_{LW}$ signal (350,3); by the MULTIPLIER 4 (536) outputting the $\Sigma Q_{EW}$ signal (352, 1); by the MULTIPLIER 5 (538) outputting the $\Sigma Q_{PW}$ signal (352,2); and by the MULTIPLIER 6 (540) outputting the $\Sigma Q_{LW}$ signal (352,3). The use of L1 W code instead of perfect, with respect to the signal-to-noise ration (SNR) and timing, locally generated W code introduces a signal to noise disadvantage over the full coded correlation scheme.

In the preferred embodiment, this scheme uses the fundamental 22 Pcode chips period W code clock to optimize the stripping of W code from the L2 signal by the L1 signal. This scheme relies on the energy spectrum of the W code signal and does not rely for its optimization on knowing the exact timing of the W code (see detailed discussion below).

FIG. 13a depicts a detailed diagram of CODE GENERATOR 1 (268). The inputs to this block are the CODE NCO 1 output (269) and the MICROPROCESSOR CONTROL signal (212). The CODE NCO 1 signal is nominally at the P code rate (10.23 MHz) and is adjusted by the L1 C/A (or P) code tracking loop to maintain lock to the L1 signal. The C/A CODE GENERATOR 552 and the P CODE GENERATOR 554 are the standard shift register sequences described in the "Interface Control Document" of Rockwell International Corporation entitled "Navstar GPS Space Segment/ Navigation User Interfaces", dated Sep. 26, 1984, as revised Dec. 19, 1986, hereinafter referred to as the "ICD-GPS-200". The C/A CODE GENERATOR produces signals C/A code (263) and EPOCH 1 (272). The C/A code is the locally generated code and EPOCH 1 is the repetition rate of the C/A code (1 kHz). The P CODE GENERATOR produces the P code (276). The DIVIDE BY N block (558) and the DELAY BY τ block (556) are used to transform the CODE NCO 1 output signal (269) into the W SYNC 1 signal (274), also the DIVIDE BY N block (558) is reset by the EPOCH 1 signal (272). W SYNC 1 signal is used as the L1 W code estimate timing signal. Both C/A and P CODE GENERATORs can be adjusted under the MICROPROCESSOR CONTROL signal (212) to generate a particular satellite's C/A and P code.

In the preferred embodiment, the DELAY BY τ block (556) introduces no delay, the DIVIDE BY N block divides the CODE NCO 1 output signal (269) by 22 to generate the W SYNC 1 signal, and the output W SYNC 1 is synchronized to the L1 W code estimate.

FIG. 13b illustrates the CODE GENERATOR 2 (308). (See also FIG. 9). Operation of the CODE GENERATOR 2 is similar to the disclosed above operation of the CODE GENERATOR 1. The clock input from the CODE NCO 2 (328) is controlled by the L2 code tracking loop to keep the P code output (332) of CODE GENERATOR 2 substantially aligned with the L2 P code portion of the L2 Y code.

In the preferred embodiment, the DELAY BY τ block (576) introduces no delay, the DIVIDE BY N block (578) divides the CODE NCO 2 output signal (328) by 22 to generate the W SYNC 2a (326) and W SYNC 2b (322) signals, and the outputs W SYNC 2a and W SYNC 2b are synchronized to the L2 W code estimate. The W SYNC 2b signal is the logical inversion of the W SYNC 2a signal. The EPOCH 1 of the CODE GENERATOR 1 is used as the control signal for the block CORRELATORs 1, and the EPOCH 2 and W SYNC 2b signals of the CODE GENERATOR 2 are used as the block CORRELATORs 2 control signals.

The timing relationship between signals W SYNC 1, W SYNC 2a and W SYNC 2b are shown in FIG. 13c. Under normal ionospheric conditions, the L2 signal (1227.6 MHz) will be delayed more than the L1 signal (1575.42 MHz). Hence, when both L1 and L2 TRACKERs are locked, their respective P codes (and therefore W SYNCs) will be equivalently delayed. This results in the delay $T_{iono}$. As the ionospheric delay changes the L1 and L2 code tracking loops will react (via CODE NCO 1 and CODE GENERATOR 1, and CODE NCO 2 and CODE GENERATOR 2 respectively) such that $T_{iono}$ matches the observed ionospheric delay. The timing relationship between W SYNC 1, W SYNC 2a, and W SYNC 2b is important in the operation of the optimized cross correlation L2 tracking. When mixing L1 and L2 signals in CODE MIXER 4 it is clear that the delay term $T_{iono}$ will affect this mixing process. The CORRELATORs 2 block is clocked with the positive edge of signal W SYNC 2b, at which time the outputs of DIGITAL SUMMER 1 and 2 will be guaranteed to be stable as long as the term $T_{iono}$ is less than $T_{W\_Period/2}$ (TW Period/2 is half of the W code period=645/2 meters). This is a reasonable assumption when working with the GPS L1 and L2 frequencies.

The block CORRELATORs 1 (262) is illustrated in FIG. 14a. The function of the CORRELATORs 1 (see also 262 of FIG. 8) is to integrate the correlated samples IE (inphase early) (258,1), IP (inphase punctual) (258,2), IL (inphase late) (258,3), QE (quadrature early) (260,1), QP (quadrature punctual) (260,2), and QL (quadrature late) (260,3) of the L1 C/A (or P) satellite code with the locally generated version of C/A (or) P code across a time period given by a multiple of C/A EPOCH 1 (272) signals. The input sample IE is integrated in an UP/DOWN COUNTER 1 (602) across a period defined by the C/A EPOCH 1 signal, wherein the COUNTER 1 adds if the input is positive and subtracts if it is negative. At the end of the integration period the correlator summations are read by the MICROPROCESSOR (218) using a LATCH 1 (604). Each of the IP, IL, QE, QP, and QL samples is similarly integrated by a separate UP/DOWN COUNTER.

The resulting after integration values of IE, IL, QE, and QL are used by the L1 code tracking loop by forming a code phase estimate=K1(IE–IL), when the carrier loop is locked, or by forming a code phase estimate=K1[$(IE^2+QE^2)^{1/2}$–$(IL^2+QL^2)^{1/2}$], when the carrier loop is not locked. K1 is a L1 code loop gain factor. The IP and QP are used by the carrier tracking loop which forms a carrier phase estimate= arctan(QP/IP).

The block CORRELATORS 2 (316 of FIG. 9) is given in FIG. 14b. The block CORRELATORs 2 accumulates the result of L2 P code correlation when the satellite is not encrypted and the result of the optimal digital bandwidth compression L2 tracking when the satellite is encrypted. When not encrypted the UP/DOWN COUNTER blocks (630–640) accumulate on each SCLK (100) edge. When encrypted, the UP/DOWN COUNTER blocks accumulate on each W SYNC 2b (322) edge. The clocking choice is made by the MICROPROCESSOR SYSTEM (218) via the MULTIPLEXER 3 (318). The output of the CORRELATORs 2 block is read by the MICROPROCESSOR SYSTEM (218) at a rate of EPOCH 2 (1 kHz) (324), a signal developed by CODE GENERATOR 2 (308). These values are then fed back to CODE NCO 2 (312) and CARRIER NCO 2 (300) respectively to close the code and carrier tracking loops.

The CODE NCO 1 (270 of FIG. 8) given in FIG. 15 provides a clock at 10.23 MHz for the CODE GENERATOR 1 (268) in its NORMAL mode of operation. It can also shift the CODE GENERATOR 1 early or late under the MICROPROCESSOR CONTROL signal 212 by shifting its output phase in its SHIFT (714) mode. The CODE NCO 1 output 269 controls the phase of the locally generated codes (P and C/A) and provides the code tracking loop feedback adjustment. The CODE NCO 1 includes a 12-bit ADDER (706) and a 12-bit LATCH (708). On each sample clock edge the output of the LATCH is added to the output of the MULTIPLEXER (704). In the NORMAL mode of operation the output of the MULTIPLEXER is a 12-bit number N (710) unless Q12 is 1; if Q12 is equal to 1 the output is a 12-bit number M (712). Thus, in the NORMAL mode the CODE NCO 1 outputs a frequency: CODE NCO 1 output frequency=$(N \times SCLK)/(2^{12}-M+N)$.

EXAMPLE 2

Given the clock SCLK=25 MHZ, in order to obtain the CODE NCO 1 output frequency=P code rate=10.23 MHz it is sufficient to choose N=1023 and M=2619.

Under the SHIFT mode (714) the shifting of the CODE NCO 1 output frequency is accomplished by replacing the NORMAL mode MULTIPLEXER output (N or M) by SHIFT under the MICROPROCESSOR CONTROL signal 212. If this is the case, the code phase shift is given by: code phase shift=$(M-SHIFT)/(2^{12}-M+N)$, where the code shift is measured in units of sample clocks. The code shift allows to accommodate for the shift in the CODE GENERATOR 1 frequency required for the locking of the code tracking loop. The structure and operation of the CODE NCO 2 (3 12 in FIG. 9) is identical to CODE NCO 1.

FIG. 16a depicts operation of DIGITAL SUMMER 1 (266). (See FIG. 8 for more details). DIGITAL SUMMER 1 accumulates L1 W code estimates (277) over the period W SYNC 1 (274) and outputs this accumulation $\Sigma W_{L1}$ (205) every W SYNC 1 period.

DIGITAL SUMMER 2 ( 314 of FIG. 9) is shown in FIG. 16b. DIGITAL SUMMER 2 accumulates L2 W code estimates In (340,1); $I_P$ (340,2); $I_L$ (340,3); $Q_E$ (338,1); $Q_P$ (338,2); and $Q_L$ (338,3) over the period W SYNC 2a and outputs these accumulations $\Sigma I_E$ (346,1); $\Sigma I_P$ (346,2); $\Sigma I_L$ (346,3); $\Sigma Q_E$ (348,1); $\Sigma Q_P$ (348,2); and $\Sigma Q_L$ (348,3) every W SYNC 2a period (326). Both DIGITAL SUMMER 1 and DIGITAL SUMMER 2 blocks use the DIGITAL SUMMER ACCUMULATOR block shown in FIG. 16c. Referring to (718) in FIG. 16a, DIGITAL SUMMER ACCUMULATOR takes the estimated L1 W code samples (277) and accumulates them every SCLK edge (100) for a period by input signal W SYNC 1 (274). ADDER 1 (740) and LATCH 1 (742) form the ACCUMULATOR. The W SYNC 1 signal latches in the accumulated number into the LATCH 2 (744) to form the output signal $\Sigma W_{L1}$. The W SYNC 1 signal also clears LATCH 1 in preparation for the next accumulation across the next W SYNC 1 period.

FIG. 17a illustrates the process of acquisition under encryption. When a satellite is selected for tracking, the L1 TRACKER is guided by the MICROPROCESSOR SYSTEM to close L1 C/A code and carrier tracking loops. (Step 750). Once locked to L1 C/A the MICROPROCESSOR has accurate knowledge as to the L1 carrier frequency (via carrier tracking loop) and can derive an effective estimate of the L2 carrier frequency because L1 and L2 frequencies are locked together on the satellite via the relationship L2 carrier frequency=L1 carrier frequency×120/154. (Step 752). This estimate of the L2 carrier frequency from the L1 loop eliminates the requirement for an L2 frequency search, resulting in a potentially narrower L2 carrier tracking loop because the satellite/receiver dynamics are removed from L2 carrier tracking loop. A typical L1 carrier tracking loop bandwidth is 10 Hz and the frequency aiding process allows the L2 carrier tracking loop to have a bandwidth of <1 Hz. This aiding operation in the optimized cross correlation receiver described here is advantageous for two reasons. First, the frequency aiding allows a carrier tracking loop to be closed in the presence of less signal-to-noise ratio (SNR) than that present in full code correlation receivers. Second, with the potential 13.4 dB advantage in SNR over traditional cross correlation methods it allows more effective tracking of ionospheric dynamics between L1 and L2. Ionospheric dynamics is dynamics that is not removable by the frequency aiding process and that is due to the changing group and phase delay between L1 and L2 signals. In general, for a given loop order, a wider loop bandwidth allows more effective tracking of dynamics. Traditional cross correlation receivers have an L2 carrier tracking bandwidth of (1/10)-th of a Hz, whereas with the optimized cross correlation an L2 bandwidth of 1 Hz is feasible.

The next step 754 is to set up P CODE GENERATORS in CODE GENERATORs 1 and 2. With L1 C/A tracking locked there is enough information present to perform a standard P code 'handover' operation. During this operation, the essentially timing information is used from the L1 C/A code tracking to set up the P CODE GENERATORs in CODE GENERATORs 1 and 2 to be substantially aligned with L1 and L2 satellite generated P codes respectively. The alignment of the P code from CODE GENERATOR 2 with the satellites L2 P code will be corrupted by the ionospheric group delay difference between the L1 and L2 signals. This is the remaining code phase to be searched in order to find L2 signal power.

With the L2 carrier tracking loop close in frequency and the P CODE GENERATORs in CODE GENERATORs 1 and 2 set up, the CODE NCO 2 phase output is adjusted (step 756) until power is detected at the output of CORRELATORs 2. The MICROPROCESSOR forms three values to look for power in the CORRELATORS 2:

power1=$EI^2$+$EQ^2$;
power2=$PI^2$+$PQ^2$;
power3=$LI^2$+$LQ^2$.

If any power1, 2, or 3 surpass a preset threshold, the power is declared found.

After the power is found in the L2 CORRELATORS using: L2 estimated carrier phase=arctan (PQ/PI), the L2 carrier tracking loop (step 758) is closed. The L2 code tracking loop (step 760) is closed using: L2 estimated code phase=K2 (EI–LI). Thus, the acquisition of the satellite signals L1 and L2 has been accomplished.

FIG. 17b depicts the signal tracking operation. At first, both sets of CORRELATORS L1 and L2 are read by the MICROPROCESSOR system (762). Secondly, the L1 code and carrier tracking loops are formed and the digital voltage feedback signals are applied to the CODE NCO 1 (217) and to the CARRIER NCO 1 (244). The next step is the computation of the L2 frequency aiding term (766). The following step is the formation of the L2 code and carrier tracking loops and the application of the digital feedback signals to the CODE NCO 2 and to the CARRIER NCO 2 (768). The L1 and L2 carrier and code phase measurements are then performed. The carrier phase measurements (770) are performed on L1 and L2 by reading the CARRIER NCO 1 and 2 output phase at a chosen MSEC reference time. The L1 and L2 code measurements (772) are performed by keeping track in the MICROPROCESSOR of what shifts have been applied to the CODE NCO 1 and 2 respectively.

A system and a method for optimum correlation processing of L1 and L2 satellite signals which includes an n-bit RECEIVER, n being integer, and at least one n-bit DIGITAL CHANNEL PROCESSOR is also within the scope of the present invention. The n-bit RECEIVER comprising an n-bit A/D CONVERTER and the n-bit DIGITAL CHANNEL PROCESSOR reduces quantization noise as compared to the one-bit RECEIVER comprising a one-bit A/D CONVERTER and a one-bit DIGITAL CHANNEL PROCESSOR because the n-bit digital approximation of the sine signals is more precise than the 1-bit approximation.

FIG. 18a depicts the W code general energy spectrum, wherein $F_0$ is the first frequency at which the energy of W code is equal to zero. FIG. 19a illustrates the observed W code profile in the frequency domain wherein $F_0$=465 kHz. In the time domain, the observed W code profile is shown in FIG. 19b, wherein the W period is equal to 22 P(Y) periods, and wherein the C/A EPOCH 1 period is equal to 465 W periods. The W code time-profile in general is illustrated in FIG. 18b.

The observed W code frequency $F_0$=465 kHz can be defined in terms of 22 P(Y) chips: $F_0$=465 kHz=1/NP(Y)= 1/22P(Y). Therefore, the number N of P(Y) chips equal to 22 is implemented in the design of the receiver because the inverse of this number gives the best approximation of the energy spectrum of the unknown encrypted W code satellite signals. Thus, in the preferred embodiment of the receiver the number N of P(Y) chips is equal to 22. In the preferred embodiment, W code is also synchronized to the C/A code EPOCH 1 and the delay $\tau$ is equal to zero.

If the energy spectrum of the W code is changed in such a way that the $F_0$ frequency is not equal to 465 kHz, the best mode of the receiver will be also different. The best mode of the receiver's design will include the number N of P(Y) chips, wherein N can be defined from the following equation $F_0=1/NP(Y)$.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:

(1) locally generating replica of said C/A code modulated on L1 carrier frequency signal;

(2) locally generating replica of said P code modulated on L1 carrier frequency signal, wherein said locally generated replica of L1 signal does not contain propagation noise;

(3) locally generating replica of said P code modulated on L2 carrier frequency signal, wherein said locally generated replica of L2 signal does not contain propagation noise;

(4) extracting of an estimate of said Y code from said L1 signal, and from said L2 signal, wherein said estimate signals contain propagation noise;

(5) correlating a locally generated replica of C/A code with the received L1 code for obtaining an estimate of L1 group delay ( L1 pseudo-range) and L1 carrier phase;

(6) removing said P code from said locally extracted estimate of said L1 Y code to obtain a locally extracted estimate of said L1 W code;

(7) removing said P code from said locally extracted estimate of said L2 Y code to obtain a locally extracted estimate of said L2 W code;

(8) integrating estimate of said LI W-code across the period of $T_0$, wherein said period $T_0$ is equal to the inverse zero-frequency $1/F_0$ of the W-code energy spectrum, and wherein said zero-frequency $F_0$ is the first frequency at which said W-code energy spectrum is equal to zero, and wherein said L1 W-code is synchronized to the signal C/A code EPOCH 1;

(9) integrating estimate of said L2 W-code estimate across the period of $T_0$, wherein said L2 W-code is synchronized to the signal C/A code EPOCH 2; and

(10) multiplying said integrated estimates of L1 W-code with said integrated early, late, and punctual estimates of L2 W-code and integrating the result over a time period greater than a msec to ensure that the resulting correlated signal has a sufficient power for closing the L2 -code and L2-carrier tracking loops.

2. The system of claim 1, wherein said RECEIVING MEANS further comprises:

a dual frequency patch ANTENNA MEANS for receiving said L1 and L2 satellite signals;

a FILTER/LNA MEANS conductively connected to said ANTENNA MEANS for performing filtering and low noise amplification of said L1 and L2 signals, wherein said FILTER/LNA determines the signal/noise ratio of the received signals L1 and L2;

a DOWNCONVERTER MEANS conductively connected to said FILTER/LNA MEANS for mixing and converting said L1 and L2 signals; and an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2).

3. The system of claim 2 further comprising a MASTER OSCILLATOR MEANS and a FREQUENCY SYNTHESIZER MEANS conductively connected to said MASTER OSCILLATOR MEANS, conductively connected to said IF PROCESSOR MEANS, conductively connected to said DOWNCONVERTER MEANS, and conductively connected to at least one said DIGITAL CHANNEL PROCESSING MEANS, wherein said FREQUENCY SYNTHESIZER MEANS generates several timing signals.

4. The system of claim 3, wherein said FILTER/LNA MEANS further comprises:

a POWER SPLITTER MEANS connected to said ANTENNA MEANS for power splitting a single L1/L2 signal received by said ANTENNA MEANS into two separate L1 and L2 signals;

two separate BANDPASS FILTER MEANS connected to said POWER SPLITTER MEANS for filtering said L1 and L2 signals independently; and a POWER COMBINER MEANS connected to said separate BANDPASS FILTER MEANS for power combining said L1 and L2 signals into one combined signal L1/L2 before feeding said combined L1/L2 signal into said LNA;

wherein said LNA outputs amplified and filtered combined L1/L2 signal.

5. The system of claim 3, wherein said FREQUENCY SYNTHESIZER MEANS further comprises:

a PHASE DETECTOR MEANS for comparing phases of two signals, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

a LOOP FILTER MEANS connected to said PHASE DETECTOR MEANS for filtering out high frequency voltage noise, wherein an output LOOP FILTER MEANS voltage signal includes a low frequency voltage noise;

a VOLTAGE CONTROLLED OSCILLATOR (VCO) MEANS connected to said LOOP FILTER MEANS, wherein a voltage signal at the input of said VCO causes frequency change in said VCO output signal, and wherein said VCO nominal output signal is locked to said reference signal; and wherein said VCO nominal output signal is used as 1st local oscillator (LO1) signal;

a first DIVIDER MEANS connected to said VCO to divide said VCO output signal to obtain 2nd local oscillator (LO2) signal;

a second DIVIDER MEANS connected to said first DIVIDER MEANS to divide said 2nd LO2 signal to obtain sampling clock (SCLK); and a third DIVIDER MEANS connected to said second DIVIDER MEANS to divide said 2nd LO2 signal to obtain a signal MSEC, wherein said signal MSEC is used for measurement of local reference time.

6. The system of claim 3, wherein said FREQUENCY SYNTHESIZER MEANS further comprises:

a "Divide by 5" block;

a PHASE DETECTOR MEANS connected to said block "Divide by 5" for comparing 5 MHz input signal from said MASTER OSCILLATOR MEANS with 5 MHZ signal from said "Divide by 5" block, wherein minimum voltage output signal from said PHASE DETECTOR MEANS represents maximum phase alignment of two said 5 MHZ signals;

a LOOP FILTER MEANS connected to said PHASE DETECTOR MEANS for filtering out high frequency voltage noise;

a VOLTAGE CONTROLLED OSCILLATOR (VCO) MEANS connected to said LOOP FILTER MEANS, wherein voltage signal at the input of said VCO causes frequency change in said VCO output signal, and wherein said VCO nominal output 1400 MHz signal is locked to said 5 MHZ reference signal; and wherein said 1400 MHz VCO output signal is used as a 1st local oscillator (LO1);

a "Divide by 8" block connected to said VCO to divide said 1400 MHZ VCO output signal by 8 to obtain a 175 MHZ signal used as a 2nd LO2;

a "Divide by 7" block connected to said "Divide by 8" block to divide said 175 MHZ signal by 7 to obtain a 25 MHZ signal used as a sampling clock (SCLK); and a "Divide by 25000" block connected to said "Divide by 7" block to divide said 25 MHZ signal by 25000 to obtain a 1 KHZ signal (MSEC), wherein said MSEC signal is used for measurement of local reference time.

7. The system of claim 2, wherein said DOWNCONVERTER MEANS further comprises: a POWER SPLITTER MEANS connected to said FILTER/LNA MEANS and to said FREQUENCY SYNTHESIZER MEANS for power splitting said FILTER/LNA MEANS output L1/L2 signal into two signals;

a first MULTIPLIER MEANS connected to said POWER SPLITTER MEANS for multiplying said L1 signal with said 1st LO1 signal, wherein a first mixed signal is produced;

a second MULTIPLIER MEANS connected to said POWER SPLITTER MEANS for multiplying said L2 signal with said 1st LO1 signal, wherein a second mixed signal is produced;

a first BANDPASS FILTER MEANS connected to said first MULTIPLIER MEANS for filtering said first mixed signal;

a second BANDPASS FILTER MEANS connected to said second MULTIPLIER MEANS for filtering said second mixed signal;

a first AMPLIFIER MEANS connected to said first BANDPASS FILTER MEANS for amplifying said first filtered signal; and a second AMPLIFIER MEANS connected to said second BANDPASS FILTER MEANS for amplifying said second filtered signal.

8. The system of claim 3, wherein said IF PROCESSOR MEANS further comprises:

a first POWER SPLITTER MEANS connected to said DOWNCONVERTER MEANS and to said FREQUENCY SYNTHESIZER MEANS for power splitting said L1 signal into two signals;

a second POWER SPLITTER MEANS connected to said DOWNCONVERTER MEANS and to said FREQUENCY SYNTHESIZER MEANS for power splitting said L2 signal into two signals;

a first MULTIPLIER MEANS for multiplying said L1 signal with an inphase (I) version of said 2nd LO2 signal to produce an IL1 signal;

a second MULTIPLIER MEANS for multiplying said L1 signal with a quadrature (Q) version of said 2nd LO2 signal to produce a QL1 signal;

a third MULTIPLIER MEANS for multiplying said L2 signal with an inphase (I) version of said 2nd LO2 signal to produce an IL2 signal;

a fourth MULTIPLIER MEANS for multiplying said L2 signal with a quadrature (Q) version of said 2nd LO2 signal to produce a QL2 signal;

a first LOWPASS FILTER MEANS connected to said first MULTIPLIER MEANS for filtering said first mixed signal;

a second LOWPASS FILTER MEANS connected to said second MULTIPLIER MEANS for filtering said second mixed signal;

a third LOWPASS FILTER MEANS connected to said third MULTIPLIER MEANS for filtering said third mixed signal;

a fourth LOWPASS FILTER MEANS connected to said fourth MULTIPLIER MEANS for filtering said fourth mixed signal;

a first AMPLIFIER MEANS connected to said first LOWPASS FILTER MEANS for amplifying said IL1 signal;

a second AMPLIFIER MEANS connected to said second LOWPASS FILTER MEANS for amplifying said QL1 signal;

a third AMPLIFIER MEANS connected to said third LOWPASS FILTER MEANS for amplifying said IL2 signal;

a fourth AMPLIFIER MEANS connected to said fourth LOWPASS FILTER MEANS for amplifying said QL2 signal;

a first one-bit analog-to-digital (A/D) CONVERTER MEANS connected to said first AMPLIFIER MEANS for performing 1-bit quantization operation on said IL1 signal;

a second one-bit analog-to-digital (A/D) CONVERTER MEANS connected to said second AMPLIFIER MEANS for performing 1-bit quantization operation on said QL1 signal;

a third one-bit analog-to-digital (A/D) CONVERTER MEANS connected to said third AMPLIFIER MEANS for performing 1-bit quantization operation on said IL2 signal;

a fourth one-bit analog-to-digital (A/D) CONVERTER MEANS connected to said fourth AMPLIFIER MEANS for performing 1-bit quantization operation on said QL2 signal;

a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP MEANS (FF3) connected to said third one-bit A/D CONVERTER for sampling said IL2 signal, wherein said sampling operation is performed by clocking said IL2 signal through said FF3 at sampling clock (SCLK) rate; and a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate.

9. The system of claim 1, wherein each said DIGITAL CHANNEL PROCESSING MEANS further comprises:

an L1 TRACKER MEANS for tracking L1 C/A code when encryption is ON and for tracking L1 P code when encryption is OFF;

an L2 TRACKER MEANS connected to said L1 TRACKER MEANS for tracking an optimized enhanced cross-correlated W code when encryption is ON and for tracking L2 P code when encryption is OFF; and a MICROPROCESSOR MEANS system connected to said L1 TRACKER MEANS and to said L2 TRACKER MEANS;

wherein said L1 TRACKER MEANS is fed by digitized inphase IL1 and quadrature QL1 of L1 signal outputted by said IF PROCESSOR MEANS; and wherein said L2 TRACKER MEANS is fed by digitized inphase IL2 and quadrature QL2 of L2 signal outputted by said IF PROCESSOR MEANS; and wherein each said L1 and L2 TRACKER MEANS are synchronously clocked by said SCLK signal and synchronously referenced by said MSEC signal to local reference time; said SCLK and MSEC signals being outputted by said FREQUENCY SYNTHESIZER MEANS; and wherein said L2 TRACKER MEANS is fed from said L1 TRACKER MEANS by generated by said L1 TRACKER MEANS $\Sigma W_{L1}$ signal; and wherein said MICROPROCESSOR MEANS system is fed by output signals from said L1 TRACKER MEANS and said L2 TRACKER MEANS; and wherein said L1 TRACKER MEANS and said L2 TRACKER MEANS are fed by a control signal from said MICROPROCESSOR MEANS.

10. The system of claim 9, wherein said L1 TRACKER MEANS for optimized enhanced cross correlation further comprises:

a CODE GENERATOR 1 MEANS for providing a locally generated replica of C/A code, and a locally generated replica of P code;

a MULTIPLEXER MEANS 1 connected to said CODE GENERATOR 1 MEANS for selecting a locally generated code C/A when Y code is ON and for selecting a locally generated P code when Y code is OFF, said MULTIPLEXER MEANS 1 being controlled by said MICROPROCESSOR MEANS system;

a carrier numerically controlled oscillator (CARRIER NCO MEANS 1);

a CARRIER MIXER MEANS 1 connected to said CARRIER NCO MEANS 1 for multiplying outputted by said IF PROCESSOR MEANS digitized inphase IL1 and QL1 signals having carrier frequency with outputted by said CARRIER NCO MEANS 1 inphase and quadrature components of digital carrier; wherein said CARRIER MIXER MEANS 1 outputs inphase IL1 and quadrature QL1 signals having zero carrier frequency;

a CODE MIXER MEANS 1 connected to said CARRIER MIXER MEANS 1, and connected to said MULTIPLEXER MEANS 1, for code correlating said CARRIER MIXER MEANS 1 output signals with said locally generated replica of C/A code or P-code; wherein when said L1 TRACKER MEANS's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function over an integer multiple of EPOCH 1 signals; wherein said CORRELATORS MEANS 1 output signal is fed to said MICROPROCESSOR MEANS system at a rate of L1 C/A code EPOCH 1, and wherein said MICROPROCESSOR MEANS uses said CORRELATORS MEANS 1 output signal to develop feedback signals for the L1 carrier tracking loop and for the L1 code tracking loop;

a code numerically controlled oscillator (CODE NCO 1 MEANS) connected to said block CORRELATORS MEANS 1 and connected to said CODE GENERATOR 1 MEANS for providing a signal at P-code rate for driving said CODE GENERATOR 1 MEANS, said CODE NCO 1 MEANS also providing a mechanism for aligning said locally generated replica of C/A code or P-code with said incoming satellite C/A code or P-code;

a CODE MIXER MEANS 2 connected to said CARRIER MIXER MEANS 1 and connected to said CODE GENERATOR 1 MEANS, said CARRIER MIXER MEANS 1 outputting in its Q channel an estimate of L1 Y code as an input to said CODE MIXER MEANS 2 when said L1 TRACKER is tracking L1 C/A code, said CODE GENERATOR MEANS outputting said local replica of known L1 P code as an input to said CODE MIXER MEANS 2, wherein said CODE MIXER MEANS 2 removes known L1 P code from said estimate of L1 Y code and outputs an estimate of L1 W code; and a DIGITAL SUMMER 1 MEANS connected to said CODE MIXER 2 MEANS and connected to said CODE GENERATOR 1 MEANS for further processing of said estimate of L1 W code outputted by said CODE MIXER 2, wherein said DIGITAL SUMMER 1 MEANS accumulates said estimate of L1 W code over periods given by a W SYNC 1 signal outputted by said CODE GENERATOR 1, and wherein said DIGITAL SUMMER 1 outputs a $\Sigma W_{L1}$ signal for further processing by said L2 TRACKER MEANS block, and wherein said $\Sigma W_{L1}$ signal represents a series of accumulated L1 W code at the rate of said W SYNC 1 signal.

11. The system of claim 10, wherein said W SYNC 1 signal represents a period of 22 L1 P(Y) code clocks, wherein said W SYNC 1 signal is synchronized with said L1 C/A code EPOCH 1 signal.

12. The system of claim 10, said L2 TRACKER MEANS further comprising:

a carrier numerically controlled oscillator (CARRIER NCO MEANS 2);

a CARRIER MIXER MEANS 2 connected to said CARRIER NCO MEANS 2 for mixing outputted by said IF PROCESSOR MEANS digitized inphase IL2 and QL2 signals having carrier frequency with outputted by said CARRIER NCO MEANS 2 inphase and quadrature components of digital carrier; wherein said CARRIER MIXER MEANS 2 outputs inphase IL2 and quadrature QL2 signals having zero carrier frequency; and wherein when said L2 TRACKER is locked onto said L2 signal, said I output of said CARRIER MIXER 2 MEANS L2 represents an estimate of L2 Y code, and said Q output of said CARRIER MIXER 2 MEANS L2 contains no signal power;

a CODE NCO 2 MEANS, wherein said CODE NCO 2 is controlled by an L2 code tracking loop;

a CODE GENERATOR 2 MEANS connected to said CODE NCO 2, wherein said CODE NCO 2 drives said CODE GENERATOR 2 to produce a locally generated P code which is aligned with the incoming L2 satellite signal;

a CODE MIXER MEANS 3 connected to said CARRIER MIXER MEANS 2 and connected to said CODE GENERATOR 2 MEANS for code correlating said I and Q signals outputted by said CARRIER MIXER MEANS 2 with said P code outputted by said CODE GENERATOR 2; wherein said CODE MIXER 3 removes said P code from said L2 Y code; and wherein said CODE MIXER 3 develops six outputs $(I_E;I_P;I_L;Q_E;Q_P;Q_L)$ which are correlations of said I and Q signals outputted by said CARRIER MIXER MEANS 2 with said P code outputted by said CODE GENERATOR 2 at three time points (early, punctual, and late); and wherein when the encryption is off said six outputs $(I_E;I_P;I_L;Q_E;Q_P;Q_L)$ are used for closing said L2 code and carrier tracking loops;

a DIGITAL SUMMER 2 MEANS connected to said CODE MIXER 3 MEANS and connected to said CODE GENERATOR 2 MEANS; wherein said DIGITAL SUMMER 2 MEANS accumulates said signals $(I_E;I_P;I_L;Q_E;Q_P;Q_L)$ outputted by said CODE MIXER 3 across a period defined by a W SYNC 2a signal, wherein said W SYNC 2a signal is outputted by said CODE GENERATOR 2; and wherein said DIGITAL SUMMER 2 MEANS outputs accumulations of said signals $(\Sigma I_E; \Sigma I_P; \Sigma I_L; \Sigma Q_E; \Sigma Q_P; \Sigma Q_L)$ at a rate of said W SYNC 2a signal at different time points (early, punctual, and late) on the autocorrelation function of said incoming P(Y) code and said local P code generated by said CODE GENERATOR 2;

a CODE MIXER MEANS 4 connected to said DIGITAL SUMMER 2 for correlating said $(\Sigma I_E; \Sigma I_P; \Sigma I_L; \Sigma Q_E; \Sigma Q_P; \Sigma Q_L)$ signals outputted by said DIGITAL SUMMER 2 with said $\Sigma W_{L1}$ signal outputted by said DIGITAL SUMMER 1; and wherein said CODE MIXER MEANS 4 performs said code correlation at 3 time points (early, punctual and late) on the autocorrelation function graph creating an early, a punctual and a late sample of the autocorrelation function;

a MULTIPLEXER MEANS 2 connected to said CODE MIXER 4 MEANS and connected to said CODE MIXER 3 MEANS for selecting under the control of MICROPROCESSOR MEANS L2 P code when the satellite is not encrypted, and optimal digital bandwidth compression L2 tracking when the satellite is encrypted; and wherein when the satellite is not encrypted said MICROPROCESSOR MEANS selects the output of CODE MIXER 3 MEANS; and wherein when the satellite is encrypted said MICROPROCESSOR MEANS selects the output of CODE MIXER 4 MEANS; and a block CORRELATORS MEANS 2 connected to said MULTIPLEXER 2 MEANS for integrating said early, punctual and late samples of said autocorrelation function; wherein said CORRELATORS MEANS 2 accumulates correlations at a rate of SCLK if the satellite is not encrypted and a rate of W SYNC 2b if the satellite is encrypted; an output signal of said CORRELATORS 2 is fed to said MICROPROCESSOR SYSTEM at a rate of EPOCH 2; and wherein said MICROPROCESSOR SYSTEM uses said CORRELATORS 2 MEANS output signal to develop feedback signals for the L2 carrier tracking loop and for the L2 code tracking loop.

13. The system of claim 12, wherein said W SYNC 2a signal represents an L2 P code clock divided by 22, wherein said W SYNC 2a signal is synchronized with said L2 C/A code EPOCH 2 signal.

14. The system of claim 10, wherein said CARRIER NCO MEANS 1 further comprises:

an n-bit ACCUMULATOR MEANS, n being an integer, for adding a new frequency word (B1 ... Bn), B1 being the most significant bit (MSB), to a previous CARRIER NCO MEANS 1 output frequency word (Q1 ... Qn) on each sample clock, wherein said ACCUMULATOR MEANS is caused to overflow periodically at the predetermined output frequency;

a first LATCH MEANS 1 connected to said ACCUMULATOR MEANS for latching in said new frequency word B1 ... Bn under the control signal of said MICROPROCESSOR MEANS, wherein L-top bits of said ACCUMULATOR MEANS output wave are used as said CARRIER NCO MEANS 1 (I) output wave; L being an integer, L being less than n, L being greater or equal to 1; and wherein when the carrier tracking loop is locked L-top bits of said CARRIER NCO MEANS 1 output wave are used as the inphase version (I) of the carrier signal L1 which is phase locked with the satellite signal;

a first ADDER MEANS 1 for adding (01) to the 2-top bits (S1 S2) of the CARRIER NCO MEANS 1 output (S1 ... Sn) frequency word to obtain 2-top bits (R1 R2);

a third LATCH MEANS 3 connected to said first ADDER MEANS 1 for generating a quadrature version Q of carrier signal L1 by clocking in at the rate of SCLK signal said 2-top bits (R1 R2); and wherein said LATCH MEANS 3 generates said QL1 signal in the form of L-bit word (R1 R2 S3 ... SL);

a second LATCH MEANS 2 connected to said ACCUMULATOR MEANS for latching top m bits (C1 ... Cm), m being an integer (m<n), of the CARRIER NCO MEANS 1 output signal on the edge of the MSEC timing signal, wherein said (C1 ... Cm) signal represents a carrier phase measurement signal.

15. The system of claim 14, wherein said n-bit ACCUMULATOR MEANS with said L-bit output wave further comprises:

a second ADDER MEANS 2 connected to said first LATCH MEANS 1 for adding a frequency word (B1 .

. . Bn), B1 being the most significant bit (MSB), to a previous CARRIER NCO MEANS 1 frequency output (Q1 . . . Qn) on each sample clock; and a fourth LATCH MEANS 4 connected to said second ADDER MEANS 2 for generating said output CARRIER NCO MEANS 1 signal (Q1 . . . Qn), wherein said fourth LATCH MEANS 4 is caused to overflow at the desired output frequency, and wherein L-top output bits of said fourth LATCH MEANS are used as said CARRIER NCO MEANS 1 output signal.

16. The system of claim 12, wherein said CARRIER NCO MEANS 2 further comprises:

an n-bit ACCUMULATOR MEANS, n being an integer, for adding a new frequency word (B1 . . . Bn), B1 being the most significant bit (MSB), to a previous CARRIER NCO MEANS 2 output frequency word (Q1 . . . Qn) on each sample clock, wherein said ACCUMULATOR MEANS is caused to overflow periodically at the predetermined output frequency;

a first LATCH MEANS 1 connected to said ACCUMULATOR MEANS for latching in said new frequency word B1 . . . Bn under the control signal of said MICROPROCESSOR MEANS, wherein L-top bits of said ACCUMULATOR MEANS output wave are used as said CARRIER NCO MEANS 2 (I) output wave; L being an integer, L being less than n, L being greater or equal to 1; and wherein when the carrier tracking loop is locked L-top bits of said CARRIER NCO MEANS 2 output wave are used as the inphase version (I) of the carrier signal L2 which is phase locked with the satellite signal;

a first ADDER MEANS 1 for adding (01) to the 2-top bits (S1 S2) of the CARRIER NCO MEANS 2 output (S1 . . . Sn) frequency word to obtain 2-top bits (R1 R2);

a third LATCH MEANS 3 connected to said first ADDER MEANS 1 for generating a quadrature version Q of carrier signal L2 by clocking in at the rate of SCLK signal said 2-top bits (R1 R2); and wherein said LATCH MEANS 3 generates said QL2 signal in the form of L-bit word (R1 R2 S3 . . . SL);

a second LATCH MEANS 2 connected to said ACCUMULATOR MEANS for latching top m bits (C1 . . . Cm) of the CARRIER NCO MEANS 1 output signal on the edge of the MSEC timing signal, m being an integer, m being less than n; wherein said (C1 . . . Cm) signal represents a carrier phase measurement signal.

17. The system of claim 16, wherein said n-bit ACCUMULATOR MEANS with said L-bit output wave further comprises:

a second ADDER MEANS 2 connected to said first LATCH MEANS 1 for adding a frequency word (B1 . . . Bn), B1 being the most significant bit (MSB), to a previous CARRIER NCO MEANS 2 frequency output (Q1 . . . Qn) on each sample clock; and a fourth LATCH MEANS 4 connected to said second ADDER MEANS 2 for generating said output CARRIER NCO MEANS 2 signal (Q1 . . . Qn), wherein said fourth LATCH MEANS 4 is caused to overflow at the desired output frequency and wherein L-top output bits of said fourth LATCH MEANS are used as said CARRIER NCO MEANS 2 output signal.

18. The system of claim 10, wherein said CARRIER MIXER MEANS 1 further comprises:

a first MULTIPLIER MEANS 1, wherein said first MULTIPLIER MEANS 1 performs a multiplication operation of L-bits of IL1 satellite carrier signal and M-bits of inphase version I of carrier frequency, and wherein said first MULTIPLIER MEANS 1 outputs a (IL1)*I signal;

a second MULTIPLIER MEANS 2, wherein said second MULTIPLIER MEANS 2 performs a multiplication operation of L-bits of QL1 satellite carrier signal and M-bits of quadrature version Q of carrier frequency, and wherein said second MULTIPLIER MEANS 2 outputs a (QL1)*Q signal;

a first ADDER MEANS 1 connected to said first MULTIPLIER MEANS 1 and connected to said second MULTIPLIER MEANS 2 for subtracting said (QL1)*Q signal from said (IL1)*I signal;

a third MULTIPLIER MEANS 3, wherein said third MULTIPLIER MEANS 3 performs a multiplication operation of L-bits of IL1 satellite carrier signal and M-bits of quadrature version Q of carrier frequency, and wherein said third MULTIPLIER MEANS 3 outputs a (IL1)*Q signal;

a fourth MULTIPLIER MEANS 4, wherein said fourth MULTIPLIER MEANS 4 performs a multiplication operation of L-bits of QL1 satellite carrier signal and M-bits of inphase version I of carrier frequency, and wherein said fourth MULTIPLIER MEANS 4 outputs a (QL1)*I signal; and a second ADDER MEANS 2 connected to said third MULTIPLIER MEANS 3 and connected to said fourth MULTIPLIER MEANS 4 for adding said (QL1)*I signal to said (IL1)*Q signal.

19. The system of claim 12, wherein said CARRIER MIXER MEANS 2 further comprises:

a first MULTIPLIER MEANS 1, wherein said first MULTIPLIER MEANS 1 performs a multiplication operation of M-bits of IL2 satellite carrier signal and L-bits of inphase version I of carrier frequency, and wherein said first MULTIPLIER MEANS 1 outputs a (IL2)*I signal;

a second MULTIPLIER MEANS 2, wherein said second MULTIPLIER MEANS 2 performs a multiplication operation of M-bits of QL2 satellite carrier signal and L-bits of quadrature version Q of carrier frequency, and wherein said second MULTIPLIER MEANS 2 outputs a (QL2)*Q signal;

a first ADDER MEANS 1 connected to said first MULTIPLIER MEANS 1 and connected to said second MULTIPLIER MEANS 2 for subtracting said (QL2)*Q signal from said (IL2)*I signal;

a third MULTIPLIER MEANS 3, wherein said third MULTIPLIER MEANS 3 performs a multiplication operation of M-bits of IL2 satellite carrier signal and L-bits of quadrature version Q of carrier frequency, and wherein said third MULTIPLIER MEANS 3 outputs a (IL2)*Q signal;

a fourth MULTIPLIER MEANS 4, wherein said fourth MULTIPLIER MEANS 4 performs a multiplication operation of M-bits of QL2 satellite carrier signal and L-bits of inphase version I of carrier frequency, and wherein said fourth MULTIPLIER MEANS 4 outputs a (QL2)*I signal; and a second ADDER MEANS 2 connected to said third MULTIPLIER MEANS 3 and connected to said fourth MULTIPLIER MEANS 4 for adding said (QL2)*I signal to said (IL2)*Q signal.

20. The system of claim 10, wherein said CODE MIXER MEANS 1 further comprises:

a first MULTIPLIER MEANS 1 for multiplying said incoming I signal with an early version (E) of said local C/A code or P-code;

a second MULTIPLIER MEANS 2 for multiplying said incoming I signal with a punctual version (P) of said local C/A code or P-code;

a third MULTIPLIER MEANS 3 for multiplying said incoming I signal with a late version (L) of said local C/A code or P-code;

a fourth MULTIPLIER MEANS 4 for multiplying said incoming Q signal with an early version (E) of said local C/A code or P-code;

a fifth MULTIPLIER MEANS 5 for multiplying said incoming Q signal with a punctual version (P) of said local C/A code or P-code; and a sixth MULTIPLIER MEANS 6 for multiplying said incoming Q signal with a late version (L) of said local C/A code or P-code.

21. The system of claim 10, wherein said CODE MIXER MEANS 2 further comprises:

a MULTIPLIER MEANS for multiplying said incoming L1Y code estimate with said locally generated L1P code, wherein said MULTIPLIER MEANS outputs an L1W code estimate.

22. The system of claim 12, wherein said CODE MIXER MEANS 3 further comprises:

a first MULTIPLIER MEANS 1 for multiplying M-bit of said I estimate of the incoming satellite L2 code at early time point (E) on the autocorrelation function graph with said locally generated L2 P code; said first MULTIPLIER MEANS creating an early $I_E$ correlation;

a second MULTIPLIER MEANS 2 for multiplying M-bit of said I estimate of the incoming satellite L2 code at punctual time point (P) on the autocorrelation function graph with said locally generated L2 P code; said second MULTIPLIER MEANS creating a punctual $I_P$ correlation;

a third MULTIPLIER MEANS 3 for multiplying M-bit of said I estimate of the incoming satellite L2 code at late time point (L) on the autocorrelation function graph with said locally generated L2 P code; said third MULTIPLIER MEANS 3 creating a late $I_L$ correlation;

a fourth MULTIPLIER MEANS 4 for multiplying M-bit of said Q estimate of the incoming satellite L2 code at early time point (E) on the autocorrelation function graph with said locally generated L2 P code; said fourth MULTIPLIER MEANS 4 creating an early $Q_E$ correlation;

a fifth MULTIPLIER MEANS 5 for multiplying M-bit of said Q estimate of the incoming satellite L2 code at punctual time point (P) on the autocorrelation function graph with said locally generated L2 P code; said fifth MULTIPLIER MEANS 5 creating a punctual $Q_P$ correlation; and a sixth MULTIPLIER MEANS 6 for multiplying M-bit of said Q estimate of the incoming satellite L2 code at late time point (L) on the autocorrelation function graph with said locally generated L2 P code; said sixth MULTIPLIER MEANS 6 creating a late $Q_L$ correlation.

23. The system of claim 12, wherein said CODE MIXER MEANS 4 is designed for mixing the L2 time delayed signals ($\Sigma I_E; \Sigma I_P; \Sigma I_L; \Sigma Q_E; \Sigma Q_P;$ and $\Sigma Q_L$) with the estimated L1 W-code bit ($\Sigma W_{L1}$); said CODE MIXER 4 further comprising:

a first MULTIPLIER MEANS 1 for multiplying said $\Sigma I_E$ signal with said $\Sigma W_{L1}$ signal; said first MULTIPLIER 1 outputting E-early with respect to the P code autocorrelation function correlations of the IL2 signal;

a second MULTIPLIER MEANS 2 for multiplying said $\Sigma I_P$ signal with said $\Sigma W_{L1}$ signal; said second MULTIPLIER 2 outputting P-punctual with respect to the P code autocorrelation function correlations of the IL2 signal;

a third MULTIPLIER MEANS 3 for multiplying said $\Sigma I_L$ signal with said $\Sigma W_{L1}$ signal; said third MULTIPLIER 3 outputting L-late with respect to the P code autocorrelation function correlations of the IL2 signal;

a fourth MULTIPLIER MEANS 4 for multiplying said $\Sigma Q_E$ signal with said $\Sigma W_{L1}$ signal; said fourth MULTIPLIER 4 outputting E-early with respect to the P code autocorrelation function correlations of the QL2 signal;

a fifth MULTIPLIER MEANS 5 for multiplying said $\Sigma Q_P$ signal with said $\Sigma W_{L1}$ signal; said fifth MULTIPLIER 5 outputting P-punctual with respect to the P code autocorrelation function correlations of the QL2 signal;

a sixth MULTIPLIER MEANS 6 for multiplying said $\Sigma Q_L$ signal with said $\Sigma W_{L1}$ signal; said sixth MULTIPLIER 6 outputting L-late with respect to the P code autocorrelation function correlations of the QL2 signal.

24. The system of claim 10, wherein said CODE GENERATOR 1 MEANS further comprises:

a first DIVIDING MEANS for dividing an input signal from said CODE NCO 1 MEANS to provide a C/A CODE GENERATOR MEANS clock signal;

a C/A CODE GENERATOR MEANS connected to said first DIVIDING MEANS for generating a C/A code signal and an EPOCH 1 signal under the CONTROL signal of said MICROPROCESSOR MEANS, wherein said C/A code signal is the locally generated C/A code, and wherein said EPOCH 1 signal is the repetition rate of said C/A code, and wherein said C/A CODE GENERATOR can be adjusted under said CONTROL signal to generate a particular satellite's C/A code;

a P CODE GENERATOR MEANS connected to said CODE NCO 1 MEANS, wherein said P CODE GENERATOR MEANS is clocked by said CODE NCO 1 MEANS signal under the CONTROL signal of said MICROPROCESSOR MEANS, and wherein said P CODE GENERATOR generates a P-code signal, and wherein said P CODE GENERATOR can be adjusted under said CONTROL signal to generate a particular satellite's P code;

a DIVIDE BY N block connected to said C/A CODE GENERATOR, wherein said EPOCH 1 signal is used to reset said DIVIDE BY N block; and a DELAY BY $\tau$ block connected to said DIVIDE BY N block outputting a W SYNC 1 signal, wherein said W SYNC 1 signal is used as the L1 W code estimate timing signal.

25. The system of claim 24, wherein said DIVIDE BY N block comprises a DIVIDE BY 22 block, and wherein said first DIVIDING MEANS comprises a DIVIDE BY 10 block, and wherein said $\tau$ delay is equal to zero.

26. The system of claim 12, wherein said CODE GENERATOR 2 MEANS further comprises:

a first DIVIDING MEANS for dividing an input signal from said CODE NCO 2 MEANS to provide a C/A CODE GENERATOR MEANS clock signal;

a C/A CODE GENERATOR MEANS connected to said first DIVIDING MEANS for generating an EPOCH 2 signal under the CONTROL signal of said MICROPROCESSOR MEANS, and wherein said EPOCH 2 signal is used as one of said CORRELATORS 2 block control signals;

a P CODE GENERATOR MEANS connected to said CODE NCO 2 MEANS, wherein said P CODE GENERATOR MEANS is clocked by said CODE NCO 2 MEANS signal under the CONTROL signal of said MICROPROCESSOR MEANS, and wherein said P CODE GENERATOR generates a P-code signal, and wherein said P CODE GENERATOR can be adjusted under said CONTROL signal to generate a particular satellite's P code;

a DIVIDE BY N block connected to said C/A CODE GENERATOR, wherein said EPOCH 2 signal is used to reset said DIVIDE BY N block; and a DELAY BY $\tau$ block connected to said DIVIDE BY N block for outputting a W SYNC 2a signal and a W SYNC 2b signal, wherein said W SYNC 2a signal and said W SYNC 2b signal are synchronized to said estimate of L2 W code.

27. The system of claim 26, wherein said DIVIDE BY N block comprises a DIVIDE BY 22 block, and wherein said first DIVIDING MEANS comprises a DIVIDE BY 10 block, and wherein said $\tau$ delay is equal to zero.

28. The system of claim 26, wherein said W SYNC 2b signal comprises the logical inversion of said W SYNC 2a signal.

29. The system of claim 10, wherein said block CORRELATORS MEANS 1 is used for integrating said IE (inphase early), said IP (inphase punctual), said IL (inphase late), said QE (quadrature early), said QP (quadrature punctual), and said QL (quadrature late) versions of the correlated samples of said L1 C/A (or P) code with said locally generated version of C/A (or P) code across a time period given by a multiple of L1 C/A EPOCH 1; and wherein said IE, IL, QE, and QL are used by said code tracking loop by forming:

a code phase estimate=K1(IE−IL), when said carrier loop is locked; or a code phase estimate=K1 $[(IE^2+QE^2)^{1/2}-(IL^2+QL^2)^{1/2}]$, when said carrier loop is not locked; where K1 is a L1 code loop gain factor; and wherein said IP, and QP are used by said carrier tracking loop by forming:

a carrier phase estimate=arctan(QP/IP); said block CORRELATORS MEANS 1 further comprising:

a first UP/DOWN COUNTER MEANS 1 for integrating said IE across a period defined by said C/A EPOCH 1 signal; wherein said UP/DOWN COUNTER MEANS 1 adds if the input is positive and subtracts if it is negative and is reset on EPOCH 1; and a first LATCH MEANS 1 connected to said first UP/DOWN COUNTER MEANS 1 for reading by said MICROPROCESSOR MEANS system said IE signal integrated by said UP/DOWN COUNTER MEANS 1;

a second UP/DOWN COUNTER MEANS 2 for integrating said IP across a period defined by said C/A EPOCH 1 signal; wherein said UP/DOWN COUNTER MEANS 2 adds if the input is positive and subtracts if it is negative and is reset on EPOCH 1; and a second LATCH MEANS 2 connected to said second UP/DOWN COUNTER MEANS 2 for reading by said MICROPROCESSOR MEANS system said IP signal integrated by said UP/DOWN COUNTER MEANS 2;

a third UP/DOWN COUNTER MEANS 3 for integrating said IL signal across a period defined by said C/A EPOCH 1 signal; wherein said UP/DOWN COUNTER MEANS 3 adds if the input is positive and subtracts if it is negative and is reset on EPOCH 1; and a third LATCH MEANS 3 connected to said third UP/DOWN COUNTER MEANS 3 for reading by said MICROPROCESSOR MEANS system said IL signal integrated by said UP/DOWN COUNTER MEANS 3;

a fourth UP/DOWN COUNTER MEANS 4 for integrating said QE signal across a period defined by said C/A EPOCH 1 signal; wherein said UP/DOWN COUNTER MEANS 4 adds if the input is positive and subtracts if it is negative and is reset on EPOCH 1; and a fourth LATCH MEANS 4 connected to said fourth UP/DOWN COUNTER MEANS 4 for reading by said MICROPROCESSOR MEANS system said QE signal integrated by said UP/DOWN COUNTER MEANS 4;

a fifth UP/DOWN COUNTER MEANS 5 for integrating said QP signal across a period defined by said C/A EPOCH 1 signal; wherein said UP/DOWN COUNTER MEANS 5 adds if the input is positive and subtracts if it is negative and is reset on EPOCH 1; and a fifth LATCH MEANS connected to said fifth UP/DOWN COUNTER MEANS 5 for reading by said MICROPROCESSOR MEANS system said QP signal integrated by said UP/DOWN COUNTER MEANS 5;

a sixth UP/DOWN COUNTER MEANS 6 for integrating said QL across a period defined by said C/A EPOCH 1 signal; wherein said UP/DOWN COUNTER MEANS 6 adds if the input is positive and subtracts if it is negative and is reset on EPOCH 1; and a sixth LATCH MEANS 6 connected to said sixth UP/DOWN COUNTER MEANS 6 for reading by said MICROPROCESSOR MEANS system said QL signal integrated by said UP/DOWN COUNTER MEANS 6.

30. The system of claim 12, wherein said block CORRELATORS MEANS 2 accumulates the result of L2 P code correlation when the satellite is not encrypted, and accumulates the result of the optimal digital bandwidth compression L2 tracking when the satellite is encrypted; and wherein said block CORRELATORS MEANS 2 is used for integrating said IE (inphase early), said IP (inphase punctual), said IL (inphase late), said QE (quadrature early), said QP (quadrature punctual), and said QL (quadrature late) version of the L2 code across a time period given by said EPOCH 2 signal; and wherein said IE, IL, QE, and QL are used by said code tracking loop by forming:

a code phase estimate=K2(IE−IL), when said carrier loop is locked; or a code phase estimate=K2$[(IE^2+QE^2)^{1/2}-(IL^2+QL^2)^{1/2}]$, when said carrier loop is not locked; K2 being an L2-code loop gain factor; and wherein said PQ, and PI codes are used by said carrier tracking loop by forming:

a carrier phase estimate=arctan(PQ/PI);

said block CORRELATORS MEANS 2 further comprising:

a first UP/DOWN COUNTER MEANS 1 for integrating said IE signal across a period defined by said EPOCH 2 signal; wherein said UP/DOWN COUNTER MEANS 1 adds if the input is positive and subtracts if it is negative and is reset on EPOCH 2 signal; and wherein when the satellite is encrypted said UP/DOWN COUNTER MEANS 1 accumulates on each edge of said W SYNC $2b$ signal; and wherein when the satellite is not encrypted said UP/DOWN COUNTER MEANS 1 accumulates on each edge of said SCLK signal;

a first LATCH MEANS 1 connected to said first UP/DOWN COUNTER MEANS 1 for reading by said MICROPROCESSOR MEANS system via said MULTIPLEXER 3 block said IE signal integrated by said UP/DOWN COUNTER MEANS 1 at a rate of EPOCH 2 signal;

a second UP/DOWN COUNTER MEANS 2 for integrating said IP signal across a period defined by said EPOCH 2 signal; wherein said UP/DOWN COUNTER MEANS 2 adds if the input is positive and subtracts if it is negative and is reset on EPOCH 2 signal; and wherein when the satellite is encrypted said UP/DOWN COUNTER MEANS 2 accumulates on each edge of said W SYNC $2b$ signal; and wherein when the satellite is not encrypted said UP/DOWN COUNTER MEANS 2 accumulates on each edge of said SCLK signal;

a second LATCH MEANS 2 connected to said second UP/DOWN COUNTER MEANS 2 for reading by said MICROPROCESSOR MEANS system via said MULTIPLEXER 3 block said IP signal integrated by said UP/DOWN COUNTER MEANS 2 at a rate of EPOCH 2 signal;

a third UP/DOWN COUNTER MEANS 3 for integrating said IL signal across a period defined by said EPOCH 2 signal; wherein said UP/DOWN COUNTER MEANS 3 adds if the input is positive and subtracts if it is negative and is reset on EPOCH 2 signal; and wherein when the satellite is encrypted said UP/DOWN COUNTER MEANS 3 accumulates on each edge of said W SYNC $2b$ signal; and wherein when the satellite is not encrypted said UP/DOWN COUNTER MEANS 3 accumulates on each edge of said SCLK signal;

a third LATCH MEANS 3 connected to said third UP/DOWN COUNTER MEANS 3 for reading by said MICROPROCESSOR MEANS system via said MULTIPLEXER 3 block said IL signal integrated by said UP/DOWN COUNTER MEANS 3 at a rate of EPOCH 2 signal;

a fourth UP/DOWN COUNTER MEANS 4 for integrating said QE signal across a period defined by said EPOCH 2 signal; wherein said UP/DOWN COUNTER MEANS 4 adds if the input is positive and subtracts if it is negative and is reset on EPOCH 2 signal; and wherein when the satellite is encrypted said UP/DOWN COUNTER MEANS 4 accumulates on each edge of said W SYNC $2b$ signal; and wherein when the satellite is not encrypted said UP/DOWN COUNTER MEANS 4 accumulates on each edge of said SCLK signal;

a fourth LATCH MEANS 4 connected to said fourth UP/DOWN COUNTER MEANS 4 for reading by said MICROPROCESSOR MEANS system via said MULTIPLEXER 3 block said QE signal integrated by said UP/DOWN COUNTER MEANS 4 at a rate of EPOCH 2 signal;

a fifth UP/DOWN COUNTER MEANS 5 for integrating said QP signal across a period defined by said EPOCH 2 signal; wherein said UP/DOWN COUNTER MEANS 5 adds if the input is positive and subtracts if it is negative and is reset on EPOCH 2 signal; and wherein when the satellite is encrypted said UP/DOWN COUNTER MEANS 5 accumulates on each edge of said W SYNC $2b$ signal; and wherein when the satellite is not encrypted said UP/DOWN COUNTER MEANS 5 accumulates on each edge of said SCLK signal;

a fifth LATCH MEANS 5 connected to said fifth UP/DOWN COUNTER MEANS 5 for reading by said MICROPROCESSOR MEANS system via said MULTIPLEXER 3 block said QP signal integrated by said UP/DOWN COUNTER MEANS 5 at a rate of EPOCH 2 signal;

a sixth UP/DOWN COUNTER MEANS 6 for integrating said IE across a period defined by said EPOCH 2 signal; wherein said UP/DOWN COUNTER MEANS 6 adds if the input is positive and subtracts if it is negative and is reset on EPOCH 2; and wherein when the satellite is encrypted said UP/DOWN COUNTER MEANS 6 accumulates on each edge of said W SYNC $2b$ signal; and wherein when the satellite is not encrypted said UP/DOWN COUNTER MEANS 6 accumulates on each edge of said SCLK signal;

a sixth LATCH MEANS 6 connected to said sixth UP/DOWN COUNTER MEANS 6 for reading by said MICROPROCESSOR MEANS system via said MULTIPLEXER 3 block said QL signal integrated by said UP/DOWN COUNTER MEANS 6 at a rate of EPOCH 2 signal.

31. The system of claim 10, wherein said CODE NCO 1 MEANS provides a clock for said CODE GENERATOR 1 MEANS which generates said locally generated replica of C/A code and P code; said CODE NCO 1 MEANS further comprising:

a n-bit ADDER MEANS, n being an integer;

an n-bit LATCH MEANS; and a MULTIPLEXER MEANS connected to said n-bit ADDER MEANS;

wherein on each sample clock edge the output of said LATCH MEANS is added to the output of said MULTIPLEXER MEANS by Said ADDER MEANS; and wherein said MULTIPLEXER MEANS outputs one of three n-bit values (N, M or SHIFT); and wherein said CODE NCO 1 MEANS under normal operation outputs:

CODE NCO 1 MEANS frequency=$(N \times SCLK)/(2^n-M+N)$;

and wherein said CODE NCO 1 MEANS under code phase shift operation outputs:

code phase shift=$(M-SHIFT)/(2^n-M+N)$.

32. The system of claim 10, wherein said CODE NCO 1 MEANS provides a clock for said CODE GENERATOR 1 MEANS which generates said locally generated replica of C/A code and P code; said CODE NCO 1 MEANS further comprising:

a 12-bit ADDER MEANS;

a 12-bit LATCH MEANS connected to said 12-bit ADDER MEANS; and a MULTIPLEXER MEANS connected to said 12-bit ADDER MEANS; wherein on each sample clock edge the output of said LATCH MEANS is added to the output of said MULTIPLEXER MEANS by said ADDER MEANS; and wherein said MULTIPLEXER MEANS outputs one of three 12-bit values (N=1023, M=2619, or SHIFT); and wherein said CODE NCO 1 MEANS under normal operation outputs:

CODE NCO 1 MEANS frequency=10.23 MHz;

and wherein said CODE NCO 1 MEANS under code phase shift operation outputs:

code phase shift=(2619-SHIFT)/2500 sample clocks.

33. The system of claim 12, wherein said CODE NCO 2 MEANS provides a clock for said CODE GENERATOR 2 MEANS which generates said locally generated replica of P code and W SYNC 2a signal; said CODE NCO 2 MEANS further comprising:

an n-bit ADDER MEANS, n being an integer;

an n-bit LATCH MEANS connected to said n-bit ADDER MEANS; and a MULTIPLEXER MEANS connected to said n-bit ADDER MEANS; wherein on each sample clock edge the output of said LATCH MEANS is added to the output of said MULTIPLEXER MEANS by said ADDER MEANS; and wherein said MULTIPLEXER MEANS outputs one of three n-bit values (N , M or SHIFT); and wherein said CODE NCO 2 MEANS under normal operation outputs:

CODE NCO 2 MEANS frequency=$(N \times SCLK)/(2^n-M+N)$; and wherein said CODE NCO 2 MEANS under code phase shift operation outputs:

code phase shift=$(M-SHIFT)/(2^n-M+N)$.

34. The system of claim 12, wherein said CODE NCO 2 MEANS provides a clock for said CODE GENERATOR 2 MEANS which generates said locally generated replica of P code and said W SYNC 2a signal; said CODE NCO 2 MEANS further comprising:

a 12-bit ADDER MEANS;

a 12-bit LATCH MEANS connected to said 12-bit ADDER MEANS; and a MULTIPLEXER MEANS connected to said 12-bit ADDER MEANS;

wherein on each sample clock edge the output of said LATCH MEANS is added to the output of said MULTIPLEXER MEANS by said ADDER MEANS; and wherein said MULTIPLEXER MEANS outputs one of three 12-bit values (N=1023, M=2619, or SHIFT); and wherein said CODE NCO 2 MEANS under normal operation outputs:

CODE NCO 2 MEANS frequency=10.23 MHz;

and wherein said CODE NCO 2 MEANS under code phase shift operation outputs:

code phase shift=(2619-SHIFT)/2500 sample clocks.

35. The system of claim 10, wherein said DIGITAL SUMMER 1 further comprises:

a DIGITAL SUMMER ACCUMULATOR block accumulating said L1 W code over the period of W SYNC 1 signal and outputting an $\Sigma W_{L1}$ signal equal to an $\Sigma(L1W)$ code accumulation during said W SYNC 1 period.

36. The system of claim 12, wherein said DIGITAL SUMMER 2 further comprises:

a DIGITAL SUMMER ACCUMULATOR 1 block accumulating said I component of L2 W code early estimate $I_E$ over the period of W SYNC 2a signal and outputting an $\Sigma I_E$ accumulation every W SYNC 2a period;

a DIGITAL SUMMER ACCUMULATOR 2 block accumulating said I component of L2 W code punctual estimate $I_P$ over the period of W SYNC 2a signal and outputting an $\Sigma I_P$ accumulation every W SYNC 2a period;

a DIGITAL SUMMER ACCUMULATOR 3 block accumulating said I component of L2 W code late estimate $I_L$ over the period of W SYNC 2a signal and outputting an $\Sigma I_L$ accumulation every W SYNC 2a period;

a DIGITAL SUMMER ACCUMULATOR 4 block accumulating said Q component of L2 W code early estimate $Q_E$ over the period of W SYNC 2a signal and outputting an $\Sigma Q_E$ accumulation every W SYNC 2a period;

a DIGITAL SUMMER ACCUMULATOR 5 block accumulating said Q component of L2 W code punctual estimate $Q_P$ over the period of W SYNC 2a signal and outputting an $\Sigma Q_P$ accumulation every W SYNC 2a period; and a DIGITAL SUMMER ACCUMULATOR 6 block accumulating said Q component of L2 W code late estimate $Q_L$ over the period of W SYNC 2a signal and outputting an $\Sigma Q_L$ accumulation every W SYNC 2a period.

37. The system of claim 35, wherein said DIGITAL SUMMER ACCUMULATOR takes as an input signal said L1 W code and accumulates said L1 W code every SCLK edge over said period of W SYNC 1 signal, said DIGITAL SUMMER ACCUMULATOR outputting an $\Sigma W_{L1}$ signal equal to an $\Sigma(L1W)$ code accumulation during said W SYNC 1 period; said DIGITAL SUMMER ACCUMULATOR further comprising:

an ADDER 1 MEANS for inputting said Win equal to said estimated L1 W code signal;

a LATCH 1 MEANS connected to said ADDER 1 MEANS, wherein said W SYNC 1 signal clears said LATCH 1 for preparation for the next accumulation; and wherein said LATCH 1 and said ADDER 1 perform the accumulation of the Win=L1 W code signal over the period of W SYNC 1 signal; and a LATCH 2 MEANS connected to said LATCH 1 MEANS and connected to said ADDER 1 MEANS for latching in said W SYNC 1 signal and for producing said output signal Wout=$\Sigma(L1W)$ code accumulations over the period of said W SYNC 1 signal.

38. The system of claim 36, wherein said DIGITAL SUMMER ACCUMULATOR (as applied to said DIGITAL SUMMER 1) takes as an input signal said I, E, or P versions of I or Q components of said L2 W code and outputs an accumulation of said input signal every W SYNC 2a period; said DIGITAL SUMMER ACCUMULATOR further comprising:

an ADDER 1 MEANS for inputting said input signal equal to said I, E, or P versions of I or Q components of said L2 W code signal;

a LATCH 1 MEANS connected to said ADDER 1 MEANS, wherein said W SYNC 2a signal clears said LATCH 1 for preparation for the next accumulation; and a LATCH 2 MEANS connected to said LATCH 1 MEANS and connected to said ADDER 1 MEANS for latching in said W SYNC 2a signal and for producing said output signal Wout equal to accumulations over the period of said W SYNC 2a signal of said I, E, or P versions of I or Q components of said L2 W code signal.

39. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS, said DIGITAL CHANNEL PROCESSING MEANS further comprising:

means for generating local replica of said C/A code modulated on L1 carrier frequency signal;

means for generating local replica of said P code modulated on L1 carrier frequency signal, wherein said locally generated replica of L1 signal does not contain propagation noise;

means for generating local replica of said P code modulated on L2 carrier frequency signal, wherein said locally generated replica of L2 signal does not contain propagation noise;

means for extracting of an estimate of said Y code from said L1 signal, and from said L2 signal, wherein said estimate signals contain propagation noise;

means for correlating a locally generated replica of C/A code with the received L1 code for obtaining an estimate of L1 group delay ( L1 pseudo-range) and L1 carrier phase;

means for removing said P code from said locally extracted estimate of said L1 Y code to obtain a locally extracted estimate of said L1 W code;

means for removing said P code from said locally extracted estimate of said L2 Y code to obtain a locally extracted estimate of said L2 W code;

means for integrating estimate of said L1 W-code across the period of $T_0$, wherein said period $T_0$ is equal to the inverse zero-frequency $1/F_0$ of the W-code energy spectrum, and wherein said zero-frequency $F_0$ is the first frequency at which said W-code energy spectrum is equal to zero, and wherein said L1 W- code is non-synchronized to the signal C/A code EPOCH 1;

means for integrating estimate of said L2 W-code estimate across the period of $T_0$, wherein said L2 W- code is non-synchronized to the signal C/A code EPOCH 2; and means for multiplying said integrated estimates of L1 W-code with said integrated early, late, and punctual estimates of L2 W-code over a time period greater than a msec to ensure that the resulting correlated signal has a sufficient power for closing the L2 -code and L2-carrier tracking loops.

40. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS, said DIGITAL CHANNEL PROCESSING MEANS further comprising:

means for generating local replica of said C/A code modulated on L1 carrier frequency signal;

means for generating local replica of said P code modulated on L1 carrier frequency signal, wherein said locally generated replica of L1 signal does not contain propagation noise;

means for generating local replica of said P code modulated on L2 carrier frequency signal, wherein said locally generated replica of L2 signal does not contain propagation noise;

means for extracting of an estimate of said Y code from said L1 signal, and from said L2 signal, wherein said estimate signals contain propagation noise;

means for correlating a locally generated replica of C/A code with the received L1 code for obtaining an estimate of L1 group delay ( L1 pseudo-range) and L1 carrier phase;

means for removing said P code from said locally extracted estimate of said L1 Y code to obtain a locally extracted estimate of said L1 W code;

means for removing said P code from said locally extracted estimate of said L2 Y code to obtain a locally extracted estimate of said L2 W code;

means for synchronizing said L1 W-code in respect to the signal C/A code EPOCH 1;

means for shifting in time said L1 W-code in respect to the signal C/A code EPOCH 1;

means for integrating estimate of said L1 W-code across the period of $T_0$, wherein said period $T_0$ is equal to the inverse zero-frequency $1/F_0$ of the W-code energy spectrum, and wherein said zero-frequency $F_0$ is the first frequency at which said W-code energy spectrum is equal to zero;

means for synchronizing said L2 W- code in respect to the signal C/A code EPOCH 2;

means for shifting in time said L2 W-code in respect to the signal C/A code EPOCH 2;

means for integrating estimate of said L2 W-code estimate across the period of $T_0$; and means for multiplying Said integrated estimates of L1 W-code with said integrated early, late, and punctual estimates of L2 W-code over a time period greater than a msec to ensure that the resulting correlated signal has a sufficient power for closing the L2-code and L2-carrier tracking loops.

41. A method for optimum correlation processing of L1 and L2 signals received from a SPS satellite by a correlation processing system; said system comprising a RECEIVING MEANS and at least one DIGITAL CHANNEL PROCESSING MEANS; said method comprising the steps of:

providing said RECEIVING MEANS and at least one said DIGITAL CHANNEL PROCESSING MEANS;

receiving a known C/A code modulated on L1 carrier frequency, an unknown Y code modulated on L1 carrier frequency signal, an unknown Y code modulated on L2 carrier frequency signal by said RECEIVING MEANS; wherein said received L1, and L2 signals contain propagation noise; and wherein said Y code comprises a known P code and an unknown W code;

generating local replica of said C/A code modulated on L1 carrier frequency signal by each said DIGITAL CHANNEL PROCESSING MEANS;

generating local replica of said P code modulated on L1 carrier frequency signal by each said DIGITAL CHANNEL PROCESSING MEANS; wherein said locally generated replica of L1 signal does not contain propagation noise;

generating local replica of said P code modulated on L2 carrier frequency signal by each said DIGITAL CHANNEL PROCESSING MEANS; wherein said locally generated replica of L2 signal does not contain propagation noise;

extracting of an estimate of said Y code from said L1 signal, and from said L2 signal by each said DIGITAL CHANNEL PROCESSING MEANS; wherein said estimate signals contain propagation noise;

correlating a locally generated replica of C/A code with the received L1 code for obtaining an estimate of L1 group delay ( L1 pseudo-range) and L1 carrier phase;

removing said P code from said locally extracted estimate of said L1 Y code by each said DIGITAL CHANNEL PROCESSOR to obtain a locally extracted estimate of said L1 W code;

removing said P code from said locally extracted estimate of said L2 Y code by each said DIGITAL CHANNEL PROCESSOR MEANS to obtain a locally extracted estimate of said L2 W code;

synchronizing said L1 W-code in respect to the signal C/A code EPOCH 1;

integrating said estimate of said L1 W-code across the period of $T_0$, wherein said period $T_0$ is equal to the inverse zero-frequency $1/F_0$ of the W-code energy spectrum, and wherein said zero-frequency $F_0$ is the first frequency at which said W-code energy spectrum is equal to zero;

synchronizing said L2 W-code in respect to the signal C/A code EPOCH 2;

integrating said estimate of L2 W-code across the period of $T_0$; and multiplying said integrated estimates of L1 W-code with said integrated early, late, and punctual estimates of L2 W-code over a time period greater than a msec to ensure that the resulting correlated signal has a sufficient power for closing the L2-code and L2-carrier tracking loops.

42. A method for optimum correlation processing of L1 and L2 signals received from a SPS satellite by a correlation processing system; said system comprising a RECEIVING MEANS and at least one DIGITAL CHANNEL PROCESSING MEANS; said method comprising the steps of:

providing said RECEIVING MEANS and at least one said DIGITAL CHANNEL PROCESSING MEANS;

receiving a known C/A code modulated on L1 carrier frequency, an unknown Y code modulated on L1 carrier frequency signal, an unknown Y code modulated on L2 carrier frequency signal by said RECEIVING MEANS; wherein said received L1, and L2 signals contain propagation noise; and wherein said Y code comprises a known P code and an unknown W code;

generating local replica of said C/A code modulated on L1 carrier frequency signal by each said DIGITAL CHANNEL PROCESSING MEANS;

generating local replica of said P code modulated on L1 carrier frequency signal by each said DIGITAL CHANNEL PROCESSING MEANS; wherein said locally generated replica of L1 signal does not contain propagation noise;

generating local replica of said P code modulated on L2 carrier frequency signal by each said DIGITAL CHANNEL PROCESSING MEANS; wherein said locally generated replica of L2 signal does not contain propagation noise;

extracting of an estimate of said Y code from said L1 signal, and from said L2 signal by each said DIGITAL CHANNEL PROCESSING MEANS; wherein said estimate signals contain propagation noise;

correlating a locally generated replica of C/A code with the received L1 code for obtaining an estimate of L1 group delay ( L1 pseudo-range) and L1 carrier phase;

removing said P code from said locally extracted estimate of said L1 Y code by each said DIGITAL CHANNEL PROCESSOR to obtain a locally extracted estimate of said L1 W code;

removing said P code from said locally extracted estimate of said L2 Y code by each said DIGITAL CHANNEL PROCESSOR MEANS to obtain a locally extracted estimate of said L2 W code;

synchronizing said L1 W-code in respect to the signal C/A code EPOCH 1;

shifting in time said L1 W-code in respect to the signal C/A code EPOCH 1;

integrating said estimate of said L1 W-code across the period of $T_0$, wherein said period $T_0$ is equal to the inverse zero-frequency $1/F_0$ of the W-code energy spectrum, and wherein said zero-frequency $F_0$ is the first frequency at which said W-code energy spectrum is equal to zero;

synchronizing said L2 W-code in respect to the signal C/A code EPOCH 2;

shifting in time said L2 W-code in respect to the signal C/A code EPOCH 2;

integrating said estimate of L2 W-code across the period of $T_0$; and multiplying said integrated estimates of L1 W-code with said integrated early, late, and punctual estimates of L2 W-code over a time period greater than a msec to ensure that the resulting correlated signal has a sufficient power for closing the L2-code and L2-carrier tracking loops.

43. A method for optimum correlation processing of L1 and L2 signals received from a SPS satellite by a correlation processing system; said system comprising a RECEIVING MEANS and at least one DIGITAL CHANNEL PROCESSING MEANS; said method comprising the steps of:

providing said RECEIVING MEANS and at least one said DIGITAL CHANNEL PROCESSING MEANS;

receiving a known C/A code modulated on L1 carrier frequency, an unknown Y code modulated on L1 carrier frequency signal, an unknown Y code modulated on L2 carrier frequency signal by said RECEIVING MEANS; wherein said received L1, and L2 signals contain propagation noise; and wherein said Y code comprises a known P code and an unknown W code;

generating local replica of said C/A code modulated on L1 carrier frequency signal by each said DIGITAL CHANNEL PROCESSING MEANS;

generating local replica of said P code modulated on L1 carrier frequency signal by each said DIGITAL CHANNEL PROCESSING MEANS; wherein said locally generated replica of L1 signal does not contain propagation noise;

generating local replica of said P code modulated on L2 carrier frequency signal by each said DIGITAL CHANNEL PROCESSING MEANS; wherein said locally generated replica of L2 signal does not contain propagation noise;

extracting of an estimate of said Y code from said L1 signal, and from said L2 signal by each said DIGITAL CHANNEL PROCESSING MEANS; wherein said estimate signals contain propagation noise;

correlating a locally generated replica of C/A code with the received L1 code for obtaining an estimate of L1 group delay ( L1 pseudo-range) and L1 carrier phase;

removing said P code from said locally extracted estimate of said L1 Y code by each said DIGITAL CHANNEL PROCESSOR to obtain a locally extracted estimate of said L1 W code;

removing said P code from said locally extracted estimate of said L2 Y code by each said DIGITAL CHANNEL PROCESSOR MEANS to obtain a locally extracted estimate of said L2 W code;

integrating said estimate of said L1 W-code across the period of $T_0$, wherein said period $T_0$ is equal to the inverse zero-frequency $1/F_0$ of the W-code energy spectrum, and wherein said zero-frequency $F_0$ is the first frequency at which said W-code energy spectrum is equal to zero; and wherein said L1 W-code is non-synchronized to the signal C/A code EPOCH 1;

integrating said estimate of L2 W-code across the period of $T_0$, wherein said L1 W-code is non-synchronized to the signal C/A code EPOCH 2; and multiplying said integrated estimates of L1 W-code with said integrated early, late, and punctual estimates of L2 W-code over a time period greater than a msec to ensure that the resulting correlated signal has a sufficient power for closing the L2-code and L2-carrier tracking loops.

44. The method of claim 41, said RECEIVING MEANS comprising a dual frequency patch ANTENNA MEANS, a FILTER/LNA MEANS, a DOWNCONVERTER MEANS, an IF PROCESSOR MEANS, a MASTER OSCILLATOR MEANS, and a FREQUENCY SYNTHESIZER MEANS; wherein said step of receiving L1 and L2 satellite signals further comprises the steps of:

receiving said L1 and L2 satellite signals by said dual frequency patch ANTENNA MEANS;

performing filtering and low noise amplification of said L1 and L2 signals by said FILTER/LNA MEANS, wherein said FILTER/LNA MEANS determines the signal/noise ratio of the received signals L1 and L2;

mixing and converting said L1 and L2 signals by said DOWNCONVERTER MEANS;

transforming said converted L1 and L2 signals into digitally sampled quadrature versions of L1 and L2 signals (IL1, QL1, IL2, QL2) by said IF PROCESSOR MEANS; and generating several timing signals by said FREQUENCY SYNTHESIZER MEANS.

45. The method of claim 44, said FILTER/LNA MEANS comprising a POWER SPLITTER MEANS, two separate BANDPASS FILTER MEANS, and a POWER COMBINER MEANS; said step of performing filtering and low noise amplification of said L1 and L2 signals by said FILTER/LNA MEANS further comprises the steps of:

power splitting said single L1/L2 signal received by said ANTENNA MEANS into two separate L1 and L2 signals by said POWER SPLITTER MEANS;

filtering said L1 and L2 signals independently by said two separate BANDPASS FILTER MEANS;

combining said L1 and L2 signals into one combined signal L1/L2 before feeding said combined L1/L2 signal into said LNA by said POWER COMBINER MEANS.

46. The method of claim 44, said FREQUENCY SYNTHESIZER MEANS further comprising a PHASE DETECTOR MEANS, a LOOP FILTER MEANS, a VOLTAGE CONTROLLED OSCILLATOR (VCO) MEANS, a first DIVIDER MEANS, a second DIVIDER MEANS, and a third DIVIDER MEANS; wherein said step of generating several timing signals by said FREQUENCY SYNTHESIZER MEANS further comprises the steps of:

comparing phases of two signals by said PHASE DETECTOR MEANS, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

filtering out high frequency voltage noise by said LOOP FILTER MEANS, wherein output LOOP FILTER MEANS voltage signal includes a low frequency voltage noise;

generating a 1st local oscillator (LO1) signal by said VCO, wherein voltage signal at the input of said VCO causes frequency change in said VCO output signal, and wherein said VCO nominal output signal is locked to said reference signal;

dividing said 1st LO1 signal by said first DIVIDER MEANS to obtain a 2nd local oscillator (LO2) signal;

dividing said 2nd LO2 signal by said second DIVIDER MEANS to obtain a sampling clock (SCLK); and dividing said 2nd LO2 signal by said third DIVIDER MEANS to obtain a signal used for measurement of local reference time.

47. The method of claim 44, said FREQUENCY SYNTHESIZER MEANS further comprising a "Divide by 5" block, a PHASE DETECTOR MEANS, a LOOP FILTER MEANS, a VOLTAGE CONTROLLED OSCILLATOR (VCO) MEANS, a "Divide by 8" block, a "Divide by 7" block, and a "Divide by 25000" block; wherein said step of generating several timing signals by said FREQUENCY SYNTHESIZER MEANS further comprises the steps of:

comparing 5 MHZ input signal from said MASTER OSCILLATOR MEANS with 5 MHZ signal from said "Divide by 5" block by said PHASE DETECTOR MEANS, wherein a minimum voltage output signal from said PHASE DETECTOR MEANS represents maximum phase alignment of two said 5 MHZ signals;

filtering out high frequency voltage noise by said LOOP FILTER MEANS;

generating a 1st local oscillator (LO1) signal by said VOLTAGE CONTROLLED OSCILLATOR (VCO) MEANS, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as said 1st local oscillator (LO1);

dividing said 1st LO1 1400 MHz signal by said "Divide by 8" block to obtain a 175 MHz signal, wherein said 175 MHz signal is used as a 2nd LO2 signal;

dividing said 2nd LO2 175 MHZ signal by said "Divide by 7" block to obtain a 25 MHZ signal, wherein said 25 MHz signal is used as a sampling clock (SCLK); and dividing said 25 MHZ signal by said "Divide by 25000" block to obtain a 1 KHZ signal, wherein said 1 KHZ signal (MSEC) is used for measurement of local reference time.

48. The method of claim 44, said DOWNCONVERTER MEANS comprising a POWER SPLITTER MEANS, a first MULTIPLIER MEANS, a second MULTIPLIER MEANS, a first BANDPASS FILTER MEANS, a second BANDPASS FILTER MEANS, a first AMPLIFIER MEANS, and a second AMPLIFIER MEANS; wherein said step of mixing and converting said L1 and L2 signals by said DOWNCONVERTER MEANS further comprises the steps of:

splitting said FILTER/LNA MEANS output L1/L2 signal into two signals L1 and L2 by said POWER SPLITTER MEANS;

producing a first mixed signal by multiplying said L1 signal with said 1st LO1 signal by said first MULTIPLIER MEANS;

producing a second mixed signal by multiplying said L2 signal with said 1st LO1 signal by said second MULTIPLIER MEANS;

filtering said first mixed signal by said first BANDPASS FILTER MEANS 1;

filtering said second mixed signal by said second BANDPASS FILTER MEANS 2;

amplifying said first filtered signal by said first AMPLIFIER MEANS 1; and amplifying said second filtered signal by said second AMPLIFIER MEANS 2.

49. The method of claim 44, said IF PROCESSOR MEANS comprising a first POWER SPLITTER MEANS, a second POWER SPLITTER MEANS, a first MULTIPLIER MEANS, a second MULTIPLIER MEANS, a third MULTIPLIER MEANS, a fourth MULTIPLIER MEANS, a first AMPLIFIER MEANS, a second AMPLIFIER MEANS, a third AMPLIFIER MEANS, a fourth AMPLIFIER MEANS, a first one-bit A/D CONVERTER, a second one-bit A/D CONVERTER, a third one-bit A/D CONVERTER, a fourth one-bit A/D CONVERTER, a first FLIP-FLOP MEANS (FF1), a second FF2, a third FF3, and a fourth FF4; wherein said step of transforming said converted L1 and L2 signals into digitally sampled quadrature versions of L1 and L2 signals (IL1, QL1, IL2, QL2) further comprises the steps of:

splitting said L1 signal into two signals by said first POWER SPLITTER MEANS;

splitting said L2 signal into two signals by said second POWER SPLITTER MEANS;

producing an IL1 signal by multiplying said L1 signal with an inphase (I) version of said 2nd LO2 signal by said first MULTIPLIER MEANS;

producing a QL1 signal by multiplying said L1 signal with a quadrature (Q) version of said 2nd LO2 signal by said second MULTIPLIER MEANS;

producing an IL2 signal by multiplying said L2 signal with an inphase (I) version of said 2nd LO2 signal by said third MULTIPLIER MEANS;

producing a QL2 signal by multiplying said L2 signal with a quadrature (Q) version of said 2nd LO2 signal by said fourth MULTIPLIER MEANS;

amplifying said IL1 signal by said first AMPLIFIER MEANS;

amplifying said QL1 signal by said second AMPLIFIER MEANS;

amplifying said IL2 signal by said third AMPLIFIER MEANS;

amplifying said QL2 signal by said fourth AMPLIFIER MEANS;

performing one-bit quantization operation on said IL1 signal by said first one-bit analog-to-digital (A/D) CONVERTER MEANS;

performing one-bit quantization operation on said QL1 signal by said second one-bit analog-to-digital (A/D) CONVERTER MEANS;

performing one-bit quantization operation on said IL2 signal by said third one-bit analog-to-digital (A/D) CONVERTER MEANS;

performing one-bit quantization operation on said QL2 signal by said fourth one-bit analog-to-digital (A/D) CONVERTER MEANS;

sampling said IL1 signal by clocking said IL1 signal through said FLIP-FLOP MEANS 1 (FF1) at sampling clock (SCLK) rate;

sampling said QL1 signal by clocking said QL1 signal through said FF2 at sampling clock (SCLK) rate;

sampling said IL2 signal by clocking said IL2 signal through said FF3 at sampling clock (SCLK) rate; and sampling said QL2 signal by clocking said QL2 signal through said FF4 at sampling clock (SCLK) rate.

50. The method of claim 44, each said DIGITAL CHANNEL PROCESSING MEANS comprising a L1 TRACKER MEANS, a L2 TRACKER MEANS, and a MICROPROCESSOR MEANS system; said method further comprising the steps of:

tracking L1 C/A code when Y code is ON and tracking L1 P code when Y code is OFF by said L1 TRACKER MEANS;

tracking an enhanced cross correlated W code when Y code is ON and tracking L2 P code when Y code is OFF by said L2 TRACKER MEANS; and feeding said MICROPROCESSOR MEANS system by output signals from said L1 TRACKER MEANS and said L2 TRACKER MEANS.

51. The method of claim 50, said L1 TRACKER MEANS comprising a MULTIPLEXER MEANS 1, a carrier numerically controlled oscillator (CARRIER NCO MEANS 1), a CARRIER MIXER MEANS 1, a CODE GENERATOR MEANS 1, a CODE MIXER MEANS 1, a block CORRELATORS MEANS 1, a code numerically controlled oscillator (CODE NCO MEANS 1), a CODE MIXER MEANS 2, a DIGITAL SUMMER 1 MEANS; wherein said step of tracking L1 C/A code when Y code is ON and tracking L1 P code when Y code is OFF by said L1 TRACKER MEANS further comprises the steps of:

feeding said L1 TRACKER MEANS by digitized inphase IL1 and quadrature QL1 of L1 signal generated by said IF PROCESSOR MEANS;

synchronously clocking said L1 TRACKER MEANS by said SCLK signal outputted by said FREQUENCY SYNTHESIZER MEANS;

synchronously referencing said L1 TRACKER MEANS by said MSEC signal to local reference time, said MSEC signal being outputted by said FREQUENCY SYNTHESIZER MEANS;

feeding said L1 TRACKER MEANS by control signal from said MICROPROCESSOR MEANS;

providing a locally generated replica of C/A code and locally generated replica of P code by said CODE GENERATOR 1 MEANS;

selecting a locally generated code C/A when Y code is ON and selecting a locally generated P code when Y code is OFF by said MULTIPLEXER MEANS 1;

generating inphase and quadrature components of digital carrier by said CARRIER NCO MEANS 1;

generating inphase IL1 and quadrature QL1 signals having zero carrier frequency by mixing digitized inphase IL1 and QL1 signals having carrier frequency with inphase and quadrature components of digital carrier by said CARRIER MIXER MEANS 1;

performing code correlation of said inphase IL1 and quadrature QL1 signals with said locally generated replica of C/A code or P-code by said CODE MIXER MEANS 1; wherein when said L1 TRACKER MEANS carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function creating an early, a punctual and a late sample of the autocorrelation function;

integrating said early, punctual and late samples of said autocorrelation function over an integer multiple of EPOCH 1 signals by said block CORRELATORS MEANS 1;

feeding said MICROPROCESSOR MEANS system by an output signal of said CORRELATORS MEANS 1 at a rate of L1 C/A code EPOCH 1, wherein said MICROPROCESSOR MEANS uses said CORRELATORS MEANS 1 output signal to develop feedback signals for the L1 carrier tracking loop and for the L1 code tracking loop;

providing a clocking signal at a P code rate for driving said CODE GENERATOR 1 MEANS and providing a mechanism for aligning said locally generated replica of C/A code or a P-code with said incoming satellite signals C/A code or P-code by said code numerically controlled oscillator ( CODE NCO MEANS);

generating an estimate of L1 W code by removing said local replica of L1 P code from said estimate of L1 Y code by said CODE MIXER MEANS 2; and processing said estimate of L1 W code by said DIGITAL SUMMER 1 MEANS; wherein said DIGITAL SUMMER 1 MEANS accumulates said estimate of L1 W code over periods given by a W SYNC 1 signal outputted by said CODE GENERATOR 1, and wherein said DIGITAL SUMMER 1 MEANS outputs a $\Sigma W_{L1}$ signal for further processing by said L2 TRACKER MEANS block.

52. The system of claim 51, wherein said step of processing said estimate of L1 W code by said DIGITAL SUMMER 1 MEANS further includes the step of accumulating said estimate of L1 W code over periods given by said W SYNC 1 signal, wherein said W SYNC 1 signal represents a period of 22L1 P(Y) code clocks, and wherein said W SYNC 1 signal is synchronized with said L1 C/A code EPOCH 1 signal.

53. The method of claim 50, said L2 TRACKER MEANS comprising a CARRIER NCO MEANS 2, a CODE NCO MEANS 2, a CODE GENERATOR 2 MEANS, a CARRIER MIXER MEANS 2, a CODE MIXER MEANS 3, a CODE MIXER MEANS 4, a MULTIPLEXER MEANS 2, a DIGITAL SUMMER 2 MEANS, and a block CORRELATORS MEANS 2; wherein said step of tracking an enhanced cross correlated W code when Y code is ON and tracking L2 P code when Y code is OFF by said L2 TRACKER MEANS further comprises the steps of:

feeding said L2 TRACKER MEANS by digitized inphase IL2 and quadrature QL2 of L2 signal outputted by said IF PROCESSOR MEANS;

synchronously clocking said L2 TRACKER MEANS by said SCLK signal outputted by said FREQUENCY SYNTHESIZER MEANS;

synchronously referencing said L2 TRACKER MEANS by said MSEC signal to local reference time, said MSEC signal being outputted by said FREQUENCY SYNTHESIZER MEANS;

feeding said L2 TRACKER MEANS by said $\Sigma W_{L1}$ signal generated by said L1 TRACKER MEANS;

feeding said L2 TRACKER MEANS by said CONTROL signal from said MICROPROCESSOR MEANS;

generating IL2 and QL2 signals having carrier frequency by said CARRIER NCO MEANS 2;

generating by said CARRIER MIXER MEANS 2 inphase IL2 and quadrature QL2 signals having zero carrier frequency by mixing said digitized inphase IL2 and quadrature QL2 signals having carrier frequency with said inphase and quadrature components IL2 and QL2 of digital carrier generated by said CARRIER NCO 2, wherein when said L2 TRACKER is locked onto said L2 signal, said I output of said CARRIER MIXER 2 MEANS represents an estimate of L2 Y code, and said Q output of said CARRIER MIXER 2 MEANS L2 contains no signal power;

producing a locally generated P code which is aligned with the incoming L2 satellite signal by said CODE GENERATOR 2 MEANS, wherein said CODE NCO 2 drives said CODE GENERATOR 2;

performing by said CODE MIXER MEANS 3 code correlation of said IL2 and QL2 having zero frequency signals outputted by said CARRIER MIXER 2 with said P code outputted by said CODE GENERATOR 2; wherein said CODE MIXER 3 removes said P code from said L2 Y code; and wherein said CODE MIXER 3 develops six outputs $(I_E; I_P; I_L; Q_E; Q_P; Q_L)$ which are correlations of said I and Q signals outputted by said CARRIER MIXER MEANS 2 with said P code outputted by said CODE GENERATOR 2 at three time points (early, punctual, and late); and wherein when the encryption is off said six outputs $I_E; I_P; I_L; Q_E; Q_P; Q_L)$ are used for closing said L2 code and carrier tracking loops;

accumulating by said DIGITAL SUMMER 2 MEANS said signals $(I_E; I_P; I_L; Q_E; Q_P; Q_L)$ outputted by said CODE MIXER 3 across a period defined by said W SYNC 2a signal outputted by said CODE GENERATOR 2; wherein said DIGITAL SUMMER 2 MEANS outputs accumulations of said signals $(\Sigma I_E; \Sigma I_P; \Sigma I_L; \Sigma Q_E; \Sigma Q_P; \Sigma Q_L)$ at a rate of said W SYNC 2a signal at different time points (early, punctual, and late) on the autocorrelation function of said incoming P(Y) code and said local P code generated by said CODE GENERATOR 2;

performing code correlation by said CODE MIXER MEANS 4 of said $(\Sigma I_E; \Sigma I_P; \Sigma I_L; \Sigma Q_E; \Sigma Q_P; \Sigma Q_L)$ signals outputted by said DIGITAL SUMMER 2; wherein said CODE MIXER MEANS 4 performs said code correlation at 3 time points (early, punctual and late) on the autocorrelation function graph creating an early, a punctual and a late sample of the autocorrelation function;

selecting under the control of MICROPROCESSOR MEANS by said MULTIPLEXER MEANS 2 the mode of operation when Y code is ON and OFF; and wherein when Y code is OFF and satellite transmits the P code on L2 said MICROPROCESSOR MEANS selects the output of CODE MIXER MEANS 3; and wherein when Y code is ON said MICROPROCESSOR MEANS selects the output of CODE MIXER MEANS 4;

integrating early, punctual and late samples of said autocorrelation function by said block CORRELATORS MEANS 2; wherein said CORRELATORS MEANS 2 accumulates correlations at a rate of SCLK if the satellite is not encrypted and a rate of W SYNC 2b if the satellite is encrypted; and feeding said MICROPROCESSOR MEANS by output signals of said CORRELATORS MEANS 2 at a rate of EPOCH 2; wherein said MICROPROCESSOR MEANS uses said CORRELATORS MEANS 2 output signals to develop feedback signals for the L2 carrier tracking loop and for the L2 code tracking loop.

54. The system of claim 53, wherein said step of processing by said DIGITAL SUMMER 2 MEANS said ($I_E$ ;$I_P$ ;$I_L$ ;$Q_E$ ;$Q_P$ ;$Q_L$) signals outputted by said CODE MIXER 3 across a period defined by said W SYNC 2a further includes the step of accumulating said ($I_E$ ;$I_P$ ;$I_L$ ;$Q_E$ ;$Q_P$ ;$Q_L$) signals over periods given by said W SYNC 2a signal, wherein said W SYNC 2a signal represents a period of 22L2 P(Y) code clocks, and wherein said W SYNC 2a signal is synchronized with said L2 C/A code EPOCH 2 signal.

55. The method of claim 51, said CARRIER NCO MEANS 1 comprising an n-bit ACCUMULATOR MEANS, n being an integer, a first LATCH MEANS 1, a second LATCH MEANS 2, a first ADDER MEANS 1, a third LATCH MEANS 3, and a second LATCH MEANS 2, wherein said step of generating inphase and quadrature components of digital carrier by said CARRIER NCO MEANS 1 further comprises the steps of:

adding a new frequency word (B1 ... Bn), B1 being the most significant bit (MSB), to a previous CARRIER NCO MEANS 1 output frequency word (Q1 ... Qn) on each sample clock by said n-bit ACCUMULATOR MEANS; wherein said ACCUMULATOR MEANS is caused to overflow periodically at the predetermined output frequency;

latching in said new frequency word (B1 ... Bn) under the control signal of said MICROPROCESSOR MEANS by said first LATCH MEANS 1; wherein L-top bits of said ACCUMULATOR MEANS output wave are used as an inphase version I of said CARRIER NCO MEANS 1 output wave; L being an integer equal or greater to 1; and wherein when the carrier tracking loop is locked L-top bits of said CARRIER NCO MEANS 1 output wave are used as the inphase version I of the carrier signal L1 which is phase locked with the satellite signal;

adding (01) binary code to the two top bits (S1 S2) of the CARRIER NCO MEANS 1 output (S1 ... Sn) frequency word to obtain 2-top bits (R1 R2) by said first ADDER MEANS 1;

generating a quadrature version Q of carrier signal L1 by clocking in at the rate of the SCLK signal said 2-top bits (R1 R2) by said third LATCH MEANS; wherein said LATCH MEANS 3 generates said QL1 signal in the from of L-bit word (R1 R2 S3 ... SL); and latching top m bits (C1 ... Cm) of the CARRIER NCO MEANS 1 output signal on the edge of the MSEC timing signal by said second LATCH MEANS 2; m being an integer less than n; wherein said (C1 ... Cm) signal represents a carrier phase measurement signal.

56. The method of claim 55, said n-bit ACCUMULATOR MEANS comprising a second ADDER MEANS 2, and a fourth LATCH MEANS 4, wherein said step of adding a new frequency word (B1 ... Bn), B1 being the most significant bit (MSB), to a previous CARRIER NCO 1 output frequency word (Q1 ... Qn) on each sample clock by said n-bit ACCUMULATOR MEANS further comprises the steps of:

adding said frequency word (B1 ... Bn) to a previous CARRIER NCO 1 frequency output (Q1 ... Qn) on each sample clock by said second ADDER MEANS; and generating said CARRIER NCO MEANS 1 output signal (Q1 ... Qn) by said fourth LATCH MEANS 4; wherein said fourth LATCH MEANS is caused to overflow at the desired output frequency; and wherein L-top output bits of said fourth LATCH MEANS 4 are used as said CARRIER NCO MEANS 1 output signal.

57. The method of claim 53, said CARRIER NCO MEANS 2 comprising an n-bit ACCUMULATOR MEANS, n being an integer, a first LATCH MEANS 1, a second LATCH MEANS 2, a first ADDER MEANS 1, a third LATCH MEANS 3, and a second LATCH MEANS 2, wherein said step of generating inphase and quadrature components of digital carrier by said CARRIER NCO MEANS 1 further comprises the steps of:

adding a new frequency word (B1 ... Bn), B1 being the most significant bit (MSB), to a previous CARRIER NCO MEANS 2 output frequency word (Q1 ... Qn) on each sample clock by said n-bit ACCUMULATOR MEANS; wherein said ACCUMULATOR MEANS is caused to overflow periodically at the predetermined output frequency;

latching in said new frequency word (B1 ... Bn) under the control signal of said MICROPROCESSOR MEANS by said first LATCH MEANS 1; wherein L-top bits of said ACCUMULATOR MEANS output wave are used as an inphase version I of said CARRIER NCO MEANS 2 output wave; L being an integer equal or greater to 1; and wherein when the carrier tracking loop is locked L-top bits of said CARRIER NCO MEANS 2 output wave are used as the inphase version I of the carrier signal L2 which is phase locked with the satellite signal;

adding (01) binary code to the two top bits (S1 S2) of the CARRIER NCO MEANS 2 output (S1 ... Sn) frequency word to obtain 2-top bits (R1 R2) by said first ADDER MEANS 1;

generating a quadrature version Q of carrier signal L2 by clocking in at the rate of the SCLK signal said 2-top bits (R1 R2) by said third LATCH MEANS; wherein said LATCH MEANS 3 generates said QL2 signal in the from of L-bit word (R1 R2 S3 ... SL); and latching top m bits (C1 ... Cm) of the CARRIER NCO MEANS 2 output signal on the edge of the MSEC timing signal by said second LATCH MEANS 2; m being an integer less than n; wherein said (C1 ... Cm) signal represents a carrier phase measurement signal.

58. The method of claim 57, said n-bit ACCUMULATOR MEANS comprising a second ADDER MEANS 2, and a fourth LATCH MEANS 4, wherein said step of adding a new frequency word (B1 ... Bn), B1 being the most significant bit (MSB), to a previous CARRIER NCO MEANS 2 output frequency word (Q1 ... Qn) on each sample clock by said n-bit ACCUMULATOR MEANS further comprises the steps of:

adding said frequency word (B1 ... Bn) to a previous CARRIER NCO MEANS 2 frequency output (Q1 ... Qn) on each sample clock by said second ADDER MEANS; and generating said CARRIER NCO MEANS 2 output signal (Q1 ... Qn) by said fourth LATCH MEANS; wherein said fourth LATCH MEANS is caused to overflow at the desired output frequency; and wherein L-top output bits of said fourth LATCH MEANS 4 are used as said CARRIER NCO MEANS 2 output signal.

59. The method of claim 51, said CARRIER MIXER MEANS 1 comprising a first MULTIPLIER MEANS 1, a second MULTIPLIER MEANS 2, a first ADDER MEANS 1, a third MULTIPLIER MEANS 3, a fourth MULTIPLIER MEANS 4 and a second ADDER MEANS 2, wherein said step of generating inphase IL1 and quadrature QL1 signals having zero carrier frequency by mixing digitized inphase IL1 and QL1 signals having carrier frequency with inphase and quadrature components of digital carrier by said CARRIER MIXER MEANS 1 further comprises the steps of:

generating a (IL1)*I signal by performing a multiplication operation of an inphase version I of L1 satellite carrier signal and an inphase version I of carrier frequency by said first MULTIPLIER MEANS 1;

generating a (QL1)*Q signal by performing a multiplication operation of a quadrature version Q of L1 satellite carrier signal and a quadrature version Q of carrier frequency by said second MULTIPLIER MEANS 2, subtracting said (QL1)*Q signal from said (IL1)*I signal by said first ADDER MEANS 1;

generating a (IL1)*Q signal by performing a multiplication operation of an inphase version I of L1 satellite carrier signal and a quadrature version Q of carrier frequency by said third MULTIPLIER MEANS 3;

generating a (QL1)*I signal by performing a multiplication operation of a quadrature version Q of L1 satellite carrier signal and an inphase version I of carrier frequency by said fourth MULTIPLIER MEANS 4; and adding said (QL1)*I signal to said (IL1)*Q signal by said second ADDER MEANS 2.

60. The method of claim 53, said CARRIER MIXER MEANS 2 comprising a first MULTIPLIER MEANS 1, a second MULTIPLIER MEANS 2, a first ADDER MEANS 1, a third MULTIPLIER MEANS 3, a fourth MULTIPLIER MEANS 4 and a second ADDER MEANS 2, wherein said step of generating inphase IL2 and quadrature QL2 signals having zero carrier frequency by mixing digitized inphase IL2 and QL2 signals having carrier frequency with inphase and quadrature components of digital carrier by said CARRIER MIXER MEANS 2 further comprises the steps of:

generating a (IL2)*I signal by performing a multiplication operation of an inphase version I of L2 satellite carrier signal and an inphase version I of carrier frequency by said first MULTIPLIER MEANS 1;

generating a (QL2)*Q signal by performing a multiplication operation of a quadrature version Q of L2 satellite carrier signal and a quadrature version Q of carrier frequency by said second MULTIPLIER MEANS 2, subtracting said (QL2)*Q signal from said (IL2)*I signal by said first ADDER MEANS 1;

generating a (IL2)*Q signal by performing a multiplication operation of an inphase version I of L2 satellite carrier signal and a quadrature version Q of carrier frequency by said third MULTIPLIER MEANS 3;

generating a (QL2)*I signal by performing a multiplication operation of a quadrature version Q of L2 satellite carrier signal and an inphase version I of carrier frequency by said fourth MULTIPLIER MEANS 4; and adding said (QL2)*I signal to said (IL2)*Q signal by said second ADDER MEANS 2.

61. The method of claim 51, said CODE MIXER MEANS 1 comprising a first MULTIPLIER MEANS 1, a second MULTIPLIER MEANS 2, a third MULTIPLIER MEANS 3, a fourth MULTIPLIER MEANS, a fifth MULTIPLIER MEANS, and a sixth MULTIPLIER MEANS; wherein the step of performing code correlation of said inphase IL1 and quadrature QL1 signals with said locally generated replica of C/A code by said CODE MIXER MEANS 1 at 3 time points (early, punctual and late) on the autocorrelation function graph creating an early, a punctual and a late sample of the autocorrelation function, further comprises the steps of:

multiplying said incoming I signal with an early version (E) of said local C/A code or P-code by said first MULTIPLIER MEANS;

multiplying said incoming I signal with a punctual version (P) of said local C/A code or P-code by said second MULTIPLIER MEANS;

multiplying said incoming I signal with a late version (L) of said local C/A code or P-code by said third MULTIPLIER MEANS;

multiplying said incoming Q signal with an early version (E) of said local C/A code or P-code by said fourth MULTIPLIER MEANS;

multiplying said incoming Q signal with a punctual version (P) of said local C/A code or P-code by said fifth MULTIPLIER MEANS; and multiplying said incoming Q signal with a late version (L) of said local C/A code or P-code by said sixth MULTIPLIER MEANS.

62. The method of claim 51, said CODE MIXER MEANS 2 comprising a MULTIPLIER MEANS, said step of generating an estimate of L1 W code by removing said local replica of L1 P code from said estimate of L1 Y code by said CODE MIXER MEANS 2 further comprises the step of:

generating a L1 W code estimate by multiplying said incoming L1 Y code estimate with said locally generated L1 P code by said MULTIPLIER MEANS.

63. The method of claim 53, wherein said step of producing by said CODE GENERATOR 2 MEANS a locally generated P code which is aligned with the incoming L2 satellite signal further includes a step of driving said CODE GENERATOR 2 by said CODE NCO 2.

64. The method of claim 53, said CODE MIXER MEANS 3 comprising a first MULTIPLIER MEANS, a second MULTIPLIER MEANS, a third MULTIPLIER MEANS, a fourth MULTIPLIER MEANS, a fifth MULTIPLIER MEANS, and a sixth MULTIPLIER MEANS, wherein said step of performing by said CODE MIXER MEANS 3 code correlation of said IL2 and QL2 having zero frequency signals outputted by said CARRIER MIXER 2 with said P code outputted by said CODE GENERATOR 2 further includes the steps of:

generating by said first MULTIPLIER MEANS an early $I_E$ correlation of L2 W code by multiplying said incoming I estimate of L2 Y code at early point (E) on the autocorrelation function graph with said locally generated L2 P code;

generating by said second MULTIPLIER MEANS a punctual $I_P$ correlation of L2 W code by multiplying said incoming I estimate of L2 Y code at punctual point (P) on the autocorrelation function graph with said locally generated L2 P code; generating by said third MULTIPLIER MEANS a late $I_L$ correlation of L2 W code by multiplying said incoming I estimate of L2 Y code at late point (L) on the autocorrelation function graph with said locally generated L2 P code;

generating by said fourth MULTIPLIER MEANS an early $Q_E$ correlation of L2 W code by multiplying said incoming Q estimate of L2 Y code at early point (E) on the autocorrelation function graph with said locally generated L2 P code;

generating by said fifth MULTIPLIER MEANS a punctual $Q_P$ correlation of L2 W code by multiplying said incoming Q estimate of L2 Y code at punctual point (P) on the autocorrelation function graph with said locally generated L2 P code; and generating by said sixth MULTIPLIER MEANS a late $Q_L$ correlation of L2 W code by multiplying said incoming Q estimate of L2 Y code at late point (L) on the autocorrelation function graph with said locally generated L2 P code.

65. The method of claim 53, said CODE MIXER MEANS 4 comprising a first MULTIPLIER MEANS, a second MULTIPLIER MEANS, a third MULTIPLIER MEANS, a fourth MULTIPLIER MEANS, a fifth MULTIPLIER MEANS, and a sixth MULTIPLIER MEANS; wherein said step of performing correlation by said CODE MIXER MEANS 4 at 3 time points (early, punctual and late) on the autocorrelation function graph further comprises the steps of:

multiplying by said first MULTIPLIER MEANS said $\Sigma I_E$ signal with said $\Sigma W_{L1}$ signal; wherein said first MULTIPLIER outputs an E-early with respect to the P-code autocorrelation function correlations of the IL2 signal;

multiplying by said second MULTIPLIER MEANS said $\Sigma I_P$ signal with said $\Sigma W_{L1}$ signal; wherein said second MULTIPLIER outputs a P-punctual with respect to the P-code autocorrelation function correlations of the IL2 signal;

multiplying by said third MULTIPLIER MEANS said $\Sigma I_L$ signal with said $\Sigma W_{L1}$ signal; wherein said third MULTIPLIER outputs a L-late with respect to the P-code autocorrelation function correlations of the IL2 signal;

multiplying by said fourth MULTIPLIER MEANS said $\Sigma Q_E$ signal with said $\Sigma W_{L1}$ signal; wherein said fourth MULTIPLIER outputs an E-early with respect to the P-code autocorrelation function correlations of the IL2 signal;

multiplying by said fifth MULTIPLIER MEANS said $\Sigma Q_P$ signal with said $\Sigma W_{L1}$ signal; wherein said fifth MULTIPLIER outputs a P-punctual with respect to the P-code autocorrelation function correlations of the IL2 signal;

multiplying by said sixth MULTIPLIER MEANS said $\Sigma Q_L$ signal with said $\Sigma W_{L1}$ signal; wherein said sixth MULTIPLIER outputs a L-late with respect to the P-code autocorrelation function correlations of the IL2 signal.

66. The method of claim 51, said CODE GENERATOR 1 MEANS comprising a first DIVIDING MEANS, a C/A CODE GENERATOR MEANS, a P CODE GENERATOR MEANS, a DIVIDE BY N MEANS, and a DELAY BY τ block; wherein said step of providing a locally generated replica of C/A code and locally generated replica of P code by said CODE GENERATOR 1 MEANS further comprises the steps of:

providing a C/A CODE GENERATOR MEANS clock signal by dividing an input signal from said CODE NCO 1 MEANS by said first DIVIDING MEANS;

generating by said C/A CODE GENERATOR said C/A code signal and said EPOCH 1 signal under the CONTROL signal of said MICROPROCESSOR MEANS, wherein said C/A code signal is the locally generated C/A code, and wherein said EPOCH 1 signal is the repetition rate of said C/A code, and wherein said C/A CODE GENERATOR can be adjusted under said CONTROL signal to generate a particular satellite's C/A code;

generating by said P CODE GENERATOR MEANS said P-code signal, wherein said P CODE GENERATOR MEANS is clocked by said CODE NCO 1 MEANS signal under the CONTROL signal of said MICROPROCESSOR MEANS, and wherein said P CODE GENERATOR can be adjusted under said CONTROL signal to generate a particular satellite's P code;

resetting said DIVIDE BY N block by said EPOCH 1 signal; and generating said W SYNC 1 signal by said DELAY BY τ block.

67. The method of claim 66, wherein said step of generating said W SYNC 1 signal by said DIVIDE BY τ block further includes the step of delaying said W SYNC 1 signal by zero seconds.

68. The method of claim 53, said CODE GENERATOR 2 MEANS comprising a first DIVIDING MEANS, a C/A CODE GENERATOR MEANS, a P CODE GENERATOR MEANS, a D/VIDE BY N MEANS, and a DELAY BY τ block; wherein said step of providing a locally generated replica of C/A code and locally generated replica of P code by said CODE GENERATOR 1 MEANS further comprises the steps of:

providing a C/A CODE GENERATOR MEANS clock signal by dividing an input signal from said CODE NCO 2 MEANS by said first DIVIDING MEANS;

generating by said C/A CODE GENERATOR said EPOCH 2 signal under the CONTROL signal of said MICROPROCESSOR MEANS;

generating by said P CODE GENERATOR MEANS said P-code signal, wherein said P CODE GENERATOR MEANS is clocked by said CODE NCO 2 MEANS signal under the CONTROL signal of said MICROPROCESSOR MEANS, and wherein said P CODE GENERATOR can be adjusted under said CONTROL signal to generate a particular satellite's P code;

resetting said DIVIDE BY N block by said EPOCH 2 signal; and generating said W SYNC 2a and said W SYNC 2b signals by said DELAY BY τ block.

69. The method of claim 68, wherein said step of generating said W SYNC 2a and said W SYNC 2b signals by said DIVIDE BY τ block further includes the step of delaying said W SYNC 2a and said W SYNC 2b signals by zero seconds.

70. The method of claim 51, said block CORRELATORS MEANS 1 comprising a first UP/DOWN COUNTER MEANS 1, a first LATCH MEANS, a second UP/DOWN COUNTER MEANS 2, a second LATCH MEANS, a third UP/DOWN COUNTER MEANS 3, a third LATCH MEANS, a fourth UP/DOWN COUNTER MEANS 4, a fourth LATCH MEANS, a fifth UP/DOWN COUNTER MEANS 5, a fifth LATCH MEANS, a sixth UP/DOWN COUNTER MEANS 6, and a sixth LATCH MEANS; wherein said step of integrating said early, punctual and late samples of said autocorrelation function by said block CORRELATORS MEANS I further comprises the steps of:

integrating said IE signal across a period defined by said C/A EPOCH 1 signal by said first UP/DOWN COUNTER MEANS 1; wherein said UP/DOWN COUNTER MEANS I adds if the input is positive and subtracts if it is negative and is reset on EPOCH 1;

using said first LATCH MEANS for reading said integrated IE signal by said MICROPROCESSOR MEANS system;

integrating said IP across a period defined by said C/A EPOCH 1 signal by said second UP/DOWN COUNTER MEANS 2;

using said second LATCH MEANS for reading said integrated IP signal by said MICROPROCESSOR MEANS system;

integrating said IL across a period defined by said C/A EPOCH 1 signal by said third UP/DOWN COUNTER MEANS;

using said third LATCH MEANS for reading said integrated IL signal by said MICROPROCESSOR MEANS system;

integrating said QE across a period defined by said C/A EPOCH 1 signal by said fourth UP/DOWN COUNTER MEANS 4;

using said fourth LATCH MEANS for reading said integrated QE signal by said MICROPROCESSOR MEANS system;

integrating said QP across a period defined by said C/A EPOCH 1 signal by said fifth UP/DOWN COUNTER MEANS 5;

using said fifth LATCH MEANS for reading said integrated QP signal by said MICROPROCESSOR MEANS system;

integrating said QL across a period defined by said C/A EPOCH 1 signal by said sixth UP/DOWN COUNTER MEANS 6; and using said sixth LATCH MEANS for reading said integrated QP signal by said MICROPROCESSOR MEANS system;

wherein said block CORRELATORS MEANS 1 is used for integrating said IE (inphase early), said IP (inphase punctual), said IL (inphase late), said QE (quadrature early), said QP (quadrature punctual), and said QL (quadrature late) versions of the correlated samples of said L1 C/A code with said locally generated version of C/A code across a time period given by a multiple of L1 C/A EPOCH 1 code; and wherein said IE, IL, QE, and QL are used by said code tracking loop by forming:

a code phase estimate=K1(IE−IL), when said carrier loop is locked; or a code phase estimate =K1$[(IE^2+QE^2)^{1/2}-(IL^2+QL^2)^{1/2}]$, when said carrier loop is not locked; K1 being an L1 code loop gain factor; and wherein said IP, and QP are used by said carrier tracking loop by forming: a carrier phase estimate=arctan(QP/IP).

71. The method of claim 53, said block CORRELATORS MEANS 2 comprising a first UP/DOWN COUNTER MEANS 1, a first LATCH MEANS, a second UP/DOWN COUNTER MEANS 2; a second LATCH MEANS, a third UP/DOWN COUNTER MEANS 3, a third LATCH MEANS, a fourth up/down COUNTER MEANS 4, a fourth LATCH MEANS, a fifth UP/DOWN COUNTER MEANS 5, a fifth LATCH MEANS, a sixth UP/DOWN COUNTER MEANS 6, and a sixth LATCH MEANS; wherein said step of integrating said early, punctual and late samples of said autocorrelation function by said block CORRELATORS MEANS 2 further comprises the steps of:

integrating said IE across a period defined by said EPOCH 2 signal by said first UP/DOWN COUNTER MEANS 1; wherein said UP/DOWN COUNTER MEANS adds if the input is positive and subtracts if it is negative and is reset on EPOCH 2 signal;

using said first LATCH MEANS for reading said integrated IE signal by said MICROPROCESSOR MEANS system;

integrating said IP across a period defined by said EPOCH 2 signal by said second UP/DOWN COUNTER MEANS 2;

using said second LATCH MEANS for reading said integrated IP signal by said MICROPROCESSOR MEANS system;

integrating said IL across a period defined by said EPOCH 3 signal by said third UP/DOWN COUNTER MEANS 3;

using said third LATCH MEANS for reading said integrated IL signal by said MICROPROCESSOR MEANS system;

integrating said QE across a period defined by said EPOCH 2 signal by said fourth UP/DOWN COUNTER MEANS 4;

using said fourth LATCH MEANS for reading said integrated QE signal by said MICROPROCESSOR MEANS system;

integrating said QP across a period defined by said EPOCH 2 signal by said fifth UP/DOWN COUNTER MEANS 5;

using said fifth LATCH MEANS for reading said integrated QP signal by said MICROPROCESSOR MEANS system;

integrating said QL across a period defined by said EPOCH 2 signal by said sixth UP/DOWN COUNTER MEANS; and using said sixth LATCH MEANS for reading said integrated QL signal by said MICROPROCESSOR MEANS system;

wherein said block CORRELATORS MEANS 2 is used for integrating said IE (inphase early), said IP (inphase punctual), said IL (inphase late), said QE (quadrature early), said QP (quadrature punctual), and said QL (quadrature late) version of the correlated samples between filtered estimates of L1 and L2 W codes across a time period given by a multiple of EPOCH 2 signal; and wherein said IE, IL, QE, and QL are used by said code tracking loop by forming:

a code phase estimate=K2(IE−IL), when said carrier loop is locked; or a code phase estimate=K2$[(IE^2+QE^2)^{1/2}-(IL^2+QL^2)^{1/2}]$, when said carrier loop is not locked; K2 being an L2 code loop gain factor; and wherein said IP, and QP signals are used by said carrier tracking loop by forming:

a carrier phase estimate=arctan(QP/IP).

72. The method of claim 51, said CODE NCO 1 MEANS comprising a n-bit ADDER MEANS, a n-bit LATCH MEANS, n being an integer, and a MULTIPLEXER MEANS; wherein said step of providing a clocking signal at C/A code rate and a clocking signal at P code rate for said CODE GENERATOR 1 MEANS by said CODE NCO 1 MEANS further comprises the steps of:

adding on each sample clock edge the output of said LATCH MEANS to the output of said MULTIPLEXER MEANS by said ADDER MEANS;

generating one of three n-bit values (N, M or SHIFT) by said MULTIPLEXER MEANS;

outputting under normal operation CODE NCO 1 MEANS frequency=(N×SCLK)/($2^n$−M+N) by said CODE NCO 1 MEANS; and outputting under code phase shift operation code phase shift=(M-SHIFT)/($2^n$−M+N) by said CODE NCO 1 MEANS.

73. The method of claim 72, said CODE NCO 1 MEANS comprising a 12-bit ADDER MEANS, a 12-bit LATCH MEANS, and a MULTIPLEXER MEANS; wherein said step of providing a clocking signal at C/A code rate and a clocking signal at P code rate for said CODE GENERATOR 1 MEANS by said CODE NCO 1 MEANS further comprises the steps of:

adding on each sample clock edge the output of said LATCH MEANS to the output of said MULTIPLEXER MEANS by said ADDER MEANS;

generating one of three 12-bit values (N, M or SHIFT) by said MULTIPLEXER MEANS;

outputting under normal operation CODE NCO 1 MEANS frequency=10.23 MHz by said CODE NCO 1 MEANS; and outputting under code phase shift operation code phase shift=(2619-SHIFT)/2500 sample clocks by said CODE NCO 1 MEANS.

74. The method of claim 53, said CODE NCO 2 MEANS comprising a n-bit ADDER MEANS, a n-bit LATCH MEANS, n being an integer, and a MULTIPLEXER MEANS; wherein said step of providing a clocking signal for said CODE GENERATOR 2 MEANS by said CODE NCO 2 MEANS further comprises the steps of:

adding on each sample clock edge the output of said LATCH MEANS to the output of said MULTIPLEXER MEANS by said ADDER MEANS;

generating one of three n-bit values (N, M or SHIFT) by said MULTIPLEXER MEANS;

outputting under normal operation CODE NCO 2 MEANS frequency=$(N \times SCLK)/(2^n-M+N)$ by said CODE NCO 2 MEANS; and outputting under code phase shift operation code phase shift=$(M-SHIFT)/(2^n-M+N)$ by said CODE NCO 2 MEANS.

75. The method of claim 74, said CODE NCO 2 MEANS comprising a 12-bit ADDER MEANS, a 12-bit LATCH MEANS, and a MULTIPLEXER MEANS; wherein said step of providing a clocking signal for said CODE GENERATOR 1 MEANS by said CODE NCO 1 MEANS further comprises the steps of:

adding on each sample clock edge the output of said LATCH MEANS to the output of said MULTIPLEXER MEANS by said ADDER MEANS;

generating one of three 12-bit values (N, M or SHIFT) by said MULTIPLEXER MEANS;

outputting under normal operation CODE NCO 1 MEANS frequency=10.23 MHz by said CODE NCO 1 MEANS; and outputting under code phase shift operation code phase shift=(2619-SHIFT)/2500 sample clocks by said CODE NCO 1 MEANS.

76. The method of claim 51, said DIGITAL SUMMER 1 further comprising a DIGITAL SUMMER ACCUMULATOR block; wherein said step of accumulating said L1 W code over the period of W SYNC 1 signal further includes the steps of:

inputting said L1 W code;

accumulating said L1 W code over the period of W SYNC 1 signal; and outputting an $\Sigma W_{L1}$ signal equal to an accumulation $\Sigma(L1W)$ of said L1 W code during said W SYNC 1 period.

77. The method of claim 53, said DIGITAL SUMMER 2 further comprising a DIGITAL SUMMER ACCUMULATOR 2, a DIGITAL SUMMER ACCUMULATOR 2, a DIGITAL SUMMER ACCUMULATOR 3, a DIGITAL SUMMER ACCUMULATOR 4, a DIGITAL SUMMER ACCUMULATOR 5, and a DIGITAL SUMMER ACCUMULATOR 6; wherein said step of accumulating by said DIGITAL SUMMER 2 MEANS said signals ($I_E$ ;$I_P$ ;$I_L$ ;$Q_E$ ;$Q_P$ ;$Q_L$) outputted by said CODE MIXER 3 across a period defined by said W SYNC 2a signal outputted by said CODE GENERATOR 2 further includes the steps of:

accumulating by said DIGITAL SUMMER ACCUMULATOR 1 block said I component of L2 W code early estimate $I_E$ over the period of W SYNC 2a signal and outputting an $\Sigma I_E$ accumulation every W SYNC 2a period;

accumulating by said DIGITAL SUMMER ACCUMULATOR 2 block said I component of L2 W code punctual estimate $I_P$ over the period of W SYNC 2a signal and outputting an $\Sigma I_P$ accumulation every W SYNC 2a period;

accumulating by said DIGITAL SUMMER ACCUMULATOR 3 block said I component of L2 W code late estimate $I_L$ over the period of W SYNC 2a signal and outputting an $\Sigma I_L$ accumulation every W SYNC 2a period;

accumulating by said DIGITAL SUMMER ACCUMULATOR 4 block said Q component of L2 W code early estimate $Q_E$ over the period of W SYNC 2a signal and outputting an $\Sigma Q_E$ accumulation every W SYNC 2a period;

accumulating by said DIGITAL SUMMER ACCUMULATOR 5 block said Q component of L2 W code punctual estimate $Q_P$ over the period of W SYNC 2a signal and outputting an $\Sigma Q_P$ accumulation every W SYNC 2a period; and accumulating by said DIGITAL SUMMER ACCUMULATOR 6 block said Q component of L2 W code late estimate $Q_L$ over the period of W SYNC 2a signal and outputting an $\Sigma Q_L$ accumulation every W SYNC 2a period.

78. The method of claim 76, said DIGITAL SUMMER ACCUMULATOR comprising an ADDER 1, a LATCH 1, and a LATCH 2; wherein said step of accumulating said L1 W code over the period of W SYNC 1 signal further includes the steps of:

inputting said L1 W code into said ADDER 1;

clearing said LATCH 1 by said W SYNC 1 signal;

performing the next accumulation of said L1 W code signal over the period of W SYNC 1 signal by said LATCH 1 MEANS; and latching in said W SYNC 1 signal and producing an output signal $\Sigma W_{L1}$ equal to the accumulations of the L1 W code over the period of said W SYNC 1 signal by said LATCH 2 MEANS.

79. A method of acquisition of an L1 and an L2 satellite signals by an OPTIMIZED SATELLITE RECEIVER; said OPTIMIZED SATELLITE RECEIVER comprising a L1 TRACKER MEANS, a L2 TRACKER MEANS, and a MICROPROCESSOR SYSTEM; said L1 TRACKER MEANS comprising a MULTIPLEXER MEANS 1, a CARRIER NCO MEANS 1, a CARRIER MIXER MEANS 1, a CODE GENERATOR 1 MEANS, a CODE MIXER MEANS 1, a CODE NCO MEANS 1, a CODE MIXER MEANS 2, a DIGITAL SUMMER 1, and a CORRELATORS 1; said L2 TRACKER comprising a CODE GENERATOR MEANS 2, a CARRIER NCO MEANS 2, a CARRIER MIXER MEANS 2, a CODE NCO MEANS 2, a CODE MIXER MEANS 3, a CODE MIXER MEANS 4, a DIGITAL SUMMER 2, a MULTIPLEXER 2, and a block CORRELATORS MEANS 2; wherein said method further comprises the steps of:

locking L1 C/A code tracking loop by said MICROPROCESSOR SYSTEM;

locking L1 C/A carrier tracking loop by said MICROPROCESSOR SYSTEM;

computing the L2 carrier frequency aiding term by said MICROPROCESSOR SYSTEM using the value of L1 frequency;

applying said L2 frequency aiding term to said CARRIER NCO MEANS 2; wherein said L1 and L2 satellite signals are separated in time by ionospheric delay;

setting up a P CODE GENERATOR in said CODE GENERATOR 1 and in said CODE GENERATOR 2;

adjusting said CODE NCO 2 phase to compensate for the ionospheric delay between said L1 and said L2 signals until power is found in said L2 CORRELATORS MEANS 2;

locking the L2 carrier tracking loop using said MICROPROCESSOR SYSTEM; and locking the L2 code tracking loop using said MICROPROCESSOR SYSTEM.

80. The method of claim 79, wherein said method further comprises the steps of:

reading said L1 CORRELATORS MEANS and said L2 CORRELATORS MEANS by said MICROPROCESSOR MEANS;

forming the L1 code tracking loop and applying the output to said CODE NCO 1 MEANS;

forming the L1 carrier tracking loop and applying the output to said CARRIER NCO MEANS 1;

computing the L2 frequency aiding term;

forming the L2 code tracking loop and applying the output to said CODE NCO MEANS 2;

forming the L2 carrier tracking loop and applying the output to said CARRIER NCO MEANS 2;

performing the L1 and L2 carrier phase measurements by reading CARRIER NCO MEANS 1's output phase and CARRIER NCO MEANS 2's output phase at a chosen MSEC reference time;

performing the L1 and L2 code phase measurements by keeping track in said MICROPROCESSOR MEANS of what shifts have been applied to said CODE NCO MEANS 1 and CODE NCO MEANS 2 respectively; whereby the tracking of said satellite signals L1 and a L2 is achieved.

\* \* \* \* \*